(12) United States Patent
Raj et al.

(10) Patent No.: US 8,940,220 B2
(45) Date of Patent: Jan. 27, 2015

(54) METHODS OF FLASH SINTERING

(75) Inventors: Rishi Raj, Boulder, CO (US); Marco Cologna, Munich (DE); Andre Luiz Geromel Prette, Bayreuth (DE); Vincenzo M. Sglavo, Roncegno (IT); John Francis, Boulder, CO (US)

(73) Assignee: The Regents of the University of Colorado, A Body Corporate, Denver, CO (US)

( * ) Notice: Subject to any disclaimer, the term of this patent is extended or adjusted under 35 U.S.C. 154(b) by 0 days.

(21) Appl. No.: 13/562,040

(22) Filed: Jul. 30, 2012

(65) Prior Publication Data

US 2013/0085055 A1    Apr. 4, 2013

Related U.S. Application Data

(60) Provisional application No. 61/513,246, filed on Jul. 29, 2011.

(51) Int. Cl.
*C04B 35/645*        (2006.01)
*B23K 9/00*          (2006.01)
(Continued)

(52) U.S. Cl.
CPC . *B23K 9/00* (2013.01); *C04B 35/00* (2013.01); *C04B 35/64* (2013.01); *C04B 35/016* (2013.01); *C04B 35/111* (2013.01); *C04B 35/47* (2013.01); *C04B 35/486* (2013.01); *C04B 35/63416* (2013.01); *C04B 35/645* (2013.01); *C04B 2235/3206* (2013.01); *C04B 2235/3225* (2013.01); *C04B 2235/3275* (2013.01); *C04B 2235/5409* (2013.01); *C04B 2235/5445* (2013.01); *C04B 2235/5454* (2013.01); *C04B 2235/5463* (2013.01); *C04B 2235/608* (2013.01); *C04B 2235/6562* (2013.01); *C04B 2235/6567* (2013.01); *C04B 2235/666* (2013.01); *C04B 2235/77* (2013.01); *C04B 2235/781* (2013.01); *C04B 2235/782* (2013.01); *C04B 2235/783* (2013.01); *C04B 2235/784* (2013.01); *C04B 2235/785* (2013.01); *C04B 2235/786* (2013.01);
(Continued)

(58) Field of Classification Search
CPC   C04B 35/64; C04B 35/645; C04B 2235/666; C04B 2235/667
USPC .......... 264/430, 434, 449, 460, 461, 485, 614
See application file for complete search history.

(56) References Cited

U.S. PATENT DOCUMENTS 3,026,210 A      3/1962  Coble
3,508,029 A  *   4/1970  Inoue ........................... 219/149

FOREIGN PATENT DOCUMENTS

GB                 27002           0/1906

OTHER PUBLICATIONS

Wang, R. Raj, "Estimate of the activation energies for boundary diffusion from rate-controlled sintering of pure alumina and alumina doped with zirconia or titania", J. Am. Cerarn. Soc., 73:1172-1175 (1990).

(Continued)

*Primary Examiner* — Joseph S. Del Sole
*Assistant Examiner* — Lawrence D Hohenbrink, Jr.
(74) *Attorney, Agent, or Firm* — Lathrop & Gage LLP

(57) ABSTRACT

This disclosure provides methods of flash sintering and composition created by these methods.

24 Claims, 53 Drawing Sheets

(51) Int. Cl.

| | |
|---|---|
| *C04B 35/00* | (2006.01) |
| *C04B 35/64* | (2006.01) |
| *C04B 35/01* | (2006.01) |
| *C04B 35/111* | (2006.01) |
| *C04B 35/47* | (2006.01) |
| *C04B 35/486* | (2006.01) |
| *C04B 35/634* | (2006.01) |

(52) U.S. Cl.
CPC ......... *C04B 2235/94* (2013.01); *C04B 2235/95* (2013.01); *C04B 2235/9615* (2013.01)
USPC ........... 264/434; 264/430; 264/449; 264/460; 264/461; 264/485; 264/614

(56) References Cited

OTHER PUBLICATIONS

Orru, R., et al., "Consolidation/synthesis of materials by electric current activated/assisted sintering", Mat. Sci. Eng., R 63, 127-287 (2009).
Munir, Z. A., et al., "The effect of electric field and pressure on the synthesis and consolidation of materials: A review of the spark plasma sintering method", J. Mater. Sci., 41:763-777 (2006).
Grasso, S., et al., "Electric current activated/assisted sintering (ECAS): a review of patents 1906-2008", Sci. Technol. Adv. Mater., 10:053001 (2009).
Young, R. M., et al., "Temperature-Gradient-Driven Diffusion in Rapid-Rate Sintering", J. Am. Ceram. Soc., 12(6):1080-1081 (1989).
Yang, D.I., et al., "Enhanced Sintering Rate of Zirconia (3Y-TZP) Through the Effect of a Weak dc Electric Field on Grain Growth", J. Am. Ceram. Soc., 93(10):2935-2927 (2010).
Yang, D. I., et al., "Enhanced Sintering Rate of Zirconia (3Y-TZP) by Application of a Small AC Electric Field", Scripta Materialia, 63(3):328-331 (2010).
Ghosh, S., et al., "A Huge Effect of Weak dc Electrical Fields on Grain Growth in Zirconia", J. Am. Ceram. Soc., 92(8):1856-1859 (2009).
Cologna, M., et al., "Field assisted and flash sintering of alumina and its relationship to conductivity and MgO-doping", Journal of the European Ceramic Society, 31(15):2827-2837 (2011).
Cologna, M., et al., "Surface diffusion controlled neck growth kinetics in early stage sintering of zirconia, with and without applied dc electric field," Journal of the American Ceramic Society, 94: 391-395. doi: 10.1111/j.1551-2916.2010.04088.x (2011).
Guo, X., et al., "Blocking grain boundaries in yttria-doped and undoped ceria ceramics of high purity," Journal of the American Ceramic Society, 86: 77-87. doi: 10.1111/j.1151-2916.2003.tb03281.x (2003).
Wakai, F., et al., Effects of Solute Ion and Grain Size on Superplasticity of Zr02 Polycrystals, J. Mater. Sci., 26:241-247 (1991).
Cameron, C. P., et al., "Grain growth transition during sintering of colloidally prepared alumina powder compacts," J. Am. Ceram. Soc., 71, 1031-1035 (1988).
Cologna, M. et al., "Flash Sintering of Nanograin Zirconia in <5 s at 850° C.", J. Am. Ceram. Soc., 93(11):3556-3559 (2010).
Francis, J.S.C., et al., "Particle size effects in flash sintering", Journal of the European Ceramic Society, 32(12):3129-3136 (2012).
Cologna, M., et al., "Flash sintering of Cubic Yttria-Stabilized Zirconia at 750° C. for Possible Use in SOFC Manufacturing", J. Am. Ceram. Soc., 94(2):316-319 (2011).
Prette, A.L.G., et al., "Flash sintering of C02Mn04 spinel for solid oxide fuel cell applications", J. Power Sources, 196:2061-2065 (2011).
Karakuscu, A., et al., "Defect Structure of Flash-Sintered Strontium Titanate", Journal of the American Ceramic Society, 95(8):2531-2536 (2012).
Francis, J., et al., "Flash sinterforging of Nanograin Zirconia: Field Assisted Sintering and Superplasticity", J. Am. Ceram. Soc., 95: 138-146. doi: 10.1111/j.1551-2916.2011.04855.x (2012).
Raj, R., et al., "Influence of Externally Imposed and Internally Generated Electrical Fields on Grain Growth, Diffusional Creep, Sintering and Related Phenomena", J. Am. Ceram. Soc., 94: 1941-1965. doi: 10.1111/j.1551-2916.2011.04652.x (2011).
Cologna, M., et al., "Sintering and Deformation of Solid Oxide Fuel Cells Produced by Sequential Tape Casting", Int. J. Applied Ceram. Tech., 7(6):803-813 (2010).
Evans, B. D., "A review of the optical properties of anion lattice vacancies, and electrical conduction in -Ab03: their relation to radiation-induced electrical degradation" J. Nuclear Materials, 219:202-223 (1995).
Sonder, E., et al., "The effect of electric current on the conductivity of MgO single crystals at temperatures above 1300 K", J. Appl. Phys. 49(12):5971-5976 (1978).
Jorgensen, P. J. Jorgensen, "Modification of Sintering Kinetics by Solute Segregation in Al2O3", 48 207-210 (1965).
Lin, F. J. T., et al., "Initial Coarsening and Microstructural Evolution of Fast-Fired and MgO-Doped Al2O3", J. Am. Ceram. Soc., 80(11):2891-96 (1997).
Shen, Z., et al., "Spark Plasma Sintering of Alumina", J. Am. Ceram. Soc., 85(8):1921-27 (2002).
Berry, K. A., et al., "Effect of MgO Solute on Microstructure Development in Al2O3," J. Am. Ceram. Soc., 69(2):143-149 (1986).
Narayan, J., et al., "Aggregation of defects and thermal-electric breakdown in MgO" J. Appl. Phys., 49(12):5977-5981 (1978).
Brook, R. J., et al., "Electrochemical Cells and Electrical Conduction of Pure and Doped Al2O3", J. Am. Ceram. Soc., 54(9):444-451 (1971).
Mohapatra, S. K., et al., "Defect Structure of a-Al2O3 Doped with Magnesium", J. Am. Ceram. Soc., 60(3-4):141-148 (1977).
Will, F. G., et al., "Conduction Mechanism of Single-Crystal Alumina", J. Am. Ceram. Soc., 75(121):295-304 (1992).
Talbi, F., et al., "DC conduction of Al2O3 under high electric field", J. Phys. D: Appl. Phys., 40:3803-3806 (2007).
Karhaliou, P. K., et al., "Transient and alternating current conductivity of nanocrystalline porous alumina thin films on silicon, with embedded silicon nanocrystals", J. Appl. Phys., 95(5):2776-2780 (2004).
Pells, G.P., "Radiation-induced degradation of the intrinsic electrical conductivity of MgAl2O4 and Al2O3", Journal of Nuclear Materials, 184:177-182 (1991).
Hodgson, E. R., "Radiation enhanced electrical breakdown in Al2O3: field effect", Nuclear Instruments and Methods in Physics Research, B65:298-300 (1992).

\* cited by examiner

METHODS OF FLASH SINTERING

RELATED APPLICATIONS

This application claims priority from U.S. Provisional Application No. 61/513,246 filed on Jul. 29, 2011, incorporated by reference herein in its entirety.

STATEMENT REGARDING FEDERALLY SPONSORED RESEARCH

This invention was made with government support under grant number DE-FG02-07ER46403 awarded by the U.S. Department of Energy. The government has certain rights in the invention.

FIELD

The present disclosure is directed to methods for producing sintered ceramic materials in very short times and at low temperatures as compared to traditional methods.

BACKGROUND

Dense ceramic bodies are traditionally produced by sintering green powder compacts at high temperatures, in a process that is time and energy intensive. For example, zirconia traditionally requires several hours at 1400° C. Although electromagnetic and electrical field assisted sintering techniques (FAST) allow shorter times and temperatures, there remains a need in the art for techniques that further reduce the energy requirements and cost.

SUMMARY

Provided herein are methods of flash sintering.

In one aspect, provided herein is a method of sintering a material, comprising simultaneously exposing the material to heat and to a DC, AC or pulsed electrical field that is applied by a potential difference across the material, such that the material is sintered, wherein the time between the onset of sintering and the completion of sintering is less than one minute.

In one embodiment of the method, the time between the onset of sintering and the completion of sintering is less than 5 seconds.

In certain embodiments of the method, the electrical field is between 7.5 V/cm and 1000 V/cm.

In another embodiment of the method, the onset of sintering is accompanied by an increase in power dissipation within the material, wherein the power dissipation is manifested as an increase in the current flowing through the material. In still another embodiment of the method, the onset of sintering is accompanied by a sudden increase in power dissipation within the material, wherein the power dissipation is manifested as a sudden increase in the current flowing through the material. In certain embodiments of the method, the power dissipation is between 1 W and 100 W. In other embodiments, the range is typically from 10 to 1000 mWmm$^{-3}$.

In still another embodiment of the method, the onset of sintering is accompanied by a non-linear increase in the conductivity of the material.

In other embodiments of the method, the electrical voltage is applied to the material with two electrodes that are electronically conducting. In a particular embodiment, the electrodes are made from a metal or from an electronically conducting ceramic material. In some embodiments, the electrodes are not physically in contact with the material.

In still another embodiment of the method, the electrical field is fixed and the heat is increased at a constant rate. In certain embodiments of the method, the heat is increased at a rate between 1° C. per minute to 100° C. per minute.

In one embodiment of the method, the temperature of the furnace containing the material is fixed and the applied voltage field is increased at a constant rate until the onset of sintering.

In still another embodiment of the method, the onset of sintering is accompanied by an increase in the relative density of the material to 80-100% of the theoretical density.

In a particular embodiment, the method comprises simultaneously exposing the material to an electrical field and to heat, such that the material is sintered, wherein the electric field is between 7.5 V/cm and 1000 V/cm, wherein the onset of sintering is accompanied by a power dissipation between 1 W and 100 W or from 10 to 1000 mW mm$^{-3}$, wherein the onset of sintering is accompanied by a non-linear increase in the conductivity of the material, and wherein the time between the onset of sintering and the completion of sintering is less than one minute.

In other embodiments, the material has a greater concentration of non-stoichiometric phase than $Al_2O_3$, wherein the $Al_2O_3$ is substantially not doped with MgO. The non-stoichiometric phases can be Ruddlesden-Popper (RP) phases. In further embodiments, the material has a greater concentration of non-stoichiometric phase than a material selected from the group consisting of yttrium-stabilized zirconia, MgO-doped alumina, $SrTiO_3$ and $Co_2MnO_4$. The non-stoichiometric phases can be Ruddlesden-Popper (RP) phases. In other embodiments, the material is selected from yttrium-stabilized zirconia, MgO-doped alumina, $SrTiO_3$ and $Co_2MnO_4$.

In certain embodiments, the material is provided in particles with average diameters between 60 nm and 1.5 µm, 60 nm and 200 nm or 1.0 µm and 1.5 µm.

In other embodiments, the method of sintering a material also includes exposing the material to a uniaxial force. The uniaxial force can be between 1.5 and 12 MPa.

The disclosure also provides a composition comprising material flash sintered according to the methods described herein.

DETAILED DESCRIPTION

Figure 1:
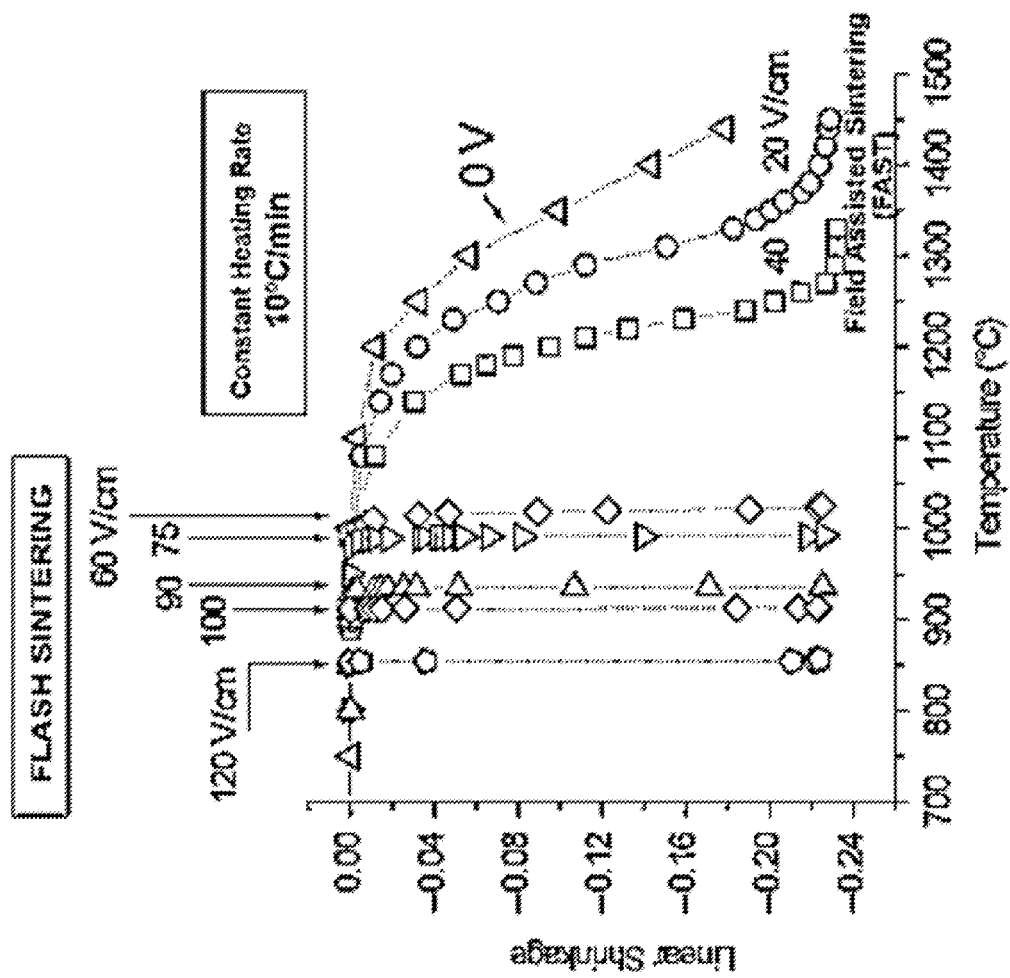
FIG. 1 depicts the enhancement of the rate of sintering in yttria stabilized zirconia (3YSZ) by DC electrical fields. An instability occurs when the field is greater than a threshold value, estimated to be about 40 Vcm$^{-1}$ in the present experiments, leading to sintering in just a few seconds at unusually low temperatures.

Dense ceramic bodies are traditionally produced by sintering green powder compacts at high temperatures. Sintering occurs by solid-state diffusion, which transports matter from grain boundaries into the neighboring pores. Thus the effective diffusion distance scales with the grain size, while the rate of matter transport is determined by self-diffusion along the grain boundaries (at large grain sizes the transport may become dominated by lattice diffusion, which is not relevant to the present study). At the same time the driving force for sintering, which is proportional to the curvature of the pores, is also proportional to the grain size. As a result the rate of sintering is related to the grain size and to the diffusion coefficient, leading to the following equation for the densification rate, $\dot{\rho}$[1]:

$$\dot{\rho} = \frac{Af(\rho)}{Td^4}e^{-\frac{Q_B}{RT}} \quad (1)$$

where A is a material constant, $Q_B$ is the activation energy for self-diffusion at grain boundaries, $f(\rho)$ is a function of the density, T is the temperature in K, and d is the grain size. The grain size exponent of 4 applies to boundary diffusion-dominated mass transport. Sintering is nearly always accompanied by significant grain growth, which slows the sintering process.

Techniques that use electromagnetic and electrical fields, in tandem with time and temperature, have been shown to enhance the sintering rate. These methods are collectively known as field-assisted sintering techniques (FAST)[2,3,4]. They include methods known as microwave sintering and Spark Plasma Sintering (SPS). However, a fundamental understanding of the underlying atomistic mechanisms remains clouded.[2] Electrical sparks and plasmas at particle-particle contacts, self-cleaning of particles surfaces, and temperature-gradient-driven diffusion have been proposed as explanations for field-enhanced sintering.[5]

Flash sintering is a novel technique for sintering materials in very short times and at lower temperatures compared to traditional sintering methods. The phenomenon of flash sintering is characterized by two experimental observations: (i) at a certain temperature and applied electrical field there is a sudden increase in the sintering rate such that sintering occurs in just a few seconds. A higher applied field lowers the temperature for the onset of flash sintering. (ii) The sintering event is accompanied by a sharp increase in the conductivity of the ceramic, which occurs at the same temperature and applied field.

Thus, provided herein are methods of flash sintering. In one aspect, provided herein is a method of sintering a material, comprising simultaneously exposing the material to heat and to a DC, AC or pulsed electrical field that is applied by a potential difference across the material, such that the material is sintered, wherein the time between the onset of sintering and the completion of sintering is less than one minute. In one embodiment of the method, the time between the onset of sintering and the completion of sintering is less than 30 seconds. In another embodiment, the time between the onset of sintering and the completion of sintering is less than 5 seconds.

In certain embodiments of the methods described herein, the electrical field is between 7.5 V/cm and 1000 V/cm. In other embodiments, the electrical field is fixed and the heat is increased at a constant rate. In certain embodiments of the method, the heat is increased at a rate between 1° C. per minute to 100° C. per minute. In a particular embodiment, the heat is increased at a rate of 10° C. per minute.

In other embodiments of the methods described herein, the temperature of the furnace containing the material is fixed and the applied voltage field is increased at a constant rate until the onset of sintering.

Flash sintering is different from nominal field-assisted sintering, where the application of fields leads to a gradual enhancement in the sintering rate. In the methods described herein, flash sintering occurs above a threshold field and temperature, (e.g. 850° C. and 120 Vcm$^{-1}$ for yttria-stabilized zirconia); while nominal field assisted sintering occurs at lower fields and higher temperatures[15,16].

The hardware requirements for flash sintering are different from other field-assisted sintering methods including microwave sintering and SPS. In microwave sintering, the specimen is placed within a microwave chamber; often, collateral heating is used to sinter the specimen. In SPS the ceramic powder is placed within a graphite die and pressure is applied, usually with a piston that is also constructed from graphite; then a high electrical current is applied to this assembly to heat the sample. Therefore the SPS method is driven by electrical currents of several kiloamperes. In the flash sintering process neither microwaves nor a graphite die, nor electrical currents are used. Instead an electrical voltage is applied by means of two electrodes across the specimen. Therefore the flash sintering process is controlled by a potential difference rather than by electrical current. While the electrical currents in the SPS process are much greater than one kiloampere, in flash sintering, the current is less than 10 amperes. Accordingly, in certain embodiments of the methods described herein, the electrical voltage is applied to the material with two electrodes that are electronically conducting. In a particular embodiment, the electrodes are made from a metal or from an electronically conducting ceramic material. In some embodiments, the electrodes are not physically in contact with the material.

Flash sintering has been demonstrated in several oxides including, cubic yttria doped zirconia (8YSZ)[17], cobalt manganese oxide ($Co_2MnO_4$)[18], titanium oxide ($TiO_2$) and strontium titanate ($SrTiO_3$)[19,20].

Accordingly, in certain embodiments of the methods described herein, the material that is to be sintered is selected from yttrium-stabilized zirconia, MgO-doped alumina, cubic yttria doped zirconia (8YSZ), cobalt manganese oxide ($Co_2MnO_4$), titanium oxide ($TiO_2$) and strontium titanate ($SrTiO_3$). In other embodiments, the material is selected from yttrium-stabilized zirconia, MgO-doped alumina, and $Co_2MnO_4$. In a particular embodiment, the material is yttrium-stabilized zirconia (3YSZ). In another particular embodiment, the material is MgO-doped alumina.

An immediate interpretation of flash sintering is that the Joule heating of the specimen precipitated by the surge in power dissipation is responsible for the very high rates of sintering. However, the measurement of the temperature during the flash event (with an optical pyrometer[21]) shows that the specimen remains far below the temperature where the ceramic would have been expected to sinter in just a few seconds. Thus, the power surge, and the surge in the sintering rate are not linked by a cause-and-effect relationship; instead they appear to share a common underlying mechanism. The exposition of this mechanism is the main scientific challenge in the discovery of this new phenomenon.

Accordingly, in one embodiment of the methods described herein, the onset of sintering is accompanied by a sudden increase in the power dissipated within the material, wherein the power dissipation is manifested as a sudden increase in the current flowing through the material. In certain embodiments, the power dissipation is between 1 W and 100 W. In other embodiments, the power dissipation is between 1 W and 10 W, 10 W and 20 W, 20 W and 30 W, 30 W and 40 W, 40 W and 50 W, 50 W and 60 W, 60 W and 70 W, 70 W and 80 W, 80 W and 90 W, 90 W and 100 W, 1 W and 50 W, and 50 W and 100 W. In certain embodiments, the power dissipation is about 1, 10, 20, 30, 40, 50, 60, 70, 80, 90 or 100 W. In a particular embodiment (i.e., a bar-shaped specimen that is about 2 cm long and 3 mm×2 mm in cross section) the onset of sintering is accompanied by a power dissipation of about 1 W. As used in this context, the term "about" may indicate ±0.5 W. Thus, in certain embodiments, the onset of sintering is accompanied by a power dissipation of 1±0.5 W. More specifically, the term about may indicate ±0.1 W. Thus, in other embodiments, the onset of sintering is accompanied by a power dissipation of 1±0.1 W. In other embodiments of the methods, the onset of sintering is accompanied by a non-linear increase in the conductivity of the material. In certain embodiments of the methods described herein, the onset of sintering is accompanied by an increase in the relative density of the material to 80-100% of the theoretical density. In a particular embodiment, the onset of sintering is accompanied by an increase in the relative density of the material to greater than 99% of the theoretical density.

Flash sintering is different from nominal field assisted sintering of ceramics. In field assisted sintering the rate of sintering is gradually enhanced as the applied field is increased, whereas in flash sintering the event occurs precipitously. Nominal field assisted sintering in yttria doped zirconia has been successfully explained by the reduced rate of grain growth under the influence of an electrical field[16,22].

The following possible mechanisms have been suggested for flash sintering:
1. Local heating at grain boundaries: local resistance at particle-particle contacts can lead to higher local temperatures that enhances diffusion[15];
2. Nucleation of Frenkel Pairs: nucleation of vacancy-interstitial pairs under the applied field. The applied field can strip the charge on the vacancy and the interstitial (an electron on one and a hole on the other), leaving them charge neutral relative to the lattice. The bias from the sintering pressure can then draw the vacancy preferentially into the grain boundaries and the interstitials into the pores, producing densification, while the electron-hole pair contributes to higher electrical conductivity[23];
3. Interaction between External Field and the Space Charge Field: the field in the space charge layer adjacent to grain boundaries can have strength of 10-1000 $Vcm^{-1}$. In other embodiments, the space charge layer adjacent to grain boundaries can have strength of 10-50 $Vcm^{-1}$, 50-100 $Vcm^{-1}$, 100-150 $Vcm^{-1}$, 150-200 $Vcm^{-1}$, 200-250 $Vcm^{-1}$, 250-300 $Vcm^{-1}$, 300-350 $Vcm^{-1}$, 350-400 $Vcm^{-1}$, 400-450 $Vcm^{-1}$, 450-500 $Vcm^{-1}$, 500-550 $Vcm^{-1}$, 550-600 $Vcm^{-1}$, 600-650 $Vcm^{-1}$, 650-700 $Vcm^{-1}$, 700-750 $Vcm^{-1}$, 750-800 $Vcm^{-1}$, 800-850 $Vcm^{-1}$, 850-900 $Vcm^{-1}$, 900-950 $Vcm^{-1}$, 950-1000 $Vcm^{-1}$, 10-500 $Vcm^{-1}$ or 500-1000 $Vcm^{-1}$. These values are comparable to the applied fields. The applied electric filed may interact nonlinearly with the intrinsic fields, thereby changing the diffusion kinetics[23].

In a particular embodiment of the methods described herein, the method comprises simultaneously exposing the material to an electric field and to heat, such that the material is sintered, wherein the electrical field is between 7.5 V/cm and 1000 V/cm, wherein the onset of sintering is accompanied by a power dissipation between 1 W and 100 W, wherein the onset of sintering is accompanied by a non-linear increase in the conductivity of the material, and wherein the time between the onset of sintering and the completion of sintering is less than one minute.

In certain embodiments, the sintering is completed in between 1 and 60 seconds. In other embodiments, the sintering is completed in less than 5, 10, 15, 20, 25, 30, 35, 40, 45, 50, 55 or 60 seconds. In other embodiments, the sintering is completed in between 1 and 10, 10 and 20, 20 and 30, 30 and 40, 40 and 50, 50 and 60, 1 and 30 or 30 and 60 seconds.

In other embodiments, the heat is increased at a constant rate until onset of sintering. In certain embodiments, heat is increased at a rate between 1° C. per minute to 100° C. per minute. In other embodiments, heat is increased at a rate between 1° C. per minute to 10° C. per minute, 10° C. per minute to 20° C. per minute, 20° C. per minute to 30° C. per minute, 30° C. per minute to 40° C. per minute, 40° C. per minute to 50° C. per minute, 50° C. per minute to 60° C. per minute, 60° C. per minute to 70° C. per minute, 70° C. per minute to 80° C. per minute, 80° C. per minute to 90° C. per minute, 90° C. per minute to 100° C. per minute, 1° C. per minute to 50° C. per minute, or 50° C. per minute to 100° C. per minute.

In other embodiments, the sintering is accompanied by an increase in the relative density of the material to 80-100% of the theoretical density. In certain embodiments, the sintering is accompanied by an increase in the relative density of the material to 80, 81, 82, 83, 84, 85, 86, 87, 88, 89, 90, 91, 92, 93, 94, 95, 96, 97, 98, 99 or 100% of the theoretical density. In other embodiments, the sintering is accompanied by an increase in the relative density of the material to 80-85, 85-90, 90-95 or 95-100% of the theoretical density.

In additional embodiments, the material has a relatively high concentration of non-stoichiometric phase. This non-stoichiometric phase can be a Ruddlesden-Popper (RP) phase. In certain embodiments, the material that is flash sintered has an amount of non-stoichiometric phase or Ruddlesden-Popper (RP) phase greater than the amount of these phases present in $Al_2O_3$, wherein the $Al_2O_3$ is substantially not doped with MgO. In other embodiments, the material that is flash sintered has an amount of non-stoichiometric phase or Ruddlesden-Popper (RP) phase 110, 120, 130, 140, 150, 200, 250, 300, 350, 400, 450, 500, 550, 600, 650, 700, 750, 800, 850, 900, 1000, 2000, 3000, 4000 or 5000% greater than the amount of these phases present in $Al_2O_3$, wherein the $Al_2O_3$ is substantially not doped with MgO.

In certain embodiments, the material that is flash sintered has an amount of non-stoichiometric phase or Ruddlesden-Popper (RP) phase about equal or greater than the amount of these phases present in yttrium-stabilized zirconia, MgO-doped alumina, $SrTiO_3$ or $Co_2MnO_4$. In other embodiments, the material that is flash sintered has an amount of non-stoichiometric phase or Ruddlesden-Popper (RP) phase 75, 80, 85, 90, 95, 100, 105, 110, 120, 130, 140, 150, 200, 250, 300, 350, 400, 450, 500, 550, 600, 650, 700, 750, 800, 850, 900, 1000, 2000, 3000, 4000 or 5000% greater than the amount of these phases present in yttrium-stabilized zirconia, MgO-doped alumina, $SrTiO_3$ or $Co_2MnO_4$.

In other embodiments, the size of the particles of material to be flash sintered are, on average, between 60 nm and 1.5 μm in diameter. In certain embodiments, the size of the particles of material to be flash sintered are, on average, between 60 nm and 200 nm or 70 nm and 200 nm in diameter. In other embodiments, the size of the particles of material to be flash sintered are, on average, less than 60, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450 or 1500 nm in diameter. In further embodiments, the size of the particles of material to be flash sintered are, on average, between 60 and 100, 100 and 200, 200 and 300, 300 and 400, 400 and 500, 500 and 600, 600 and 700, 700 and 800, 800 and 900, 900 and 1000, 1000 and 1100, 1100 and 1200, 1200 and 1300, 1300 and 1400, or 1400 and 1500 nm in diameter.

In other embodiments, the method of flash sintering also include exposing the material to higher than atmospheric pressure. In certain embodiments, the higher than atmospheric pressure is between 1.5 and 12 MPa. In other embodiments, the higher than atmospheric pressure is between 1.5 and 2.0, 2.0 and 2.5, 2.5 and 3.0, 3.0 and 3.5, 3.5 and 4.0, 4.0 and 4.5, 4.5 and 5.0, 5.0 and 5.5, 5.5 and 6.0, 6.0 and 6.5, 6.5 and 7.0, 7.0 and 7.5, 7.5 and 8.0, 8.0 and 8.5, 8.5 and 9.0, 9.0 and 9.5, 9.5 and 10.0, 10.0 and 10.5, 10.5 and 11.0, 11.0 and 11.5, or 11.5 and 12.0 MPa.

EXAMPLES

Example 1

Flash Sintering of Nanograin Zirconia in <5 s at 850° C.

Introduction

It has been shown that electrical fields of approximately 20 V/cm lower the sintering temperature of 3 mol % yttria-stabilized zirconia (3YSZ) from ~1400° C. to 1300° C.[6,7] This enhancement in the sintering rate could be successfully explained by a slower rate of grain growth in the presence of an electrical field.[8] These papers document that electrical fields retard grain growth, which, as given by Eq. (1), can enhance the rate of sintering.

The present work demonstrates that 3YSZ can be sintered in a few seconds at temperatures as low as 850° C. by increasing the field strength to ~100 V/cm. This unusual finding may be explained by local heating at grain boundaries formed at the particle-particle junctions. It appears that this local heating can unleash a runaway process whereby heating reduces the local resistance leading to more intense Joule heating, and so on. The end result is that the sample can be flash sintered in just a few seconds at a furnace temperature of just 850° C.

Methods

Commercial tetragonal 3YSZ powders (TZ-3YB, Tosoh USA, Grove City, Ohio) with a particle size of 60 nm were uniaxially pressed into dog bone-shaped specimens having a relative density of 50.4%. The gage section had a length of 21 mm and a rectangular cross section of 3 mm×1.58 mm. Sintering was performed in a vertical tubular furnace under the application of a constant dc voltage. The sample was suspended in the center of the tube by means of two platinum electrodes attached to the handles of the dog bone specimens. A CCD camera recorded the sample dimensions through a series of optical filters positioned at the bottom end of the tube.[9] Samples were sintered with the following heating ramp: 21° C./min to 500° C., and then at a constant heating rate of 10° C./min up to 1450° C. or less, as needed to achieve full densification. The true (linear) shrinkage strain, given by $\epsilon=\ln(l/l_o)$, where $l_o$ is the initial gage length and l is the time dependent gage length as the specimen sinters. Because the experiments were carried out at a constant heating rate, time and temperature are proportional to one another. Thus, the results are presented by plotting the shrinkage strain as a function of temperature.

Results

Figure 2:
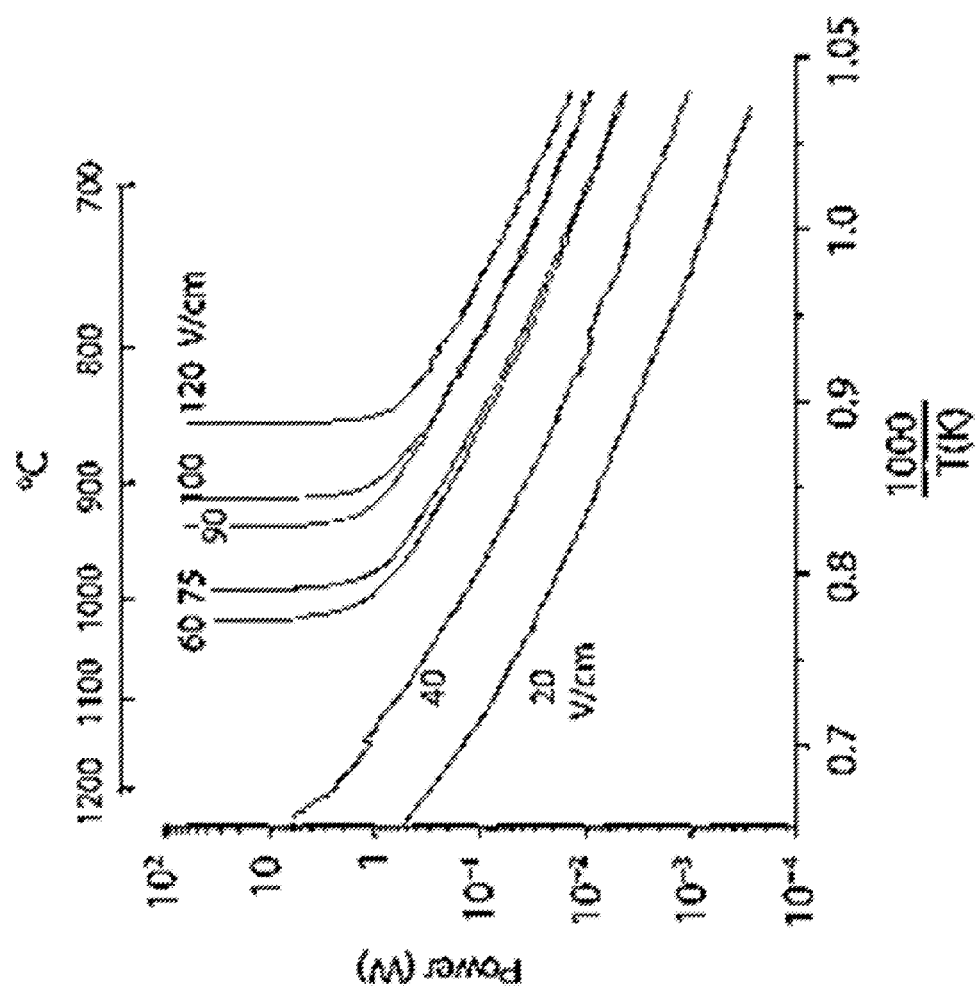
FIG. 2 depicts the phenomenon of flash sintering, which also manifests in a power surge when the critical sintering temperature is reached, confirming that it is an instability in the process. The onset of the power-instability coincides with the onset of Flash sintering shown in FIG. 1.

The sintering strain measured as a function of temperature, for different values of the initial applied dc field, is reported in FIG. 1. These graphs show two regions: at low fields, <40 V/cm, densification occurs gradually, albeit at increasing rates as the field is increased. This regime is equivalent to the method called FAST sintering. At higher fields, sintering occurs almost instantly as recognized by the nearly vertical slope of the shrinkage curves. In this regime, the onset of sintering moves to a lower temperature as the field is increased from 60 V/cm, eventually dropping to 850° C. when the field reaches to 120 V/cm. This nearly instantaneous sintering method is being called flash sintering. The rates of sintering given by the slopes of the strain versus time (or temperature, because the experiments were carried out a constant heating rate of 10° C./min) are three orders of magnitude faster in flash sintering regime than in FAST sintering. A plot of the measured input power as a function of temperature yields an interesting finding that is shown in FIG. 2. In the flash sintering regime (60-120 V/cm), there is an abrupt increase in power dissipation at the temperatures that correspond closely to the onset of flash sintering. Furthermore, the onset of the instability occurs at about the same power level, about 1 W, irrespective of the applied field. At fields below 40 V/cm, the power continues to increase monotonically as the temperature increases, as would be expected from the temperature dependence of ionic conductivity.

Discussion

1. Joule Heating at Grain Boundaries

We explore the hypothesis that local Joule heating at the grain boundaries, which form at the particle-particle contacts, is the underlying cause for the onset of flash sintering. In a constant voltage experiment, the power dissipation is given by V2/R, where V is the applied voltage and R is the electrical resistance of the specimen. In a first-order approximation, the total resistance can be written as a sum of the resistance of the crystal matrix, RC, and the grain boundaries, RGB. Therefore, the power (Watts) dissipated in the specimen is given by:

$$W = \frac{V^2}{R_C + R_{GB}} \quad (2)$$

Figure 3:
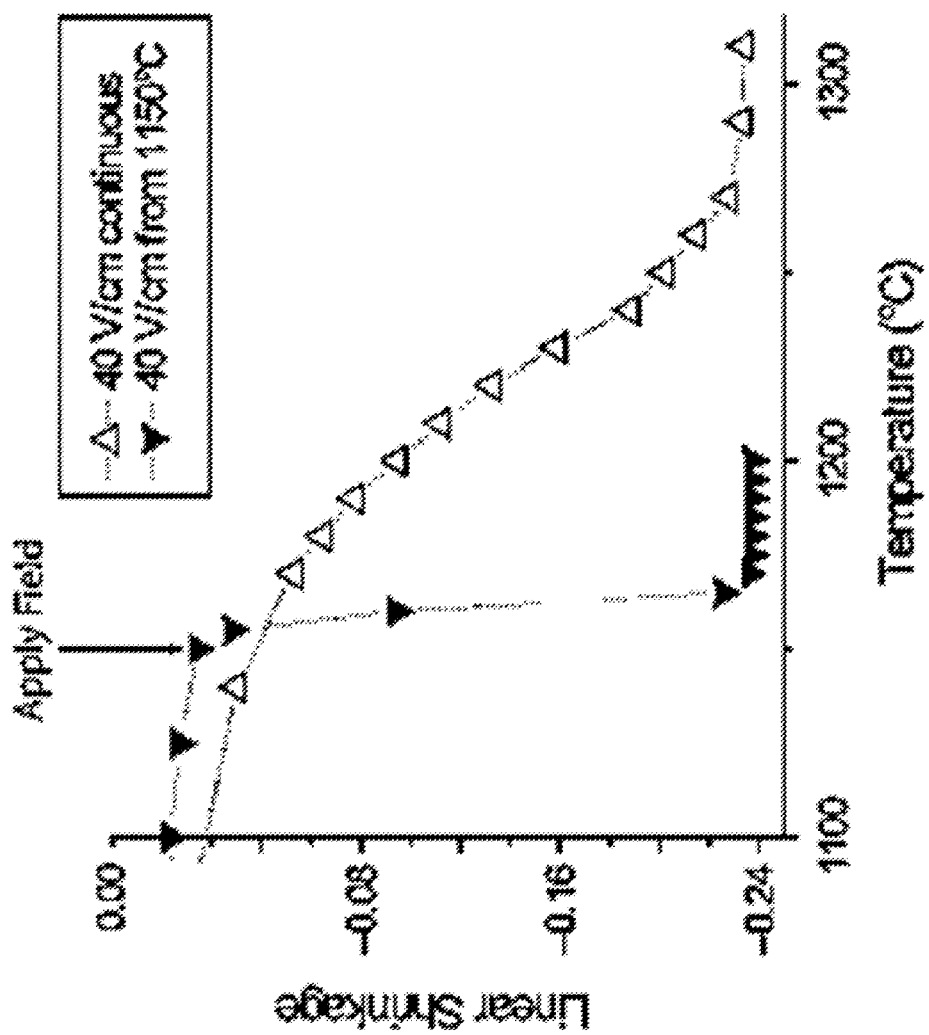
FIG. 3 shows that flash sintering is not seen when a field of 40 Vcm$^{-1}$ is applied at the start of the sintering experiment, but it does occur if this field is applied when the furnace reaches 1150° C.

If, in Eq. (2), RGB>>RC then power dissipation is dominated at the grain boundaries. A local rise in grain-boundary temperature would lower RGB, which, in turn, would impel greater power dissipation, thus leading to the instability shown in FIG. 1. At the same time, an increasing grain-boundary temperature would accelerate grain-boundary diffusion producing ultrafast sintering. The explanation given above leaves two questions unanswered. First, the instability can be explained as well by Joule heating of the crystal matrix, because a rapid decrease in RC could have the same consequence as a drop in RGB. The second question is why the effect is seen at higher fields but not at a lower applied field. One point of distinction between the low field and high field behavior is that the onset of flash sintering begins below 1000° C., while field-enhanced sintering (FAST) occurs above this temperature. This is also the temperature where the necks at particle-particle contacts begin to grow.[10] The runaway effect is more likely when Joule heating can be concentrated at the boundaries, which is most likely when the contact area at particles is small and its resistance is high. This effect was confirmed in an experiment where the sintering experiment was started with zero field until reaching 1150° C., at which point a field of 40 V/cm was applied. As shown in FIG. 3, flash sintering occurred when the field was applied after reaching 1150° C., but not if applied from the start of the experiment. The interpretation is that when the field is applied from the start, some neck growth has occurred at 1150° C. (as shown by a shrinkage of ~4%), which prevents the onset of instability. If the field is applied at 1150° C., then the absence of neck growth means that interface resistance is high, which allows the field to produce the instability.

2. Estimate of Grain Boundary Temperature

It is possible to estimate the local temperature at the grain boundaries by comparing the sintering rates (at the same density), by means of Eq. (1). The activation energy for self diffusion in 3YSZ is well characterized from creep experiments, which like sintering, are controlled by grain boundary self diffusion[12]. Its value ranges from 480-533 kJmol$^{-1}$. We assume an average value of 500 kJmol$^{-1}$ for the following analysis. Note that the sintering rate also depends on the density: this can be factored out by comparing the sintering rates measured at the same density. The grain size in Eq. (1) is assumed to remain constant since grain growth is usually insignificant when the porosity remains interconnected (open porosity), as is the case when relative densities that are less than 0.8[13].

We now apply Eq. (1) to estimate the grain boundary temperatures subject to the constraints described above. If $\dot{\rho}_0$ is the densification rate under zero applied field at temperature $T_0$, and $\dot{\rho}_E$ is the densification rate measured under an applied field, both densification rates having been measured at the same relative density, then it follows from Eq. (1) that:

$$\ln\left(\frac{\dot{\rho}_E T_E}{\dot{\rho}_0 T_0}\right) = \frac{Q_B}{R}\left(\frac{1}{T_E} - \frac{1}{T_0}\right) \quad (3)$$

where the activation energy for self diffusion, $Q_B$=500 kJmol$^{-1}$. The effective grain boundary temperature, $T_E$, can now be estimated from Eq. (3). The values for $T_E$ for different densities calculated in this way are given in Table 1. The top row gives the values for the furnace temperatures corresponding to five levels of relative density, ranging from 0.55 to 0.75, without an applied field. The values with the applied field refer, on the left, to the furnace temperature, $T_0$, and on the right to the estimated grain boundary temperature, $T_E$. The data are separated into two segments, the upper set referring to FAST sintering and the lower set to Flash sintering.

Consider first the FAST sintering data. Here the estimated grain boundary temperatures, with an applied field, are close to the furnace temperature without the applied field. For example for ρ=0.65 the furnace temperature without the applied field is 1334° C., whereas in FAST sintering the estimated temperature is 1345° C. at 20 Vcm$^{-1}$ and 1365° C. at 40 Vcm$^{-1}$. The reasonable agreement between the estimated temperature (with the field) and the measured temperature (without the field) is satisfying.

In the case of flash sintering the estimated grain boundary temperatures increase dramatically. The difference between the estimated and the furnace temperature increases to 350° C. at a field of 60 Vcm$^{-1}$, and to 850° C. at a field of 100 Vcm$^{-1}$.

Estimate of Joule Heating by Power Dissipation and Black Body Radiation

If specimen is considered as a monolithic body, which heats up uniformly, then the rise in temperature may be calculated by equating black body radiation to the power dissipation in the specimen by the applied field. The analysis leads to the following equation[6]:

$$\frac{\Delta T}{T_o} = \frac{W}{4A\sigma T_o^4} \quad (4)$$

Here $\Delta T$ is the increase in the temperature of the body due to Joule dissipation of electrical energy, given by W. The total surface area of the specimen (assumed to be the gage section) is equal to A, and σ is the black body radiation constant equal to σ=5.67*10$^{-8}$Wm$^2$K$^{-4}$. As before, the furnace temperature is given by $T_0$. For our experiments A=1.9*10$^{-4}$ m$^2$. Substituting the range of values from the experiments, the increase in the specimen temperature is predicted to no greater than 10° C., much less than the estimated increase in the grain boundary temperature.

The discussion above draws a distinction between field assisted sintering of ceramics and metals. Refractory metals, e.g. Mo and W, are sintered, even today, by electrical resistive heating, as taught in a patent dating back to 1906[14]. In these experiments the primary function of the applied fields is to heat the entire specimen directly with electrical currents: a mechanism quite different from the proposed local heating of grain boundaries in ceramics 3. Closing Remarks The results in FIG. 1 draw a distinction between FAST sintering, where there is a gradual increase in the sintering rate with applied field, and flash sintering where sintering occurs nearly instantaneously above a threshold value of the applied field, at remarkably low temperatures. The field enhanced sintering in the FAST regime has been successfully explained in terms of the effect of and electrical field on reduced rate of grain growth[6]. However, the grain size of the sample that was flash sintered at 850° C. was measured to be 150 nm (first by SEM and then confirmed by TEM), not remarkably different from the grain size in specimens sintered by the FAST method. The inference is that flash sintering is not due to reduced grain size under the applied field, but due to enhanced kinetics, which has led us to propose a rapid rise at grain boundaries as a possible mechanism for flash sintering. It would be a mistake to discard other possible mechanisms for this unusual behavior, for example the kinetics may be enhanced by the "nucleation" of Frenkel defects (vacancy interstitial pairs) under the driving force of an applied electrical field. Alternatively, the high applied fields may interact nonlinearly with the intrinsic fields present across the space charge layers adjacent to grain boundaries, thereby producing a catastrophic change in self diffusion at grain boundaries.

It is well to keep in mind that platinum electrodes are blocking, that is they transport electrons, not oxygen ions. At the cathode the neutral oxygen must be reduced to oxygen ions. If the currents are so large that the oxygen cannot be replenished from the environment, or if the environment is essentially inert, then high fields and currents can produce electrolytic reduction of the oxide, which can be seen as blackening of zirconia near the cathode. In the present experiments such blackening was not observed.

Conclusions

The flash sintering phenomenon is expressed by a sudden sintering event when a certain temperature is reached for a given applied field. In 3YSZ we find that the fields must be greater than a critical value, above 40 $Vcm^{-1}$. As the field is increased the temperature for the onset of flash sintering becomes lower and lower. In the present experiments, 3YSZ specimens could be sintered in a few seconds at 850° C. at a field of 120 $Vcm^{-1}$. The proposed mechanism for flash sintering is preferential Joule heating at the grain boundaries, especially when initiated in the early stages of sintering when particle-particle contacts are just beginning to develop. When the relationship between the sintering rate and temperature is applied to the data, then grain boundary temperature that is 585° C. above the furnace temperature is estimated for an applied field of 100 $Vcm^{-1}$. The energy input to induce flash sintering is only 1 W, which translates into a temperature rise of 10° C. in the specimen as a whole when analyzed by black body radiation, far below the estimated increase in the grain boundary temperature. Flash sintering, can lead to considerable energy savings in the processing of ceramics.

TABLE 1

Table 1: Estimates of grain boundary temperature, $T_E$, at different applied electric fields at different values of relative density, ρ. The temperature $T_0$ refers to the grain boundary temperature without an applied field. The top row refers to the zero field case, and the data refer to the furnace temperatures at different values of the density. All experiments were carried out at a constant heating rate of 10° C. $min^{-1}$.

| | Field | | | | | | | | | |
|---|---|---|---|---|---|---|---|---|---|---|
| | ρ = 0.55 | | ρ = 0.60 | | ρ = 0.65 | | ρ = 0.70 | | ρ = 0.75 | |
| $Vcm^{-1}$ | $T_0$ °C. | $T_E$ °C. | $T_0$ °C. | $T_E$ °C. | $T_0$ °C. | $T_E$ °C. | $T_0$ °C. | $T_E$ °C. | $T_0$ °C. | $T_E$ °C. |
| 0 | 1244 | | 1303 | | 1334 | | 1362 | | 1387 | |
| | | | | "FAST" Sintering | | | | | | |
| 20 | 1195 | 1247 | 1237 | 1315 | 1265 | 1345 | 1288 | 1388 | 1301 | 1421 |
| 40 | 1138 | 1252 | 1175 | 1324 | 1195 | 1365 | 1208 | 1398 | 1219 | 1434 |
| | | | | Flash Sintering | | | | | | |
| 60 | 1014 | 1358 | 1017 | 1454 | 1018 | 1494 | 1020 | 1541 | 1020 | 1577 |
| 75 | 990 | 1417 | 991 | 1532 | 991 | 1571 | 991 | 1607 | 991 | 1641 |
| 90 | 935 | 1428 | 935 | 1561 | 936 | 1608 | 936 | 1649 | 936 | 1689 |
| 100 | 912 | 1470 | 912 | 1636 | 912 | 1683 | 912 | 1730 | 912 | 1770 |

Example 2

Field Assisted and Flash Sintering of Alumina and its Relationship to Conductivity and Mg—O Doping Introduction In the present work we study the applicability of flash sintering to alumina, which, in contrast to the materials studied so far[15-21] is a poor electrical conductor. We show that fields higher than 500 V/cm trigger flash sintering in MgO-doped alumina, while the same fields have little effect on the sintering of pure-alumina. As was the case in other ceramics[15-21], the onset of flash sintering in alumina is accompanied by a surge in the current. Therefore, phenomenologically speaking, MgO-doped alumina and yttria doped zirconia show the same "flash" effect even though one is essentially a stoichiometric compound while the other is highly non-stoichiometric.

Experimental

1. Flash Sintering

Figure 4:
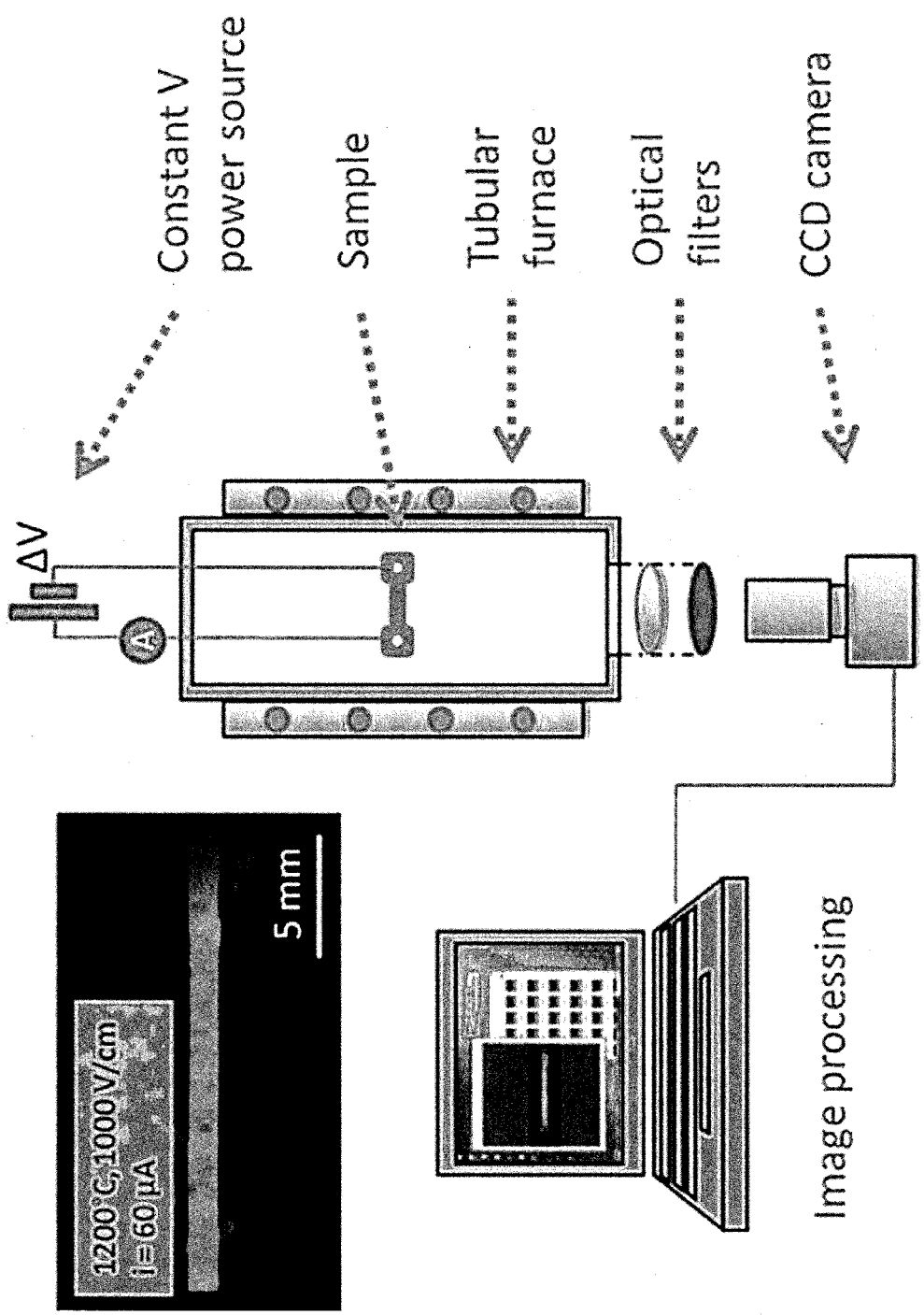
FIG. 4 depicts a field-assisted sintering apparatus.

The setup for the flash sintering experiments[15] is sketched in FIG. 4. This method is adapted from conventional sintering: the difference being that an electric field is applied by means of two platinum electrodes. The electrodes wires also serve the purpose of suspending the specimen into the hot-zone of the furnace. The change in the physical size of the sample is measured from pictures acquired with a CCD camera through an optical low pass filter and a silica window[24]. The shrinkage strain was calculated as the true strain, $\in = \ln(l/l_o)$, where l is the time dependent gage-length and $l_o$ is the initial gage length.

In the present experiments a constant voltage was applied to the specimen, while the furnace temperature was increased at 10° C./min up to 1400° C., followed by an isothermal hold of 1 h. The current was limited at the power supply to 60 mA. Often flash sintering is seen during the ramp-up in the furnace temperature; the voltage supply was turned off just after this event.

2. Materials

The starting powder was AKP-50, High Purity Alumina from Sumitomo, specified to be >99.99% pure, and having a particle size of 100-300 nm The powders were used either as-received, or doped with 0.25 wt % MgO. The doping was performed by adding the powder to a solution of magnesium nitrate and distilled deionized water. The suspension was dried and ground in a mortar. The powder (doped or as received) was mixed with 5 wt % polyvinyl alcohol (mw 49000, Fluka) in water. The slurry was dried at 90° C. in an oven and ground to a powder in mortar and pestle. The resulting powder was uniaxially pressed at 280 MPa in a dog bone shaped die, to a green density of 0.55±0.01 of the theoretical density of $\alpha$-$Al_2O_3$ (3.99 gcm$^{-3}$). The dimensions of the cold-pressed, green sample are given in FIG. 5.

For clarity, form here onwards the MgO-doped alumina is referred to as simply MgO-alumina. Experiments were also carried out with undoped, nominally pure-alumina. In these cases the material is simply called pure-alumina.

3. DC Electrical Conductivity

The electrical current, or the dc electrical conductivity was measured in different types of experiments: (i) in the powder performs during the sintering process, (ii) in samples that had been sintered to full density by conventional sintering prior to the measurement of the conductivity, and (iii) by applying electrical fields of different amplitudes to samples prepared by conventional sintering, both as the applied fields were ramped up into the non-linear regime, and then lowered back down. The purpose of the last set of experiments was to determine if the non-linear increase in conductivity created defects that left a residual effect in the ceramic.

The temperature of the samples was raised (and then lowered) in steps of 50° C. between the range of 800° C. and 1400° C., taking care that steady state current was achieved at each temperature before the measurement was taken, which usually occurred within 10 s. In some instances the field was applied for longer times, to study the current versus time profile. The specific conductivity is calculated according to the following relation:

$$\sigma = \frac{il}{Vwt} \quad (5)$$

Where i is the measured current, V is the applied voltage, l the length, and w and t the width and the thickness of the gage section. The conductivity is calculated according to Eq. 5, by simplifying the geometry of the gage section to a constant cross section with initial dimensions of 3.3×1.8×20 mm.

The conductivity was measured in the two electrode configuration instead of the four point method, because it was difficult to apply four electrodes to a green sample undergoing sintering. The two electrodes test method is less accurate than the four point method because it includes the contact resistance. However, the two electrode method is likely to be valid provided the current reaches a steady state at constant field. Results reported later in the paper show that the steady state was reached in just a few seconds in the Ohmic regime. Also, the values of the conductivity we measure fall well within the nominal range reported in the literature[25,26].

4. Microstructure

The grain size was measured from images taken with a JSM-7401F field emission SEM (JEOL). Specimens were prepared by thermal etching for 30 min at 1100° C., followed by coating with a with a 2 nm layer of Au—Pd. The mean grain size was determined by the linear intercept method, with a correction factor of 1.56.

Measurements of Strain and Conductivity During the Sintering Process

1. Conventional Sintering (without Field)

Figure 6:
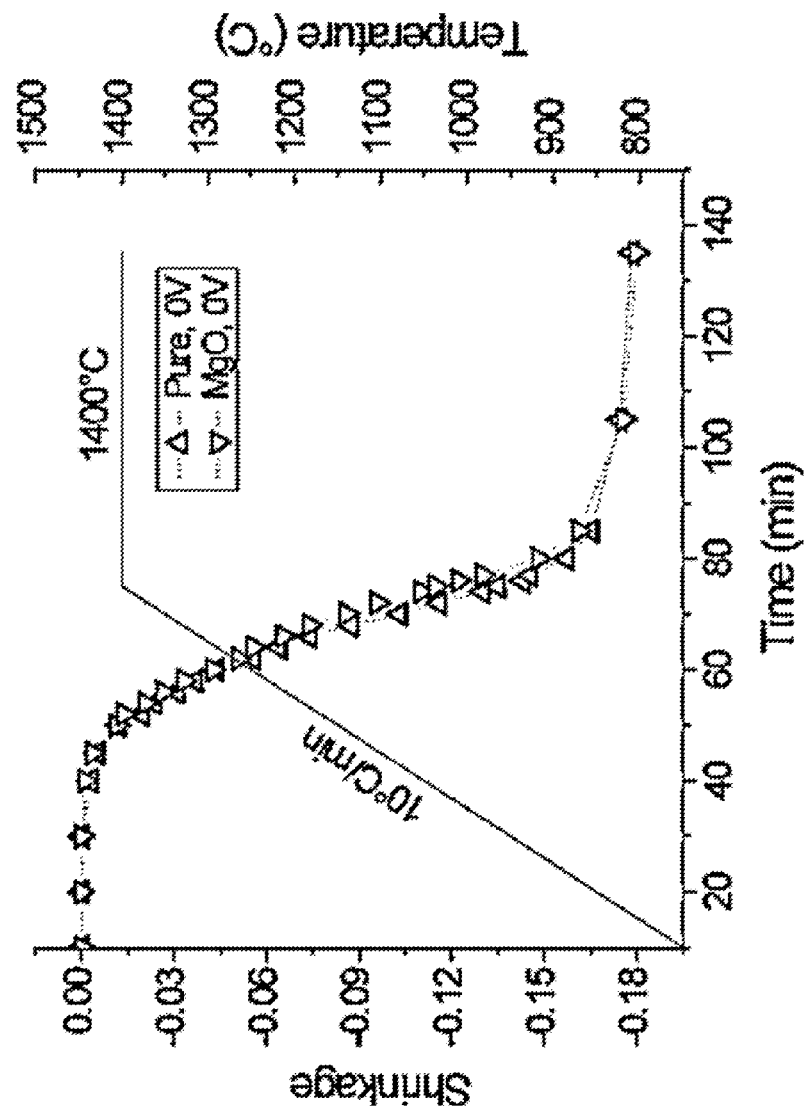
FIG. 6 depicts conventional sintering at a constant heating rate.

The shrinkage strain versus temperature data for nominally pure and MgO-alumina without applied field (at 0V) are given in FIG. 6. The temperature was ramped up to 1400° C. at a heating rate of 10° C.min$^{-1}$ and then held at that temperature for 60 min. In both cases the final density is reached at a shrinkage strain of −0.18 which occurs at about mid-way during the holding period at 1400° C. Both pure and MgO-alumina show similar sintering behavior. In the intermediate regime the doping has the effect of slightly delaying the sintering rate (upon reaching 1400° C., the shrinkage of pure and MgO—$Al_2O_3$ are −0.135 and −0.115, respectively). However after 1 h isothermal hold, the sintering curves merge and the final shrinkage strains are nearly the same (−0.180 versus −0.178).

The use of MgO as a dopant is known to eliminate intragranular pores and refine the grain size, producing translucent alumina[27]. The effect of MgO on sintering rate is not new: in conventional sintering[28], two steps sintering[29] and in spark plasma sintering[30], MgO was observed to slightly retard densification in the intermediate stage of sintering, but to have a positive effect in the last stage of sintering. The segregation of MgO to grain boundaries is believe to retard the initial shrinkage[28], and accelerate the final shrinkage[28] by preventing the breakaway of pores from the grain boundaries during grain growth[31].

2. Field Assisted Sintering

Figure 7:
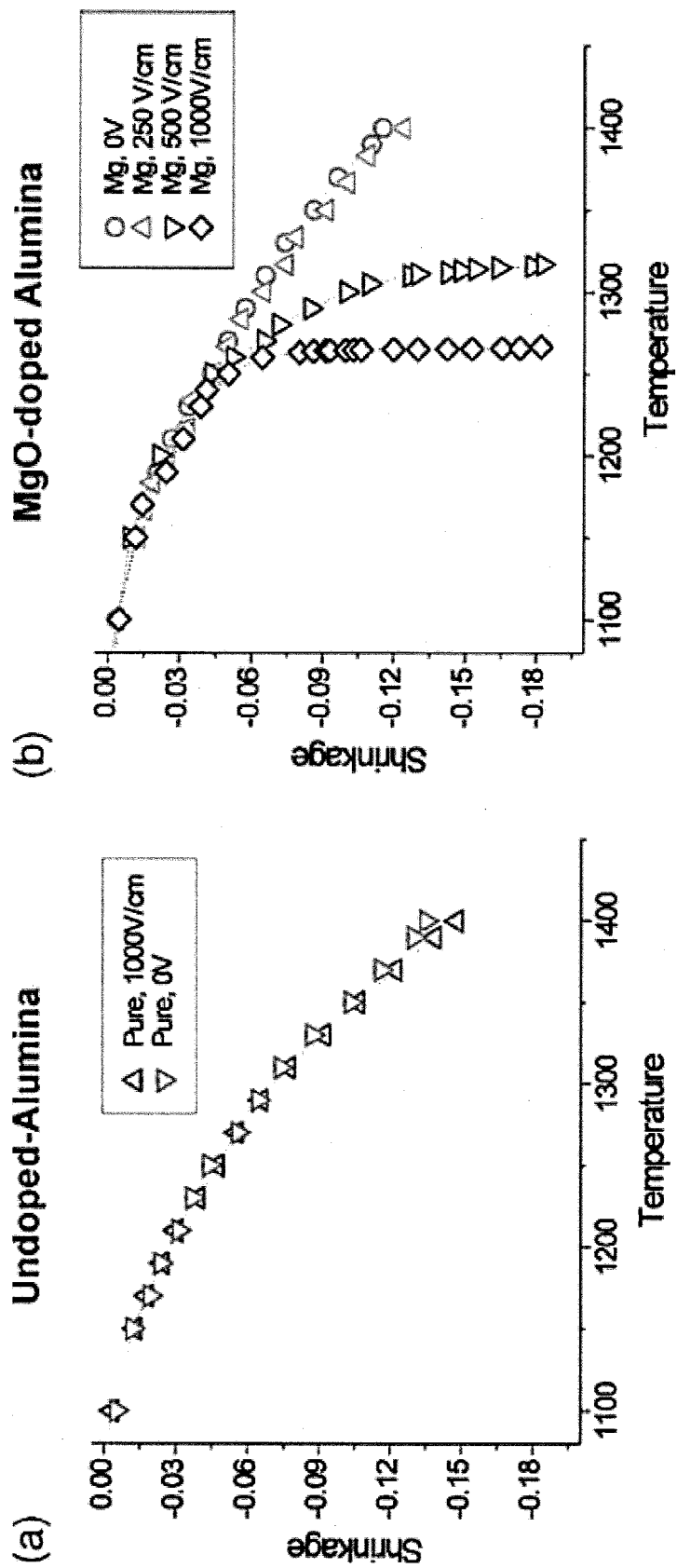
FIG. 7 depicts the influence of applied electric field on the sintering behavior of pure-alumina (a), and doped alumina (b), in experiments carried out at a heating rate of 10° C. min-1.

The shrinkage curves for constant heating rate (10° C. min$^{-1}$) experiments are reported in FIG. 7. These experiments did not include an isothermal hold at 1400° C. The data for pure-alumina is given on the left in figure (a), which are compared to the data for MgO-alumina on the right in (b). The data for 0V (without field) is compared to the shrinkage behavior at field strengths of 250-1000 Vcm$^{-1}$.

The data for pure-alumina in FIG. 7(a) shows that the sintering behavior with a field of 1000 Vcm$^{-1}$ is only very slightly higher than the sintering rate obtained in conventional sintering (without applied field). In either case full density is not reached at the end of the ramp up to 1400° C. (the microstructure confirms a porous structure). The shrinkage strains at the end of the experiments were −0.135 with the field, and 0.148 without the electrical field.

In contrast to pure-alumina, the dc field has a remarkable effect on the sintering of MgO—$Al_2O_3$. Three sets of data are given, at 250 Vcm$^{-1}$, 500 Vcm$^{-1}$ and 1000 Vcm$^{-1}$. The effect of the field is minor at 250 Vcm$^{-1}$, with a strain of only −0.124 being achieved at 1400° C. But at higher fields flash sintering[15,17,18,21] is observed. At 500 Vcm$^{-1}$ full densification strain of −0.182 is obtained at 1320° C., and at 1000 Vcm$^{-1}$ densification occurs at just 1260° C. The shape of the sintering curves are noteworthy in that sintering follows the behavior seen in conventional sintering in FIG. 7(a), until the "flash event", when the sintering curves assume a nearly vertical posture, with full densification achieved within a few seconds. However, the curve for 500 Vcm$^{-1}$ suggests an incubation time for the onset of flash sintering, which is nearly absent, or very brief, at 1000 Vcm$^{-1}$. It is possible that a slower rate of heating would shorten the incubation time. At 10° C.min$^{-1}$ the lowest field for inducing flash sintering appears to be ~500 Vcm$^{-1}$, but it may be that lower heating rates can induce flash sintering at lower fields.

3. Power Dissipation

The power dissipation in the specimen is equal to the product of the applied voltage and the current flowing through the specimen. In earlier experiments with other oxides[15,18] we have found that the onset of flash sintering is accompanied by a surge in power dissipation. The present experiments are consistent with this behavior. The data are plotted in Arrhenius form since the increase in (steady state) current with temperature is expected to be thermally activated, which, given a constant value for the activation energy, would appear as a straight line with a negative slope, since the experiments are carried out at a constant applied voltage. (This assumption is not strictly correct since the length and the cross-section of the specimen, as well as its porosity are changing as the sample sinters. However, the errors tend to cancel: for example while the gage length becomes shorter which would increase the specific conductivity, the cross section also shrinks which would decrease the conductivity. Although the cross-section decreases the conductivity at twice the rate as the length increases it—because the cross-sectional strain is twice the linear strain—this difference is further compensated by the reduction in porosity which would tend to increase the conductivity. These compensating effects justify the use of the initial dimensions of the specimen as an approximate estimate of the specific conductivity of the specimen while it sinters.)

We recall from FIG. 7 that a field of 1000 Vcm$^{-1}$ had little effect on the sintering behavior of pure-alumina, while it induced flash sintering at ~1260° C. in MgO doped-alumina. This behavior is reflected in the Arrhenius plots of power-dissipation shown in FIG. 8b. While the pure-alumina follows an essentially Arrhenius behavior, the MgO-alumina exhibits a power surge that coincides with the onset of flash sintering. The power dissipation curves for lower fields in MgO-alumina are given in FIG. 8b. A sharp increase in power-dissipation is seen at 500 Vcm$^{-1}$, where flash sintering is seen, but not at 250 Vcm$^{-1}$, which did not appear to induce flash behavior. However, the slope of the curve at 250 Vcm$^{-1}$ deviates from linearity, unlike the data for the pure-alumina at 1000 Vcm$^{-1}$ given FIG. 8(a). This result suggests the onset of non-linear behavior to some degree at 250 Vcm$^{-1}$, but not strong enough to precipitate flash sintering which occurs when the field is increased to >500 Vcm$^{-1}$. The hesitation in the power surge is evident even at 500 Vcm$^{-1}$; it may reflect an incubation time for the onset of flash sintering seen in FIG. 7(b). In this respect that data appear to have a different exposition as compared to the earlier experiments with yttria doped zirconia where flash sintering occurred abruptly without an inkling of an incubation time.

Finally it is to be noted that application of 1000 Vcm$^{-1}$ to the pure-alumina sample led to arcing and unstable conductivity when 1400° C. was reached. Perhaps the arcing would also have occurred in the MgO-alumina sample had it been ramped up to 1400° C., but did not because sintering was completed at a lower temperature.

4. Microstructure

The microstructure of the specimens was examined in a scanning electron microscope.

Figure 9:
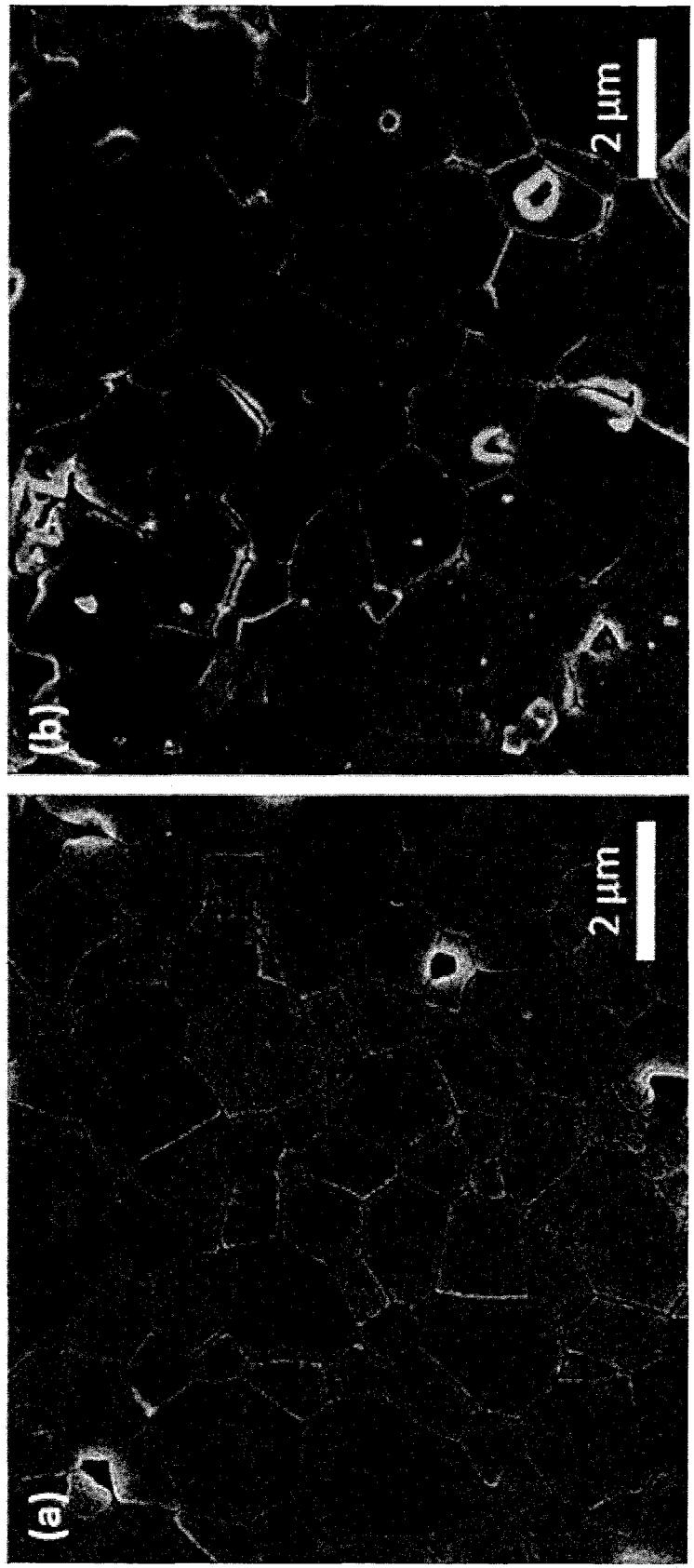
FIG. 9 depicts the microstructures of flash sintered and conventionally sintered MgO-doped alumina.

Specimens were prepared by thermal etching (30 min at 1100° C.) of the polished cross-section, followed by thin coating of Au—Pd. Two results (for MgO-doped alumina) are reported here. Both specimens had been sintered to full density, one in the conventional way, without an applied field at 1550° C. for 1 h, and the other flash sintered at 1000 Vcm$^{-1}$ at 1260° C. The micrograph from the flash sintered specimen is shown in FIG. 9(a), and from the conventionally sintered specimen in FIG. 9(b). The conventionally sintered specimen had an average grain size of 1.9 μm, while the flash sintered specimen had a smaller grain size of 0.8 μm.

Conductivity of Fully Dense, Conventionally Sintered Specimens

Figure 5:
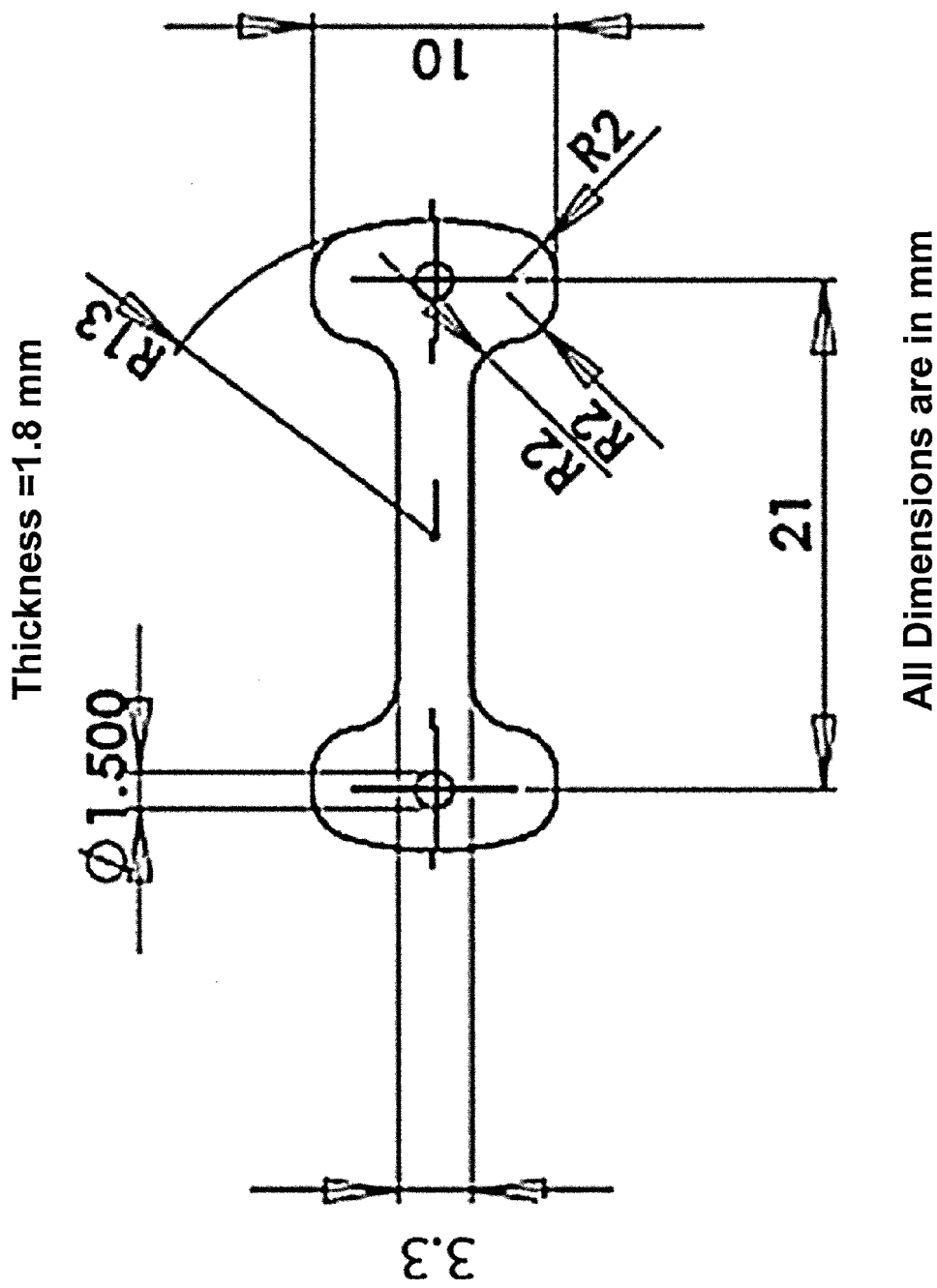
FIG. 5 depicts dimensions of the "green sample" in mm. The thickness of the samples was 1.8 mm.

The measurements reported in this section were carried out on samples that had been sintered to full density, with and without MgO doping, at 1550° C. for 1 h, by conventional sintering. The green samples had the same shape as shown in FIG. 5, they were sintered without electric field in the same furnace configuration as in FIG. 4. The electrical conductivity was measured through the platinum wire electrodes attached to the specimen in the usual way.

The experiments were carried out by a stepwise increase in the temperature. At a given temperature the current was measured at different levels of the applied voltage. At each voltage the current was measured after it had reached a steady state, which usually happened in less than 25 s (but not in doped specimens at high fields, as explained later). In this way not only the effect of the temperature, but also non-linear (deviation from Ohmic) behavior, at higher fields, could be measured. Since the physical dimensions of the specimens were the same for all experiments, the measurement of the current and voltage are equivalent to the specific conductivity as prescribed by Eq. (5). The current at a given voltage was measured by holding the field constant for 25 s. The field was then removed for 5 s before stepping up (or down) to the measurement at the next voltage.

The most notable aspect of the results presented here is the non-linearity of the conductivity when they data are plotted with the expectation of Arrhenius behavior. Normally such a plot would exhibit linear behavior reflecting the following equation:

$$\sigma = Ae^{\left(-\frac{Q}{RT}\right)} \qquad (6)$$

where σ is the conductivity, and Q is the activation energy for the conduction mechanism. Therefore, nominally, an Arrhenius plot of the conductivity yields a straight line with a slope that is a measure of the activation energy.

Figure 8:
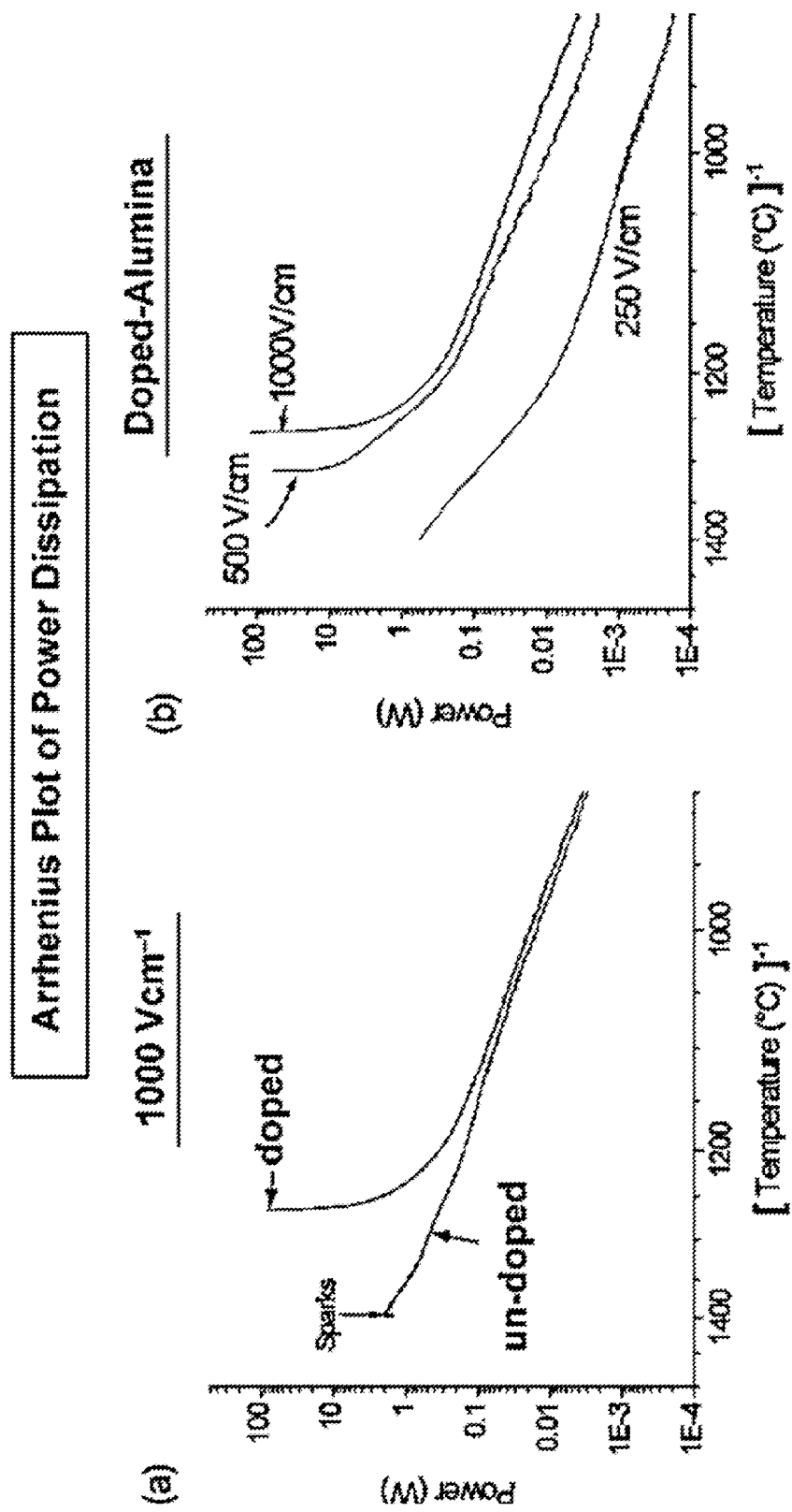
FIG. 8 depicts Arrhenius plots for the power dissipation in the specimens in MgO and pure-alumina at the high field, (a), and in MgO-alumina at different values of the applied field, (b).

As reported below we see a stark difference between the Arrhenius plots for MgO-doped and pure-alumina. These plots are similar to the power-surges that were measured while the specimens were being sintered under an electrical field (FIG. 8). That this non-linearity is also seen in specimens that had been fully sintered in the conventional way proves that the non-linear power surge is not the cause of flash sintering, but rather, it represents a phenomenon that shares the same mechanism as flash sintering.

The non-linear behavior seen in the doped specimens (as described just above) was followed by measurements of the conductivity by first increasing and then decreasing the electrical field. The amplitude of the field was varied to assess the reversibility of the conductivity, especially when the amplitude was large enough to enter the non-linear regime. We see a remarkably high residual conductivity in specimens that had been subjected to high fields, suggesting that the non-linearity is accompanied by the nucleation of new charged defects, which survive when the current is measured again at lower applied fields.

The results below are reported in the following sequence: they start with the conductivity of pure-alumina, followed by the behavior of MgO-alumina, and finally results showing the residual conductivity in MgO-alumina which had been exposed to cyclic electrical fields are presented.

1. Conductivity of Pure-Alumina

Figure 10:
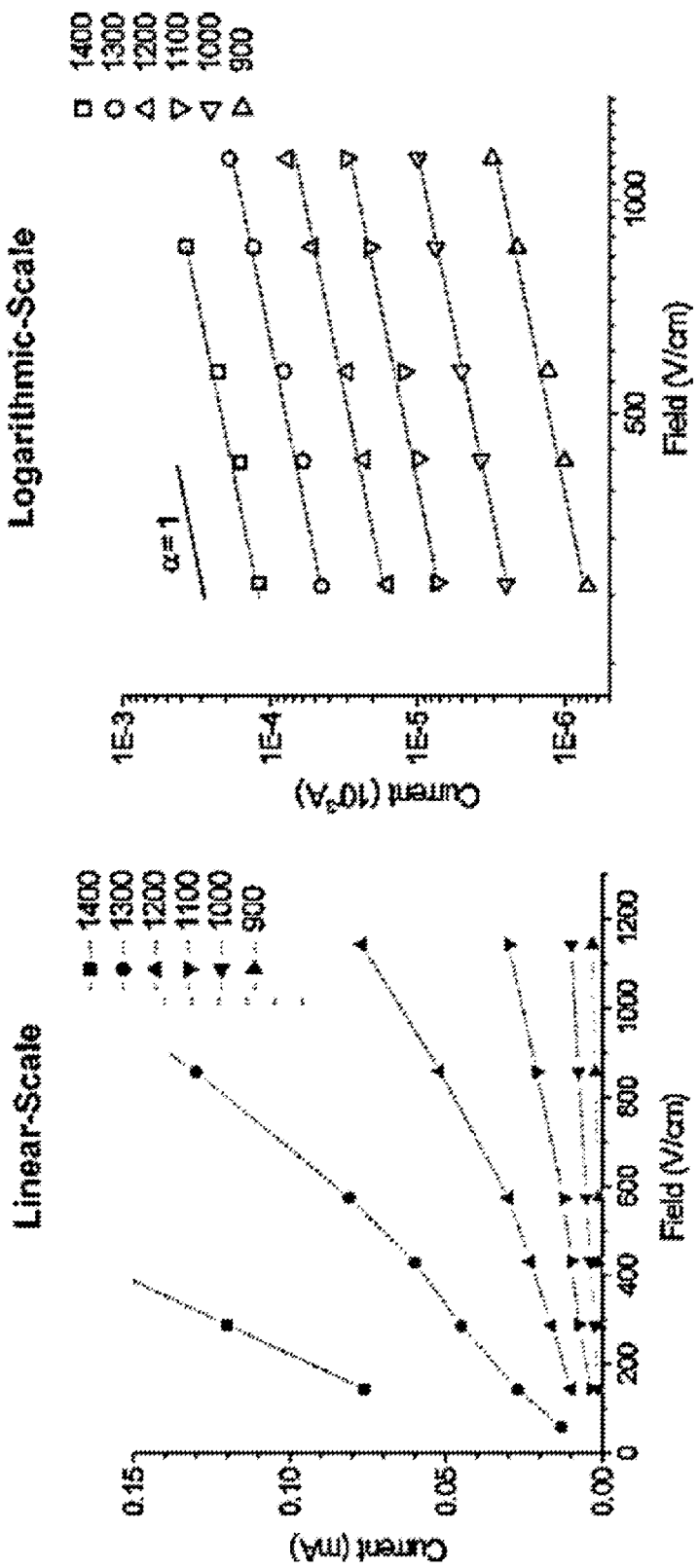
FIG. 10 depicts linear-scale and log-scale plots of the current versus the applied field for pure-alumina.

The current-field (the I-V) plots for pure specimens at temperatures from 900° C. to 1400° C., in steps of 100° C., are given in FIG. 10. Plots using linear axes are shown on the left, and those with logarithmic axes on the right. The electric fields range up to 1000 $Vcm^{-1}$, the same range that was used in the sintering experiments. At all temperatures, and for the full range of the electrical fields the plots are essentially linear. The non-linearity may be defined by the parameter $\alpha$ in the following equation:

$$i \propto E^\alpha \qquad (7)$$

where $\alpha \approx 1$ implies linear behavior. The plots in FIG. 10(a) show small non-linearity at fields greater than 500 $Vcm^{-1}$, which is likely from some Joule heating in the specimen. The log-log plots in FIG. 10(b), however, cannot distinguish the small non-linearity that is evident in (a).

Figure 11:
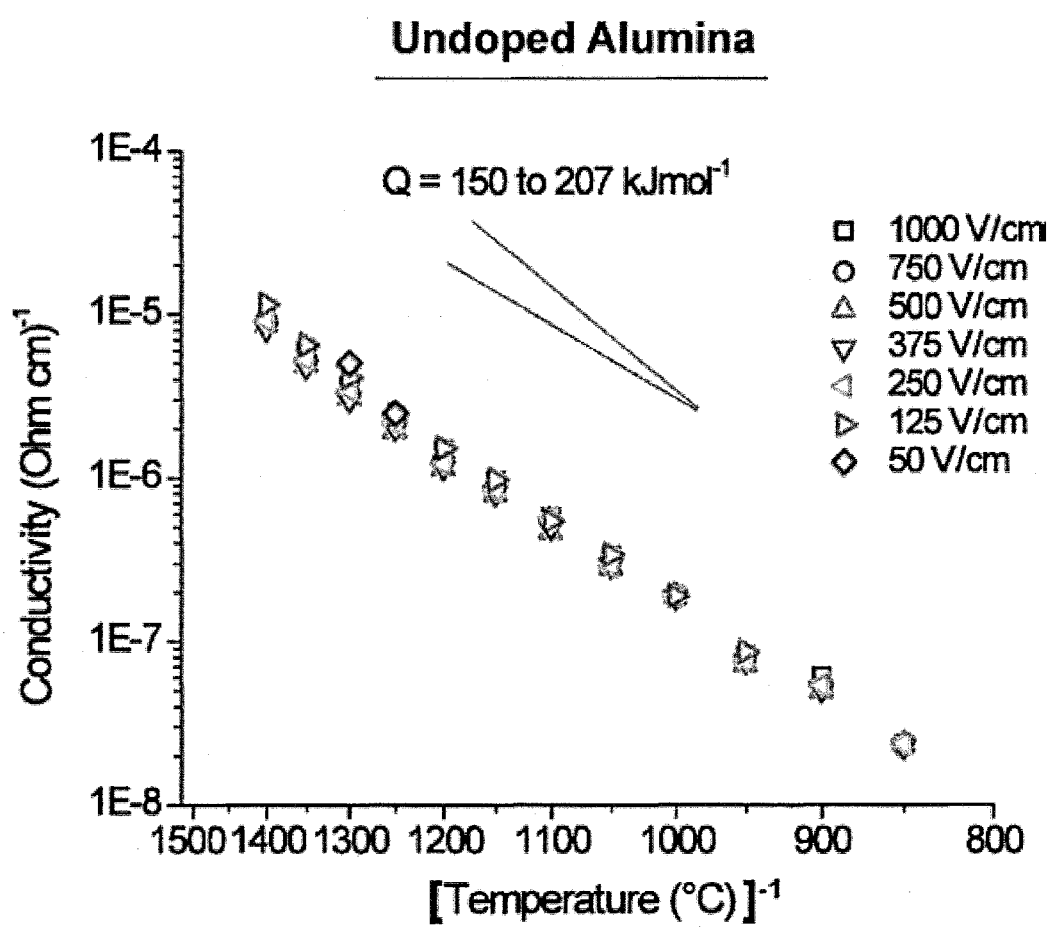
FIG. 11 depicts an Arrhenius plot of the conductivity of sintered pure Al2O3, measured under different dc fields.

The upward shift in the lines in the log-log plot as the temperature is increased reflects thermally activated conduction of charged defects. The Arrhenius plot of the conductivity at different temperatures is given in FIG. 11. All data fit into a reasonable straight line, whose slope yields and activation energy in the 150-207 $kJmol^{-1}$ range. Note this low value of the activation energy most likely precludes the possibility of ionic diffusion. In high likelihood, the conductivities being measured here are electronic conductivities. Since the metal electrodes do not block the transport of electrons across the metal-ceramic interface, we expect to reach the steady state current rather quickly, which was indeed the case (in less than a few seconds).

2. Conductivity of MgO-Doped Alumina in Dense Samples

The measurements of the conductivity in MgO-alumina was complicated by the non-linear behavior at fields greater than ~250 $Vcm^{-1}$. In the non-linear regime a steady state value for the current could not be achieved within 25 s, indeed the current continued to increase with time. The field was increased in steps up to 750 $Vcm^{-1}$. A dead period of 5 s was allowed between one field and the step up to the next field. At temperatures above 1200° C. and high fields, the current does not reach a steady state but increased steadily to the maximum allowed by the power supply (60 mA). These "cut-off", non-steady state currents are reported as solid data points in FIG. 13.

Figure 13:
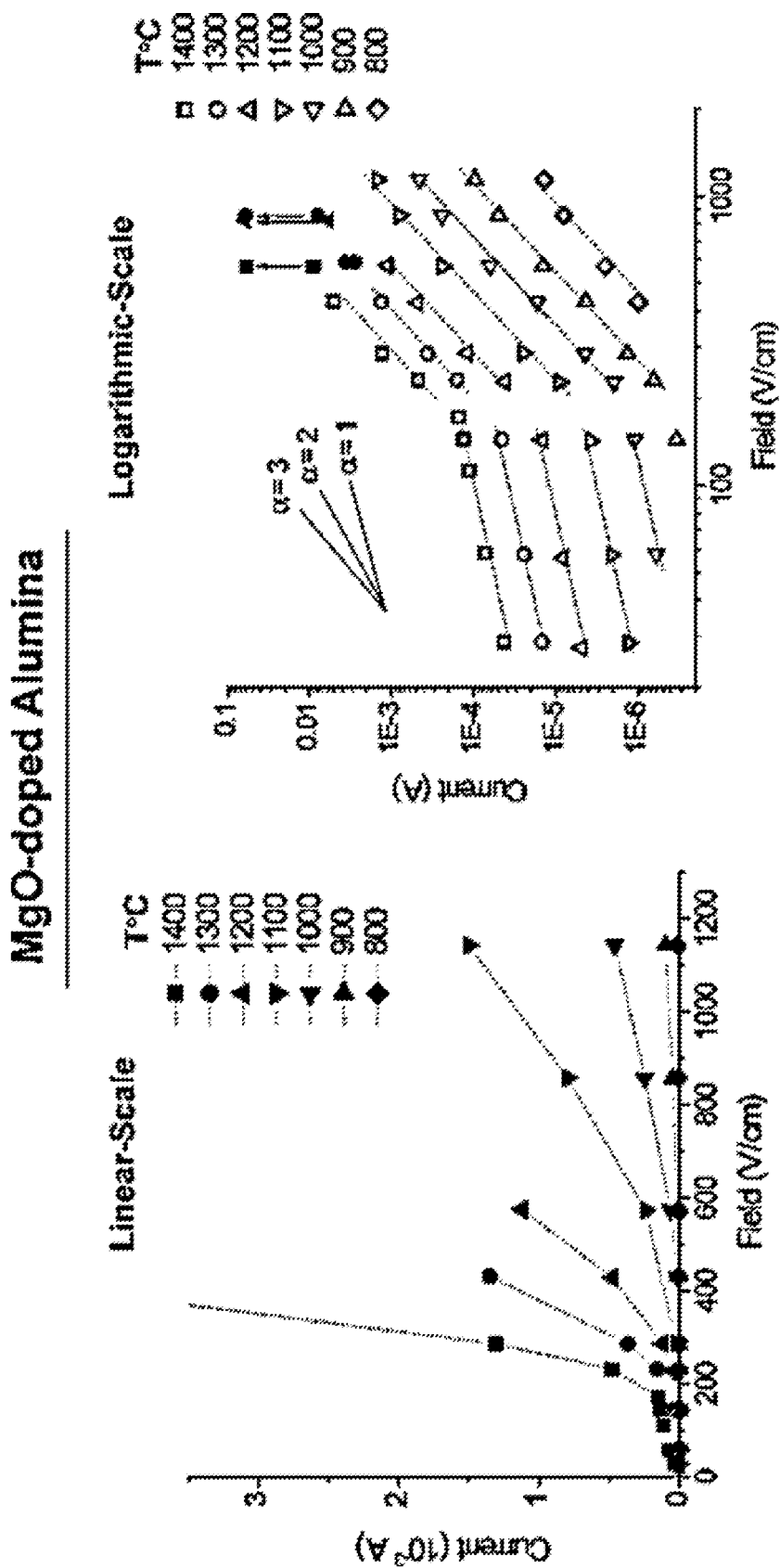
FIG. 13 depicts an Arrhenius plot of the conductivity of sintered MgO—Al2O3, measured under different dc fields.

The linear-scale and log-log plots for the current versus field are given in FIG. 13. They show that the behavior is essentially linear below ~200 $Vcm^{-1}$, and non-linear above this field, regardless of the temperature. The temperature was varied from 800° C. to 1400° C.

Because of the wide spread in the values of the current, arising from the non-linear behavior, the log-log plots are more definitive in showing the transition to from linear to non-linear behavior. Note that the value for $\alpha \approx 1$ in the linear regime, but increases to $\alpha \geq 3$ in the non-linear regime. The slopes are temperature independent, and the transition between quasi-ohmic and non-ohmic conductions appears always at the same field intensity, regardless of the temperature. These results, for MgO-alumina, stand in contrast to the measurements for pure-alumina, that were reported in FIG. 11, where the behavior remained linear throughout the range of the applied field, at all temperatures.

The Arrhenius plot for the conductivity for MgO-alumina is shown in FIG. 13. It is to be contrasted to the data for pure-alumina that was presented in FIG. 11. The contrast is remarkable. Whereas, all the points, obtained at various levels of applied field, converge to a single line in pure-alumina, in the case of MgO-alumina the points spread out to different lines for different applied fields. However, the slopes for all the linear plots for MgO-alumina are the same as for pure-alumina, yielding similar activation energies. For MgO-alumina the activation energies lie in the range of 155-222 $kJmol^{-1}$, while for pure-alumina they fall between 150-207 $kJmol^{-1}$. There is a hint of two slopes at fields below 500 $Vcm^{-1}$ —155 $kJmol^{-1}$ below 1050° C. and 220 $kJmol^{-1}$ above 1050° C.—but the difference is not large enough to be definitive. At higher fields (above 500 $Vcm^{-1}$) the data fit nicely to a single straight line throughout the temperature range with an activation energy of 210 $kJmol^{-1}$.

Figure 12:
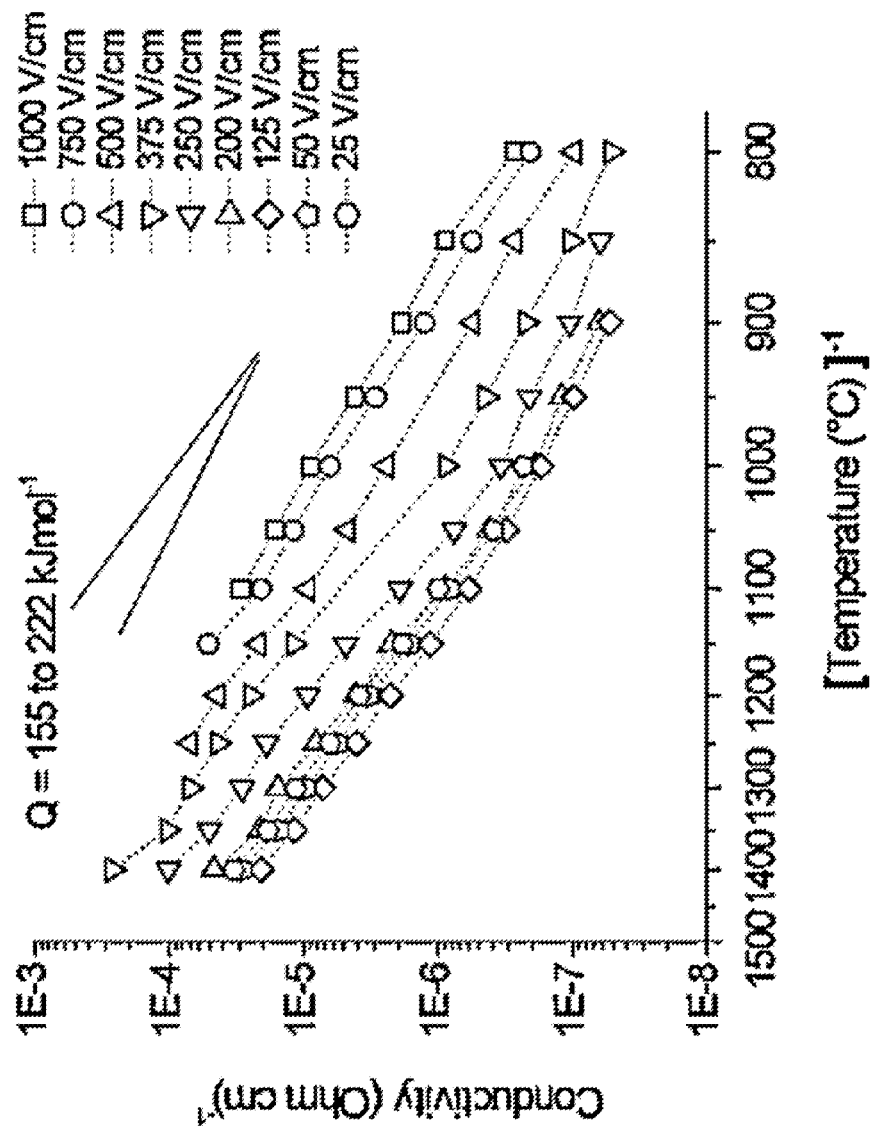
FIG. 12 depicts current as a function of the dc field in sintered MgO—Al2O3, at different temperatures.

The most significant distinction between the Arrhenius plots for pure and MgO-alumina is the dispersion in the lines for the data at different fields for MgO-alumina, but the coalescence of the data into a single line for the pure-alumina. In the doped case the lines move to higher values of the current as the field is increased. Despite the dispersion in the lines, the activation energies remain the same for all measurements. The results, therefore, show that the pre-exponential in Eq. (6) changes with the field in the MgO-alumina, but remains constant for pure-alumina. Since Q reflects the activation barrier for the mobility of the charged defects, while the pre-exponential is related to the concentration of the defects, we infer that the field has the effect of increasing the concentration of defects in MgO-alumina. This effect appears to be more pronounced above 500 $Vcm^{-1}$, where there is a greater dispersion of the lines for the data in FIG. 12b, than below this field.

3. Residual Conductivity after Cycling MgO-Alumina into the Non-Linear Regime

We have hypothesized that the onset of non-linearity in conductivity arises from the increase in the defect concentration which enhances the pre-exponential in Eq. (6). If this is the case then it is also likely that some fraction of these defect concentrations survive when the applied field is traversed downwards. The results from these experiments are reported in this section. Indeed, they show considerable residual conductivity when the samples are cycled between increasing and decreasing applied fields. This effect is seen only in the MgO-alumina; this is self-evident since pure-alumina did not exhibit non-linear increases in conductivity at high fields.

Figure 14:
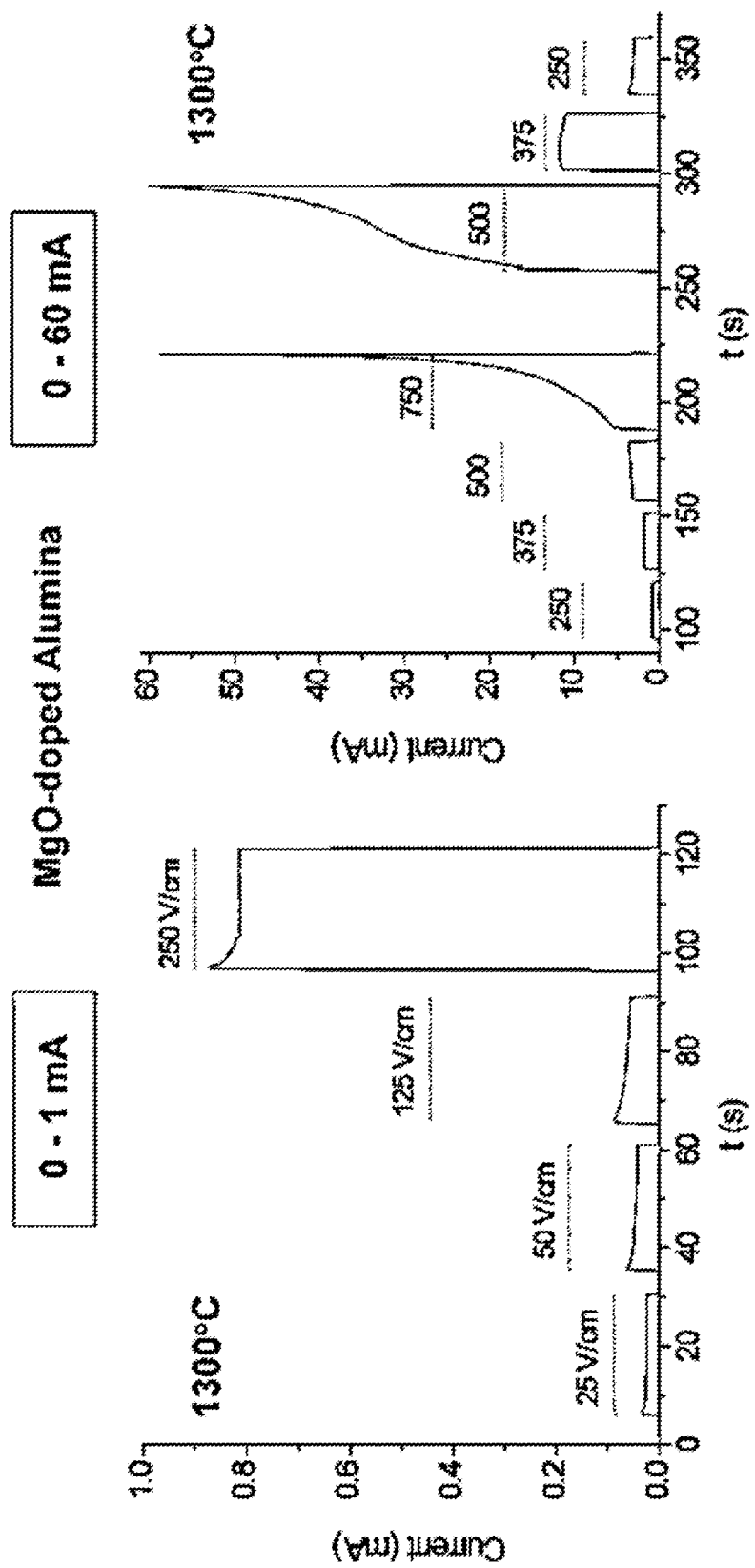
FIG. 14 depicts current as a function of the time in sintered MgO doped Al2O3, under a field of 25 to 250 V/cm, and 250 to 750 V/cm.

The time dependent change in the current, in a specimen held at 1300° C., when the applied field is first increased in steps, up to 750 $Vcm^{-1}$, and then stepped downwards, are given in FIG. 14. The field is held for 25 s at a given field, which is followed by a dead period of 5 s before the next step in the field is applied. The data are divided into two figures, the one on the left covers currents from 0-1 mA and the one on the right from 0-60 mA. The results for fields up to 250 $Vcm^{-1}$ are shown in the first figure and those for fields up to 750 $Vcm^{-1}$ in the second figure.

In the low field regime (up to 250 $V^{-1}$) the current usually decreases after the application of the field before settling down to a steady state. However, at fields $\geq$500 $Vcm^{-1}$, the current continues to increase with time.

The data given on the right in FIG. 14, show the current-time profile when the applied field is stepped down from 750 $Vcm^{-1}$ to 500 $Vcm^{-1}$, and then to 375 $Vcm^{-1}$, and finally down to 250 Vcm$^{-1}$. Note the much higher currents at these lower fields than were seen when the fields were being stepped upwards.

Figure 15:
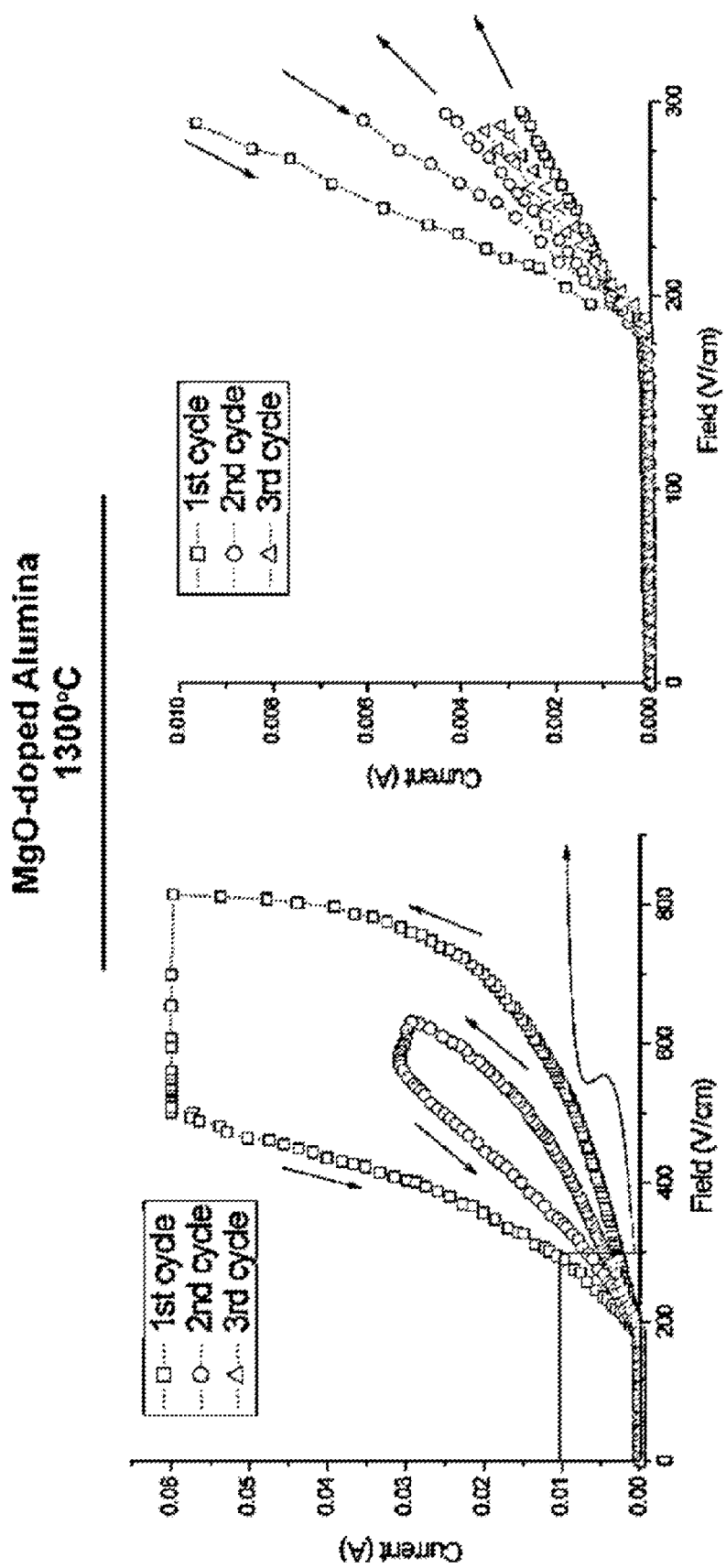
FIG. 15 depicts the cyclic, current-field response upon the application of field controlled cycles of increasing amplitude.

The hysteretic behavior described above is absent if the sample is not exposed to the non-linear regime. The results in FIG. 13 show the current-field behavior when the sample is cycled up and down in the applied field (here the applied voltage was changed continuously at a rate of 30 Vs$^{-1}$). These experiments were carried out at 1300° C., and a rest period of 30 s was allowed between the cycles. Three types of cycles were employed. In the first type the sample was raised to a field of 750 Vcm$^{-1}$, in the second type of cycles the amplitude of the field was 600 Vcm$^{-1}$, and in the third kind the maximum value of the field was limited to 300 Vcm$^{-1}$. For the 750 Vcm$^{-1}$ case the current was cut-off at 60 mA (by the power supply) which is the reason for the "flat-top" for the value of the current. Note that the current is much higher during ramp-down than during the ramp-up part of the cycle. A similar behavior, though less severe, is seen when the field-amplitude was 600 Vcm$^{-1}$. However, the behavior is linear and reversible when the amplitude was held at 300 Vcm$^{-1}$. An expanded view of the data in the lower left corner of FIG. 15a is given on the right in FIG. 15b: it more clearly shows the linear and reversible behavior at low field-amplitude. The hysteretic behavior at the higher fields may not be attributed to Joule heating since the transition from reversible to hysteretic shape of the cycles changes abruptly at a field of ~200 Vcm$^{-1}$. The supposition is that defects introduced at the high fields lead to higher residual conductivity when the fields are brought back down.

Discussion of Conductivity of Alumina from the Literature

The measurement of dc electrical conductivity of pure and MgO-doped alumina at high temperatures and high fields are unusual. They point towards electrons being the dominant transport species in both cases. A brief review of the reports from the literature is appropriate to give context to these measurements.

The values for dc conductivity of alumina reported in the literature vary over a wide range, and appear to depend greatly on purity and processing conditions[26]. Furthermore, the mechanism of conduction and the dominant charge carrier in Al$_2$O$_3$ have often been debated. In single crystal alumina it has been claimed to be predominantly electronic, ionic or mixed, and to depend on the temperature and oxygen partial pressure. For example, MgO doped Al$_2$O$_3$ single crystals have been reported to be electronic conductors at low temperatures and mixed ionic and electronic conductors at the higher temperatures and low $p_{O2}$[32]. At high temperatures the ionic conduction is explained by Al interstitials[33] or oxygen vacancies at low $p_{O2}$, while the electronic conduction is dominated by holes[34]. More recent results attribute only 0.3% of the conductivity in pure single crystals at 1200° C. to arise from ionic diffusion[35]. The measurement of the activation energy in the present experiments suggest electronic conductivity in both doped and pure-alumina at fields up to 200 Vcm$^{-1}$ in the temperature range of 800-1400° C.

The non-linear conductivity of MgO-doped alumina seen at fields 250-1000 Vcm$^{-1}$ at temperatures up to 1400° C., as measured in the present experiments, has not (to our knowledge) been reported in the literature, although a non-linear I-V behavior has been seen in thin films of alumina at low temperatures. In a recent paper, Talibi[36] shows a transition from Ohmic to "superOhmic" behavior in 0.65 nm thick 96% pure Al$_2$O$_3$ film at low temperatures, but at fields much higher than those employed in the current experiments. The transition point was not temperature independent as in the present case, but varied from 170 kVcm$^{-1}$ at room temperature to 50 kVcm$^{-1}$ at 170° C. The non-linearity was explained by space charge limited conduction. In a different study on 490 nm thick films of porous alumina the transition from quasi-Ohmic to superOhmic behavior was observed at 204 kVcm$^{-1}$ at room temperature[37]. The conduction mechanism was attributed to electron-hopping at low fields, and space charge limited conduction in the high field regime.

The conductivity in alumina is also known to increase in the presence of ionizing radiation[38,39]. The radiation induced conductivity (RIC), or radiation induced degradation (RID), increased dramatically at fields above a threshold of 500 Vcm$^{-1}$ [39]. This result was explained by an increase in the stable F-center production rate by means of either an increase in the primary vacancy-interstitial production rate or a decrease in the recombination rate[39]. This non-linear effect of the fields on conductivity at fields similar to those in the current experiments is to be noted, as is the equivalence between the nature of radiation damage and the nucleation of Frenkel pairs that is postulated to explain flash sintering.

An interesting effect of a dc field on the conductivity of MgO has been well documented[40-42]. A field of 1000 Vcm$^{-1}$ was applied for ~100 h at 1200° C. The conductivity of MgO remained constant at first, but then started to increase eventually by three orders of magnitude leading to Joule heating and electrical breakdown. This incubation time for the increase in conductivity was explained by the piling up of cation impurities and lattice defects in the vicinity of dislocations and small angle grain boundaries. Perhaps a similar aggregation of defects along the grain boundaries in Al$_2$O$_3$ could have been responsible for the results reported from the current experiments.

Summary

Pure-alumina, of nominal purity does not show field-assisted sintering under the conditions where MgO-doped alumina does. It may be possible that higher fields and temperatures could have produced flash sintering in pure-alumina. However, the maximum field and temperature that may be used would be limited by dielectric breakdown and arcing, which was observed at 1400° C. and 1000 Vcm$^{-1}$ in the pure-alumina samples.

The transition from a gradual enhancement in sintering rate to flash sintering seen in yttria-stabilized zirconia, with increasing field, is not observed in MgO-alumina. In alumina the effect of field on the sintering rate is unremarkable below a threshold field. This threshold field is ~500 Vcm$^{-1}$. Flash sintering is recorded at and above this threshold field.

The onset of flash sintering is accompanied with a non-linear increase in the conductivity of the specimen. This power surge was also seen in yttria-stabilized zirconia. However, an incubation time for this onset is present in MgO-alumina which was not observed in yttria-stabilized zirconia.

The conductivity of the alumina samples was measured in conventionally sintered, fully dense samples of alumina, independently of the sintering experiments. The non-linear increase in conductivity with applied field that was seen during flash sintering was also present in these dense samples. The effect of doping was similarly reflected in these measurements: the pure samples, which did not exhibit field assisted sintering also did not show non-linear behavior in conductivity.

The conductivity data for the pure samples remained Ohmic and well behaved over the full range of fields and temperatures in the present study. All data conformed to approximately a single valued activation energy, which was in the range of 170-225 kJmol$^{-1}$. These activation energies are far too low for ionic diffusion. The inference is that the conductivity in the present experiments was dominated by electrons and holes. The easy and quick attainment of steady state current upon application of the electric field via platinum electrodes is also consistent with the non-blocking nature of these electrodes for electronic conduction.

The conductivity of the MgO-doped samples could be separated into two regimes: below ~200 Vcm$^{-1}$ the behavior remained linear. However, at higher field the currents increased in a highly non-linear fashion. Furthermore, when the field was cycled up and down, the current during the downward portion of the cycle was greater than when the field was being increased. This hysteretic behavior became increasingly pronounced as the amplitude of the applied field was increased. The cyclic behavior was fully reversible and linear when the amplitude was kept less than 200 Vcm$^{-1}$.

The activation energy plots for conductivity in the MgO-doped samples bore similarity with, but also differed from those for the pure samples. In pure-alumina the data for all fields and temperature conformed to a single line on an Arrhenius plot. In the MgO-alumina, the data for a single value of the applied field did fit an approximate straight line, but these lines shifted parallel to one another, and upwards to higher conductivities as the field was increased. Interestingly the slope of these lines, that is the activation energy, matched the value measured for the pure samples. It is inferred that activation energy for the diffusion of conducting species was left unchanged by the applied field, but the pre-exponential which is proportional to the concentration of the charge defects increased with the applied field in the doped samples.

The confluence of the onset of non-linear conductivity (in fully dense samples) and the onset of Flash sintering in field assisted sintering experiments is noteworthy. Normally, the conductivity and sintering of ceramics is controlled by different diffusion transport mechanisms. The conductivity is determined by the fastest moving charge species, while sintering is controlled by the transport of charge neutral molecules whose overall diffusivity is controlled by the slowest moving charged species in the molecule. It follows, that the mechanism that is proposed for the flash sintering phenomenon must explain this dichotomy between transport kinetics for charge conduction and sintering.

The nucleation of Frenkel pairs under the applied field is proposed as a possible mechanism to explain the above dichotomy. In this mechanism a vacancy and an interstitial are created simultaneously for both the cations and the anions. The Frenkel pairs carry opposite charge relative to the lattice, one carrying an electron and the other a hole. It is proposed that the electrons and the holes are separated from these defects under the applied field which renders the vacancies and the interstitials to become charge neutral relative to the lattice thereby enhancing their mobility. The bias from the sintering pressure then pulls the interstitials preferentially into the pores and the vacancies into the grain boundaries leading to densification. In this way the electronic conductivity becomes coupled to the sintering kinetics.

The difference in the conductivity and sintering behavior of MgO-doped alumina and alumina of nominal purity is highly remarkable, and difficult to explain at this point. It is known that MgO has limited solubility in alumina, and that it segregates to the grain boundaries at relatively low overall concentrations. At low applied fields the pure and MgO-alumina have very similar conductivities, and exhibit similar sintering kinetics. But at high fields the properties diverge with the MgO-alumina exhibiting flash sintering as well as non-linear conductivity, while the pure-alumina remains well behaved. The similar conductivity of the two aluminas at low field makes it unlikely that MgO is influencing the electronic conductivity of alumina—its effect appears to be on the non-linear behavior. If the Frenkel defect nucleation mechanism were to hold, then its effect must be related to this nucleation mechanism. One possibility is that the dopant creates local amplifications in the electrical fields which enhance the probability for the nucleation of Frenkel pairs.

Example 3

Flash Sintering of SrTiO$_3$

Flash sintering of strontium titanate (SrTiO$_3$) was studied at different applied fields to understand its effect on density and grain growth. In particular, the defect structure was investigated by optical and structural analysis. SrTiO$_3$ exhibited a trend in densification opposite that of ionically or electronically conductive ceramics: as the applied voltage decreased, the density increased. Abnormal grain growth in conventionally sintered SrTiO$_3$ was arrested by flash sintering. Interestingly, undoped SrTiO$_3$ behaved differently than undoped Al$_2$O$_3$, which did not exhibit any signs of flash sintering. Previous attempts at flash sintering could only be achieved in MgO-doped Al$_2$O$_3$. It is possible that non-stoichiometric Ruddlesden-Popper phases in SrTiO$_3$, as indicated by ultrafast optical spectroscopy, X-ray diffraction, conductivity measurements, and transmission electron microscopy, assisted flash sintering by increasing local conductivity through enhanced defect content.

I. Introduction

Electric current-assisted sintering or simply Field-Assisted Sintering Techniques (FAST) have advantages, compared to conventional methods, of reduced sintering time and temperature by adding an electric field to the standard controls of time, temperature, and pressure. The most well known example is spark plasma sintering (SPS), which uses electrical heating of graphite dies along with uniaxial pressure. This widely used sintering method has been demonstrated to give high density, small grain size, and clean grain boundaries with enhanced sintering rates.

A novel electric current-assisted sintering method—flash sintering has superior time and temperature reduction without the need of high pressure unlike SPS. Flash sintering has been demonstrated to be an innovative sintering method for ionic conducting and electronic conducting ceramics. Yttria-stabilized tetragonal zirconia and cobalt manganese oxide spinel were successfully sintered at 850° C. and 325° C., respectively, in a few seconds under an applied DC electric field. To achieve dense compacts of these materials via conventional sintering requires temperatures greater than 1000° C. for several hours. Similar to other FAST sintering methods, flash sintering has produced nanomaterials without any substantial grain growth compared to the original powder. Flash sintering of SrTiO$_3$, a complex, undoped insulator is reported herein. This work demonstrates that flash sintering can be used to sinter a wide range of ceramic materials. Microstructural as well as optical characterization is performed to give insight into the defect structure formed during flash sintering.

II. Experimental Procedure

Strontium titanium oxide, SrTiO$_3$ powder (Alfa-Aesar, Ward Hill, Mass.) with 99.9% purity was used as received. The powder has a specific surface area of 20 m$^2$/g, with an average particle size of 0.15 µm and a density of 4.81 g/cm$^3$. It is mixed with 5 wt % polyvinyl alcohol (mw 49000; Fluka, Sigma Aldrich, Milwaukee, Wis.) in water to improve the green body strength. The amount of polymer was kept to a minimum to prevent contamination at the grain boundaries. Powder was uniaxially pressed into a dog bone shape with a relative green density of 50%. The process is explained in detail in a previous study. (M. Cologna, et al., "Field Assisted and Flash Sintering of Alumina and its Relationship to Conductivity and MgO-Doping," J. Eur. Ceram. Soc., 31, 2827-37 (2011), incorporated herein by reference in its entirety).

The binder was completely removed after pre-heat treatment at 500° C. for 5 h with a rate of 2° C./min Sintering was performed in a vertical furnace by suspending the samples by two platinum wires in the furnace. The voltage at the two electrodes was kept constant, while the furnace temperature was increased from RT to 1400° C. with a heating rate of 10° C./min Once the sample reached the "flash sintering" regime, the heat treatment is stopped and the sample left in the furnace as it cooled. This regime can be considered as the densification stage of the samples. A conventionally sintered sample, sintered without any applied voltage (0 V), was prepared for comparison. It was sintered by one step sintering, using the same furnace and conditions at 1400° C. for 1 h.

The dimensions of the suspended sample were recorded with a CCD camera through a silica window and a low pass filter (KG3 Shott), positioned in series before the camera. The shrinkage strain is calculated as the true strain, $e=\ln(l/l_0)$, where l is the time-dependent gage-length and $l_0$ is the initial gage length.

(1) Characterization

Field emission scanning electron microscopy (FE-SEM) and a focused ion beam/high resolution scanning electron microscope (FIB-SEM) were used to examine the microstructure of the flash sintered and conventional sintered samples. Microstructural studies on $SrTiO_3$ samples were done at the University of Colorado, Boulder with a JSM-7401F FE-SEM (JEOL Ltd., Akishima, Tokyo, Japan) and Los Alamos National Laboratory by FEI Strata DB235 FIB-SEM; FEI Company, Eindhoven, the Netherlands. Electron backscatter diffraction (EBSD) was performed at 20 kV in an FEI XL30 SEM equipped with TSL/EDAX data acquisition software. The orientation data were analyzed using TSL/EDAX OIMTM Analysis software. 0.2 μm step size scans of areas 20 μm×20 μm were performed. Small area scans were preferred due to charging of the sample. Several scans were run to cover a greater area and obtain results representative of the entire sample. The number of analyzed grains was larger than 1000 for each sample.

Transmission electron microscopy (FEI Tecnai F30 analytical TEM; FEI Company, Eindhoven, the Netherlands) was applied to study the microstructure. The images were recorded by a high-resolution charge-coupled device camera (Ultrascan 4000 4 k×4 k CCD camera; Gatan, Pleasanton, Calif.). X-ray Diffraction measurements were made on the Rigaku Ultima III diffractometer that used a fine line sealed Cu tube to generate Ka (k=1.5406 Å) X-rays. The generator was a D/MAX Ultima series with a maximum power of 3 kW. The bulk densities (ρ) of the samples were measured by Archimedes' method. The porosity of the samples was calculated from the bulk density, using a value of 5.13 g/cm³ for fully dense $SrTiO_3$. Ultrafast optical spectroscopy measurements were performed in a pump-probe geometry and employed 50 fs laser pulses generated by an amplified Ti:Sapphire system at 250 kHz (Coherent RegA9500; Coherent Inc., Santa Clara, Calif.). The pump pulses were centered at 266 nm (4.5 eV) while probe pulses were tuned to 520 nm (2.4 eV). The pump beam is modulated at 3 kHz by a mechanical chopper and a lock-in amplifier (Stanford Research Systems SR830, Sunnyvale, Calif.) was used to extract transient reflectivity changes from the probe signal. The pump beam fluence was kept at ~0.1 mJ/cm², while the probe beam fluence was fixed at ~0.1 lJ/cm². All measurements were performed at room temperature (T=295 K). Finally, conductivity measurements were done in two-point contact mode on flash sintered and conventional sintered $SrTiO_3$. The conductivity of sintered specimens is measured in cyclically applied electrical fields of various amplitudes and details are given elsewhere. (M. Cologna, et al., "Field Assisted and Flash Sintering of Alumina and its Relationship to Conductivity and MgO-Doping," J. Eur. Ceram. Soc., 31, 2827-37 (2011), incorporated herein by reference in its entirety).

III. Results and Discussion (1) Flash Sintering and Microstructural Changes

Figure 16:
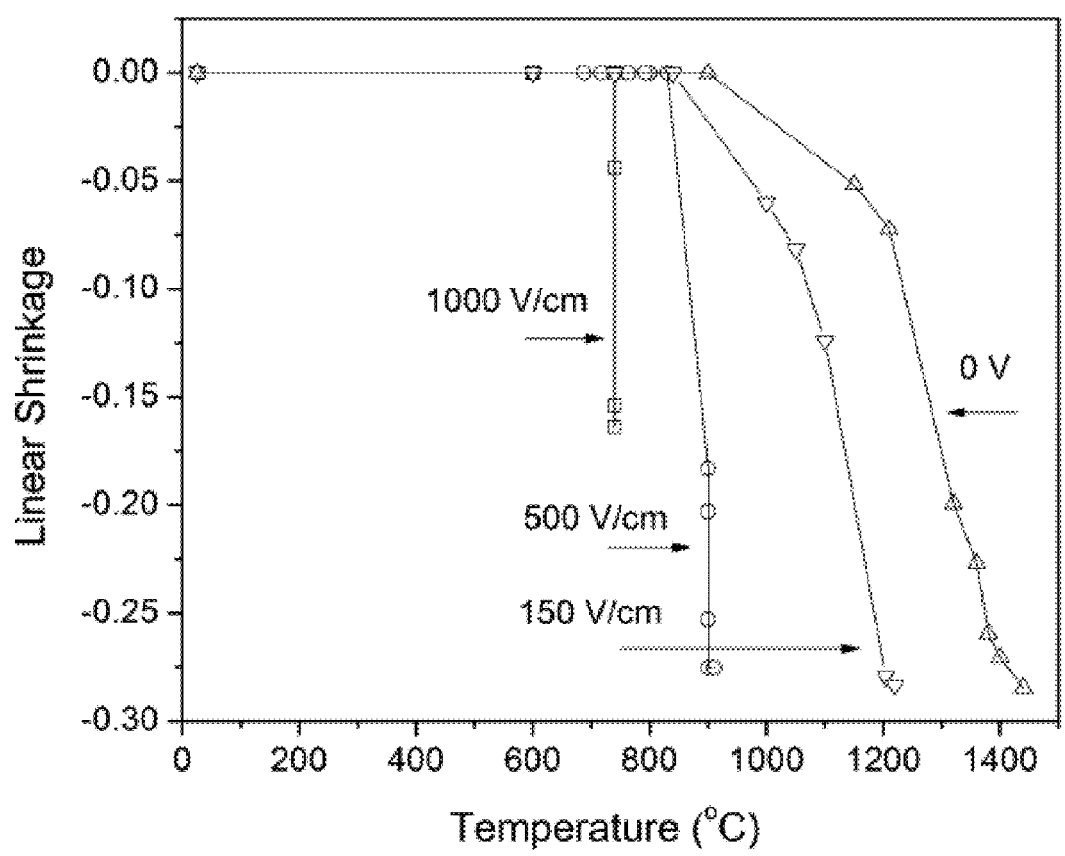
FIG. 16 is a line graph showing linear shrinkage with different applied electrical fields versus furnace temperature at constant heating rate of 10° C./min.
Figure 17:
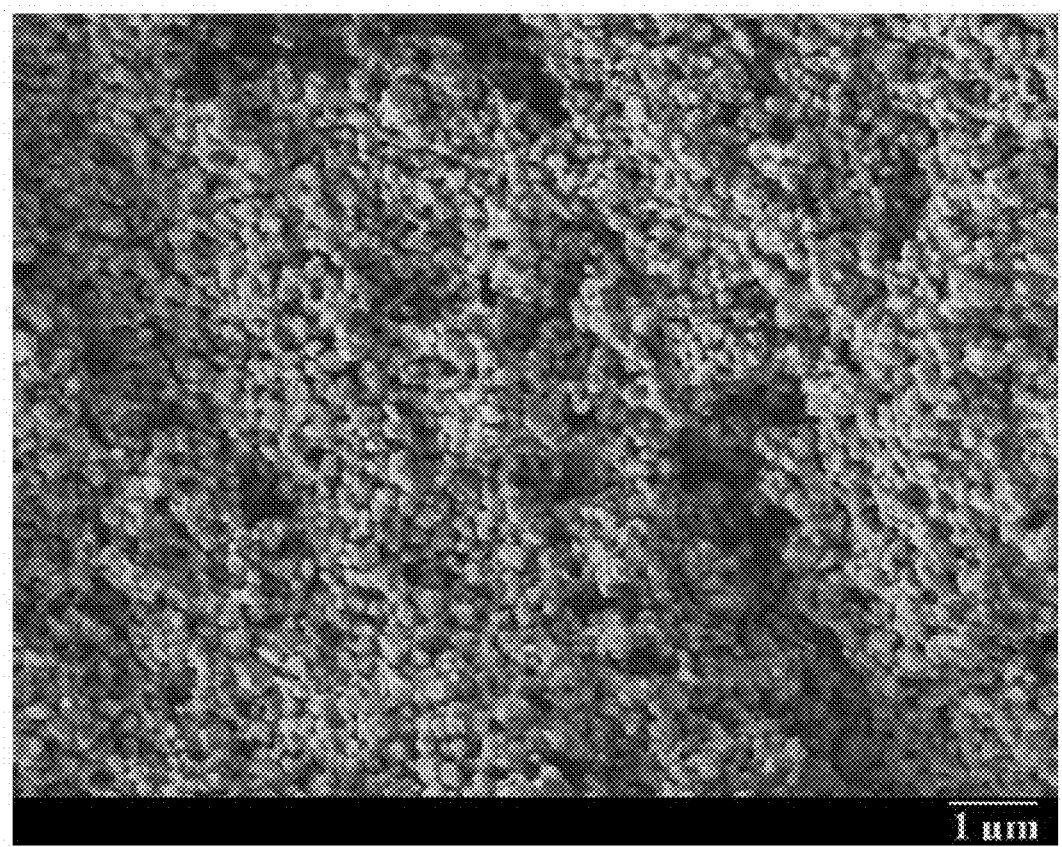
FIG. 17 is an SEM image of the flash sintered $SrTiO_3$ at 500 V/cm. Flash sintering occurred at 900° C.

Sintering curves of the flash sintered $SrTiO_3$ at three different voltages are in FIG. 16. For an applied voltage of 1000 V/cm, flash sintering conditions were achieved at 740° C. with the sintering occurring in just a few seconds. The sintering process was hindered due to the limitation of the maximum current, which was kept at 60 mA (max. power 120 W). The density of this sample (<70%) was found to be too low for additional study. To improve the density, the maximum current was kept the same while the voltage was decreased to 500 V/cm. Under these conditions, flash sintering occurred at 900° C. with a final linear shrinkage of 27%. The decrease in voltage caused the sintering temperature to increase from 740° C. to 900° C. Final grain size was examined by SEM in FIG. 17. It retained the starting 150 nm powder size, while the density increased to 76% of the theoretical density. This result demonstrates the reverse relationship between voltage and sintering temperature as well as the relationship between these variables and sintered density.

Figure 18:
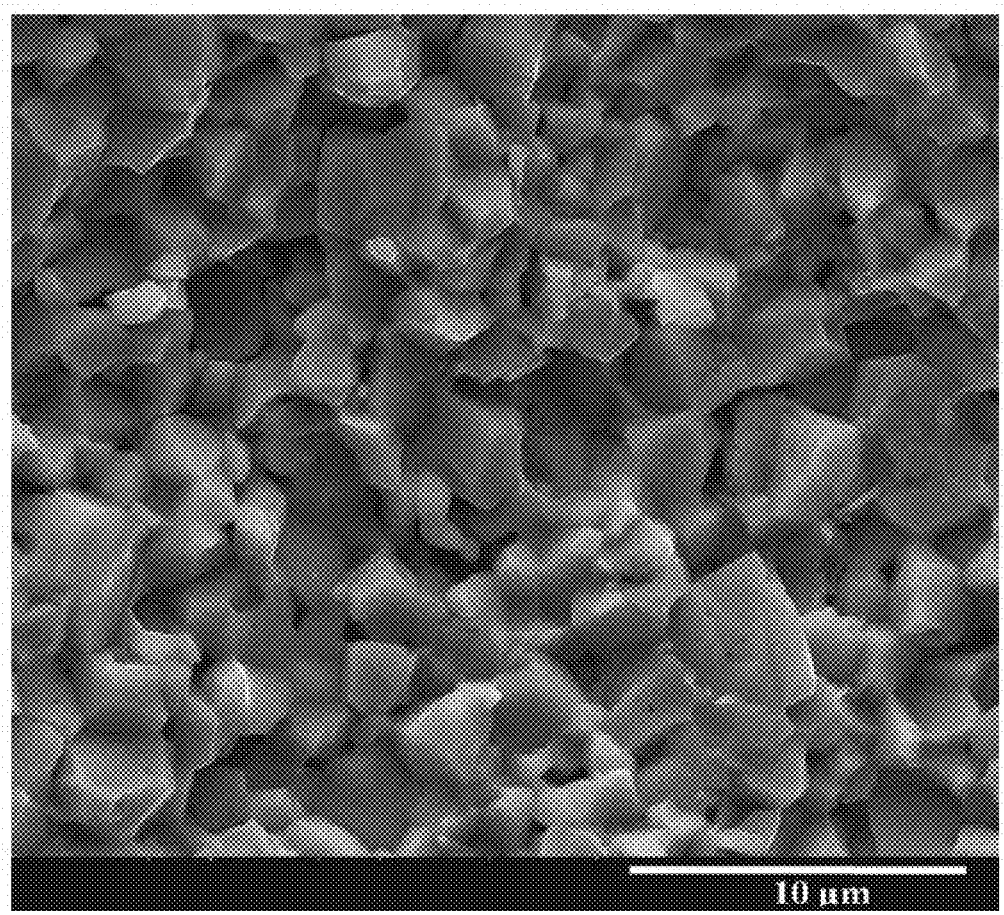
FIG. 18 is an SEM image of the flash sintered $SrTiO_3$ at 150 V/cm. Flash sintering occurred at around 1200° C.

The sintering conditions were optimized—highest densities and smallest grain sizes—when the voltage was fixed to 150 V/cm and the maximum current was increased to 500 mA. Flash sintering conditions is achieved at around 1200° C. with a significant grain growth, as shown in FIG. 18. The average grain size is around 1 μm while the density was greater than 95% of theoretical density. The estimated density based on the shrinkage was 4.75 g/cm³, which agrees well with our measured density. The sintering rate at this voltage was lower than for the other sintering conditions examined. The sudden grain growth and lower sintering rates suggest that the sintering conditions tend to change from the flash sintering to the FAST sintering regime. Note that flash sintering describes an instantaneous sintering, whereas FAST sintering is a gradual increase in shrinkage rate.

Figure 19:
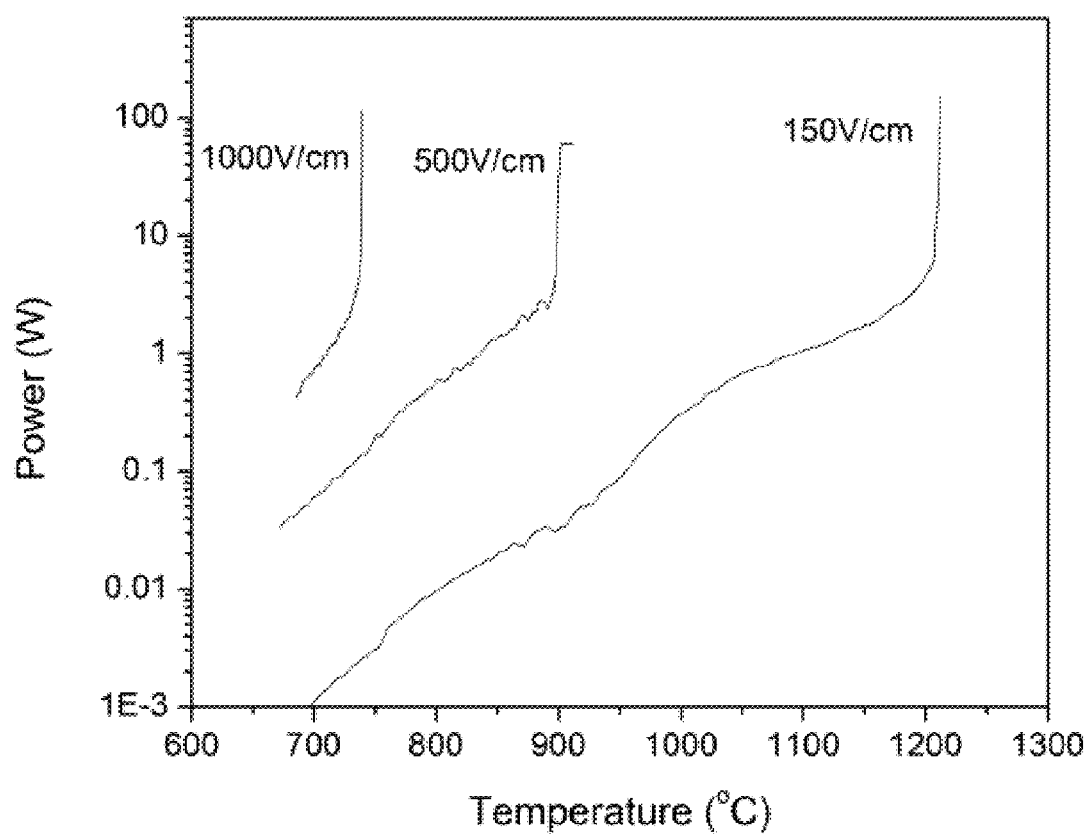
FIG. 19 shows Arrhenius plots for the power dissipation in $SrTiO_3$ samples at different values of the applied field.

Arrhenius plots of power-dissipation were reported in FIG. 19. A sudden power surge, characteristic of flash sintering, occurred above 5 W at 1000 and 500 V/cm. This critical power dissipation level was slightly higher at 150 V/cm, which confirmed the transition from flash to FAST sintering. Finally, the power dissipation level observed here was the highest reported value among all previous studies, which was likely due to the relatively high resistivity of $SrTiO_3$; it is known that the field required for flash sintering decreases as conductivity increases.

Figure 20:
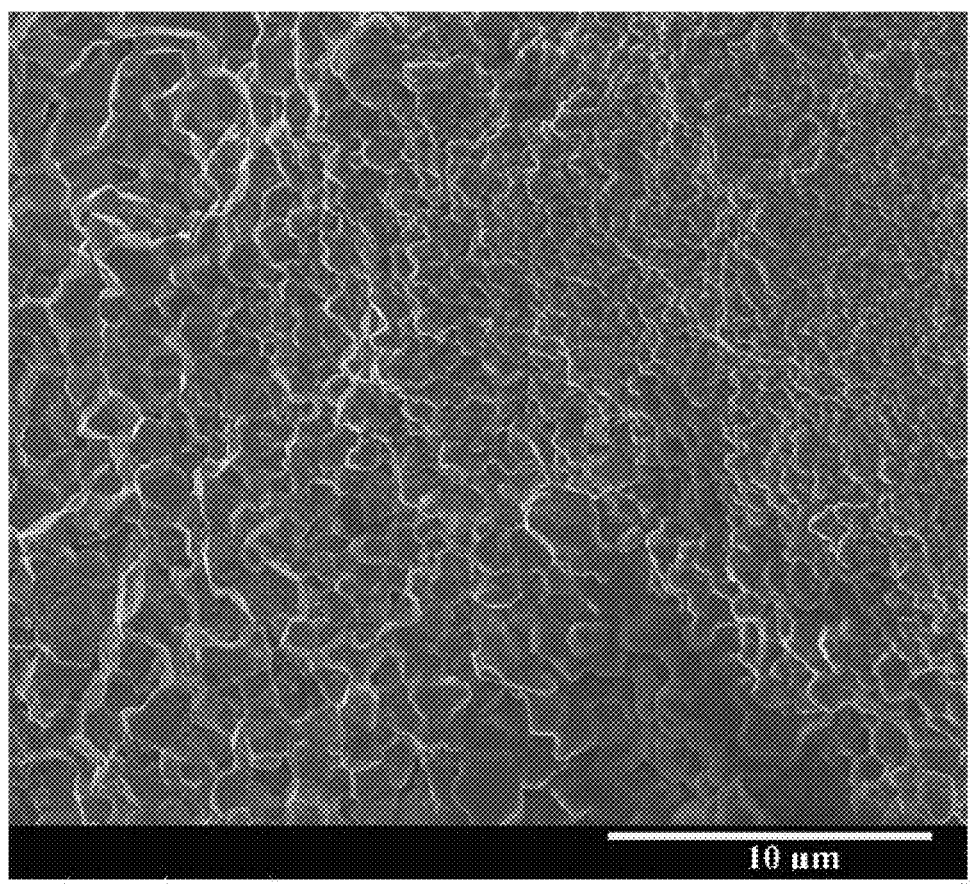
FIG. 20 is an SEM image of the conventionally sintered SrTiO3 at 1400° C. for 1 h.
Figure 21:
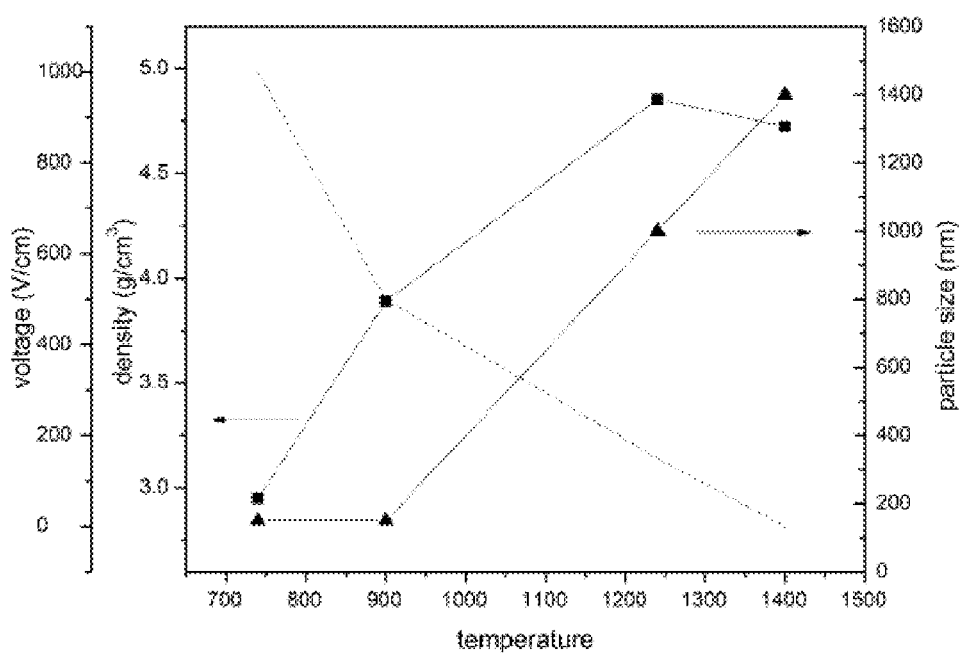
FIG. 21 is a line graph showing change in density (■) and particle size (▲) of the $SrTiO_3$ sample with respect to furnace temperature. Voltage (dashed line) is given to show the experimental conditions.

Conventional sintering was done at 1400° C. for 1 h of soaking time to gather further insight into the flash sintering process. The average grain size for the conventionally sintered material was found to be 1.5 μm with a high grain size gradient across the sample (FIG. 20). The final density obtained was only 92% of theoretical density. Density and particle size changed with respect to furnace temperature as shown in FIG. 21. The applied voltage was given as a dashed line to reveal its effect on the other parameters. Particle size remained constant until 900° C. with 500 V/cm applied field and increased linearly afterward. Similar behavior was reported for spark plasma sintering where the grain size remained constant until a critical temperature is reached. This critical temperature for $SrTiO_3$ should be higher than 900° C.

since grain size increased abruptly after this temperature. On the other hand, this temperature can be controlled and, most significantly, reduced by an applied voltage; higher voltages gave lower sintering temperatures.

Figure 22:
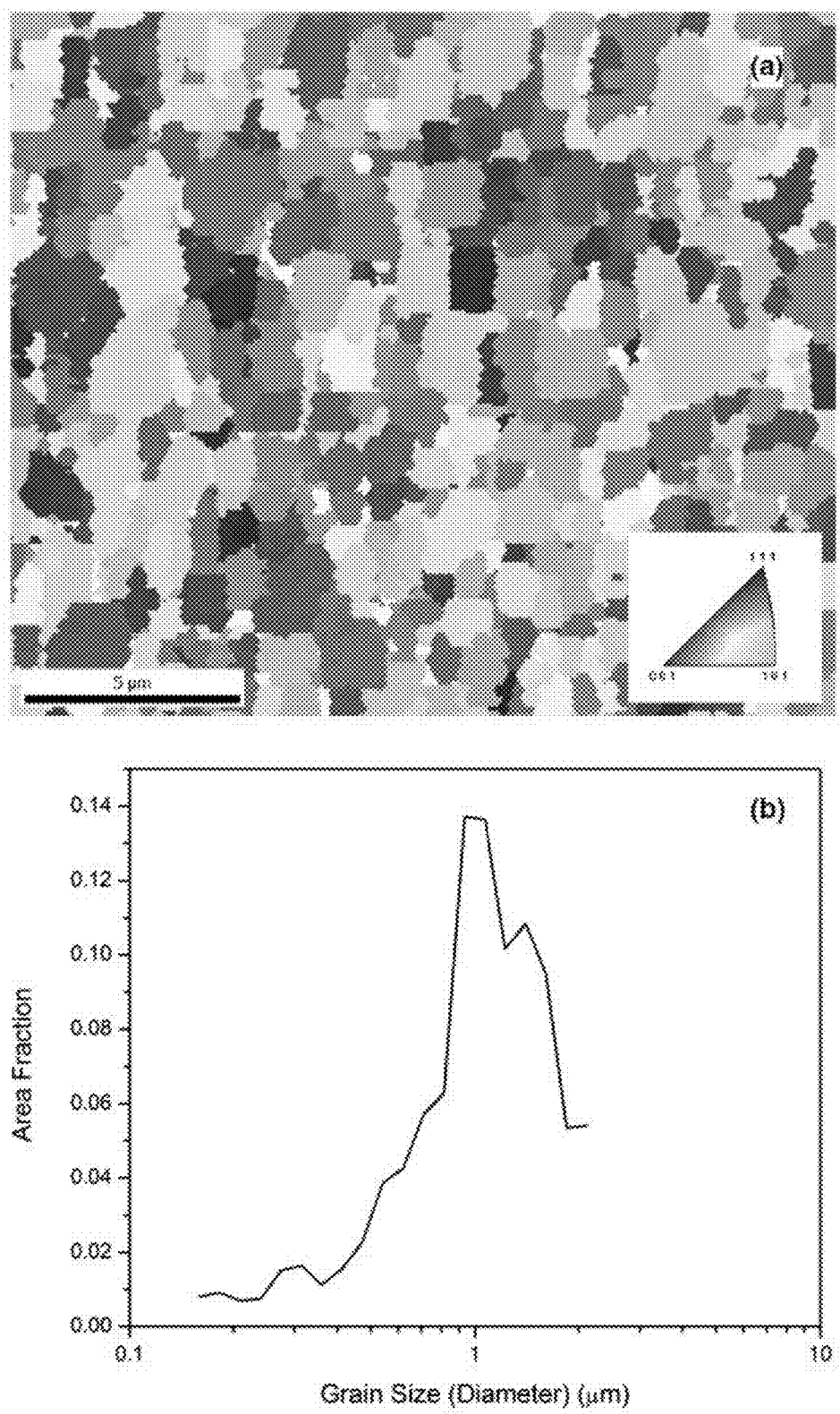
FIG. 22A is a color-coded inverse pole figure map, generated with TSL/EDAX OIMTM. It shows the orientation and shape of the grains obtained on flash sintered $SrTiO_3$ polycrystalline at 150 V/cm. Grain orientations with respect to the sample normal are colored according to the standard stereographic triangle on the right.
FIG. 22B shows the area fraction of grains with respect to average grain diameter is plotted for representative areas of the flash sintered $SrTiO_3$ at 150 V/cm.
Figure 23:
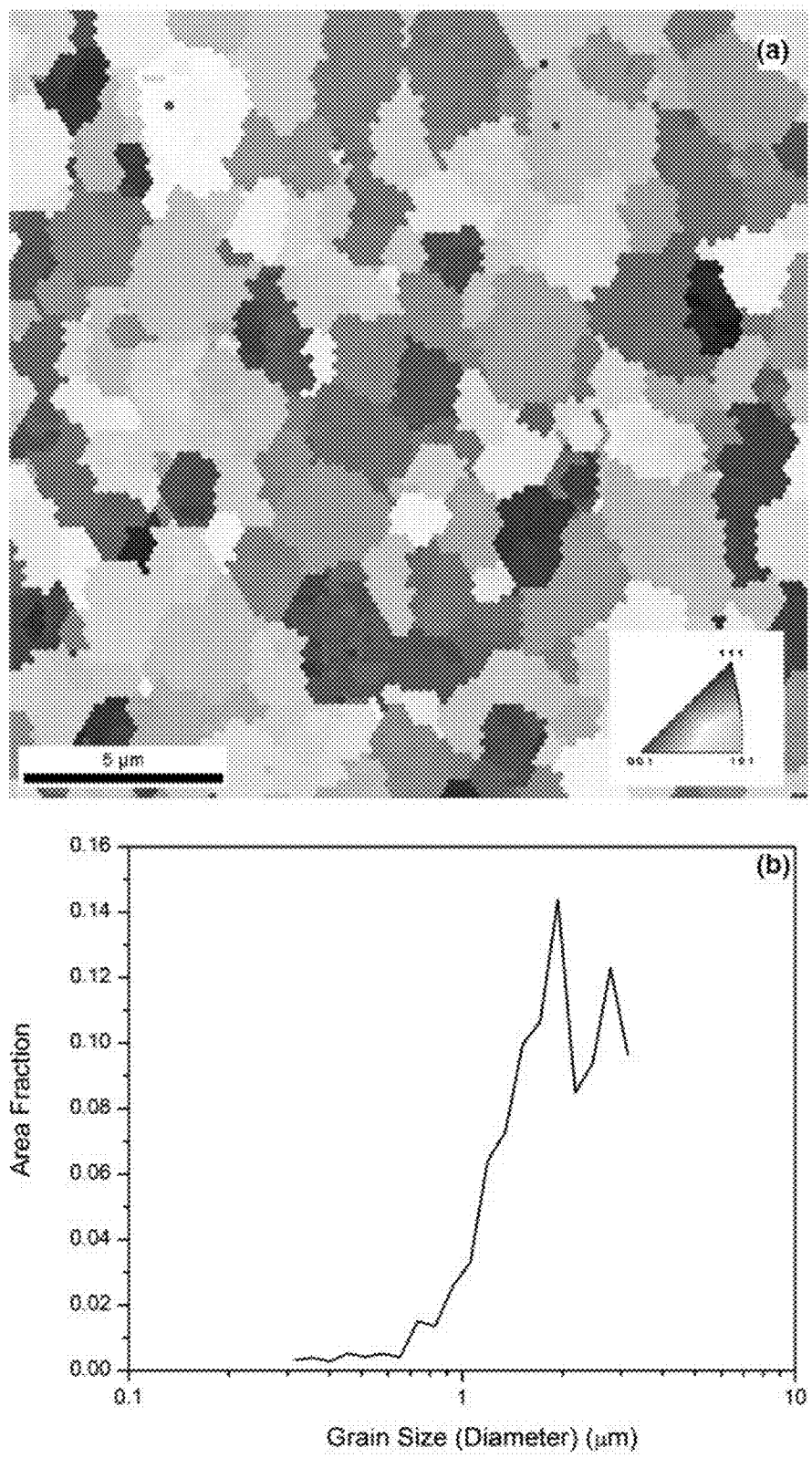
FIG. 23A shows the color-coded inverse pole figure map, generated with TSL/EDAX OIMTM, shows the orientation and shape of the grains obtained on conventionally sintered $SrTiO_3$ (0 V). Grain orientations with respect to the sample normal are colored according to the standard stereographic triangle on the right.
FIG. 23B shows the area fraction of grains with respect to average grain diameter is plotted for representative areas of the conventionally sintered $SrTiO_3$.

Electron backscatter diffraction was performed to explore the possible texture formation due to electrical field usage in flash sintering and to characterize the grain boundary structure of flash sintered and conventionally sintered $SrTiO_3$. Due to the non-conductive nature of $SrTiO_3$, several small area scans (about 20 lm 9 20 lm) were done on carbon-coated samples (thickness of 30-50 nm) along the sample normal direction. Orientation image maps (OIMs) obtained on $SrTiO_3$ samples sintered at 150 and 0 V/cm (conventional sintering) were given in FIGS. 22A and 23A, respectively. Each of the image maps of these figures was then converted into a size histogram. The average grain size for flash sintered $SrTiO_3$[FIG. 22A] is 0.9-1 μm, with a small outlying population (0.2% area fraction) of larger grains with sizes of 1.2-1.4 μm. FIG. 23B shows a similar histogram for conventionally sintered $SrTiO_3$, but with wider grain size distribution (1.7-3 μm). With increasing sintering time and temperature, the fraction of large grains increased, as did their average size. The EBSD and FE-SEM results are evidence that flash sintering acts to stop abnormal grain growth, which is observed to a greater degree in conventionally sintered $SrTiO_3$.

In previous work, it was demonstrated that both the average grain size and density increase with increasing applied voltage in yttria-stabilized zirconia (YSZ), which is the opposite trend observed here for $SrTiO_3$. This may suggest that the flash-sintering mechanism in non-conductive ceramics is different than in ionically or electronically conductive ceramics (YSZ, $Co_2MnO_4$, etc.). An additional decrease in voltage from 150 V/cm to 0 V did not improve the density but rather lead to a decrease in density. The density of conventionally sintered $SrTiO_3$ at 1400° C. was 5% lower than the sample flash/FAST sintered at 1200° C. This shows that density can be improved and grain size refined at lower temperatures by flash sintering even in non-conductive ceramics.

(2) Defect Structure Analysis

Although it has been demonstrated that flash and FAST sintering methods (i.e., spark plasma sintering) have advantages over conventional sintering by decreasing temperature and time, the defect chemistry in these systems is not understood completely. Flash sintering, occurring in only a few seconds under an applied electrical field is a complex process, resulting in extra difficulties in understanding the resulting defect structure completely. The following section is an initial investigation into the defect structure of flash sintered $SrTiO_3$.

Figure 24:
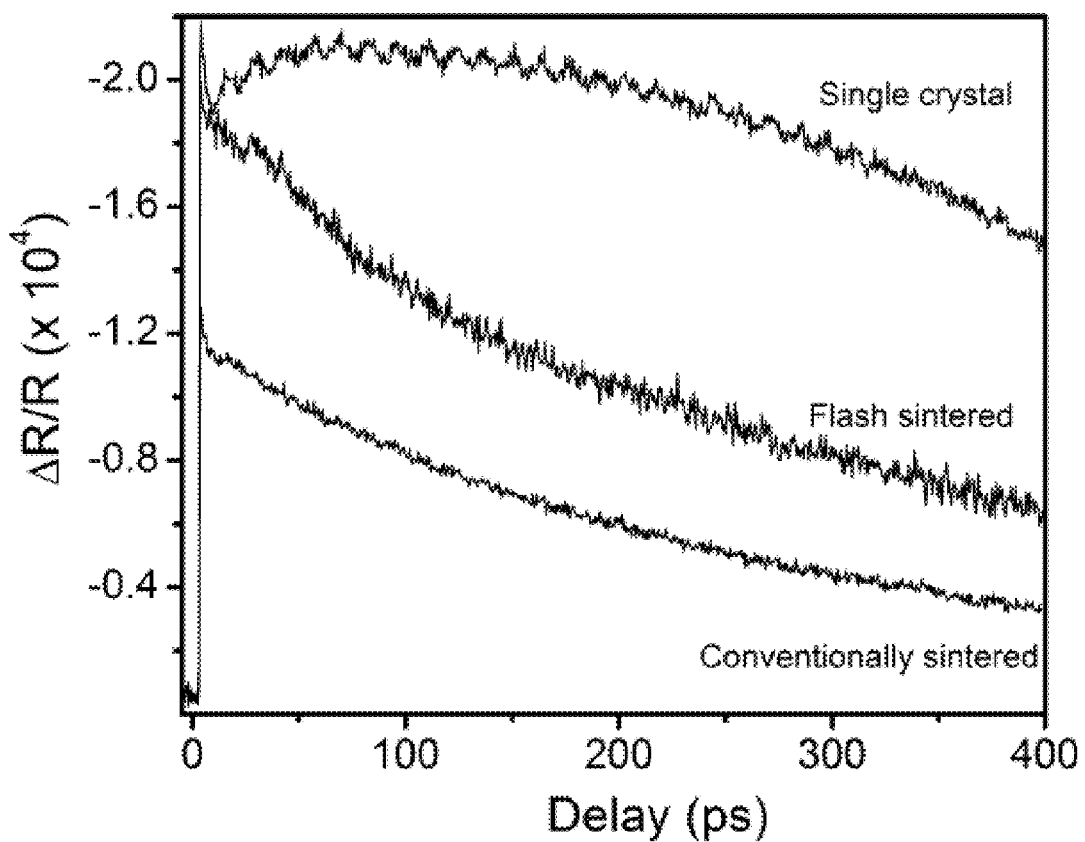
FIG. 24 is a line graph showing the photoinduced reflectivity dynamics DR/R of conventionally and flash-sintered $SrTiO_3$ as a function of time delay between pump and probe pulses. Single crystal $SrTiO_3$ is also analyzed to compare polycrystalline samples with defect-free structure.

Optical characterization methods are very effective for analyzing defect states in the material, especially sensitive to even small numbers of defects. In this work, we used ultrafast optical spectroscopy, which is very sensitive to defect states and changes in bonding structure, to study the defect states in $SrTiO_3$. FIG. 24 shows the photoinduced reflectivity dynamics DR/R of conventionally sintered (0 V) and flash-sintered (150 V/cm) $SrTiO_3$ as a function of time delay between pump and probe pulses. The general feature of the dynamics observed in the different samples was the fast (~100 ps) relaxation of photo-induced changes back to the equilibrium value. This can be attributed to electron-phonon scattering with subsequent electron-hole recombination and lattice relaxation processes. In single-crystal $SrTiO_3$ (MTI corporation, Richmond, Calif.) electron-hole recombination is slow (>1000 ps). The difference between the sintered and the single crystal response suggests that this is a direct consequence of a finite residual defect concentration remaining due to sintering and or distortions, which can also act as defects in terms of their effect on the reflectivity dynamics. These defects were charge traps or scattering centers, providing additional routes for charge-lattice relaxation in the crystal structure. The fact that the relaxation in both flash and conventionally sintered polycrystals occurred on almost the same timescale indicates that the photoinduced reflectivity dynamics of both samples is very similar. The difference in signal amplitudes, however, might be related to gradients in grain size that causes scattering.

Figure 25:
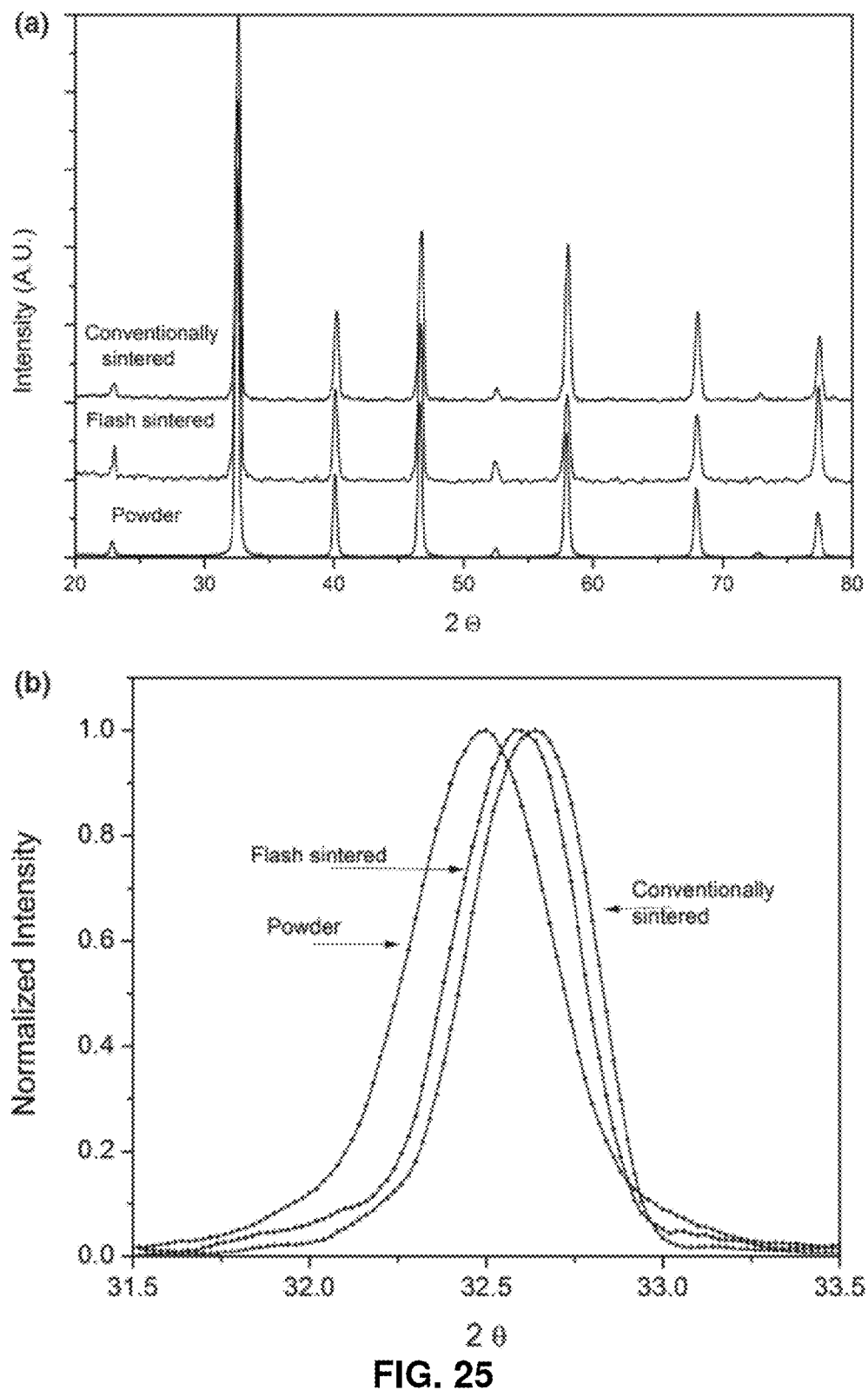
FIG. 25A is an XRD spectra of flash sintered and conventionally sintered $SrTiO_3$. Starting powder is analyzed to reveal the structural differences during sintering process.
FIG. 25B shows peaks of all samples are given separately to demonstrate the peak shift toward high θ values.

There were three primary possibilities for the source of the enhanced electron-hole recombination: impurities, secondary phases, or point defects within the $SrTiO_3$ structure. The possibility of impurity content coming from the sintering process (specifically the binder) was investigated using particle induced X-ray emission (PIXE). No impurities were detected (<10 ppm) within the sample, ruling out the first possibility. Sintered samples as well as the starting powder, for comparison, were analyzed by XRD. All samples were cubic $SrTiO_3$ in the Pm3m structure with a small shift in FIG. 25A, which is highlighted in FIG. 25B, where the most intense (110) peak is shown. The peak for the starting powder, centered at 32.4°, shifts to higher 2Θ values in both the sintered samples, indicating that the lattice parameter is becoming smaller upon sintering. The starting powder had lattice constant of a=3.905 Å (JCPDS#73-0661) while the sintered samples have smaller lattice constants (around 3.89 Å), an effect that is slightly greater in the conventionally sintered sample than that in the flash sintered sample. These shifts are attributed to distortions in the structure due to sintering, which is consistent with the ultrafast optical spectroscopy results. Such distortions in the structure can be caused by defects (such as oxygen vacancies) or local non-stoichiometric phases, both of which can cause a radical difference in optical response of the material.

Figure 26:
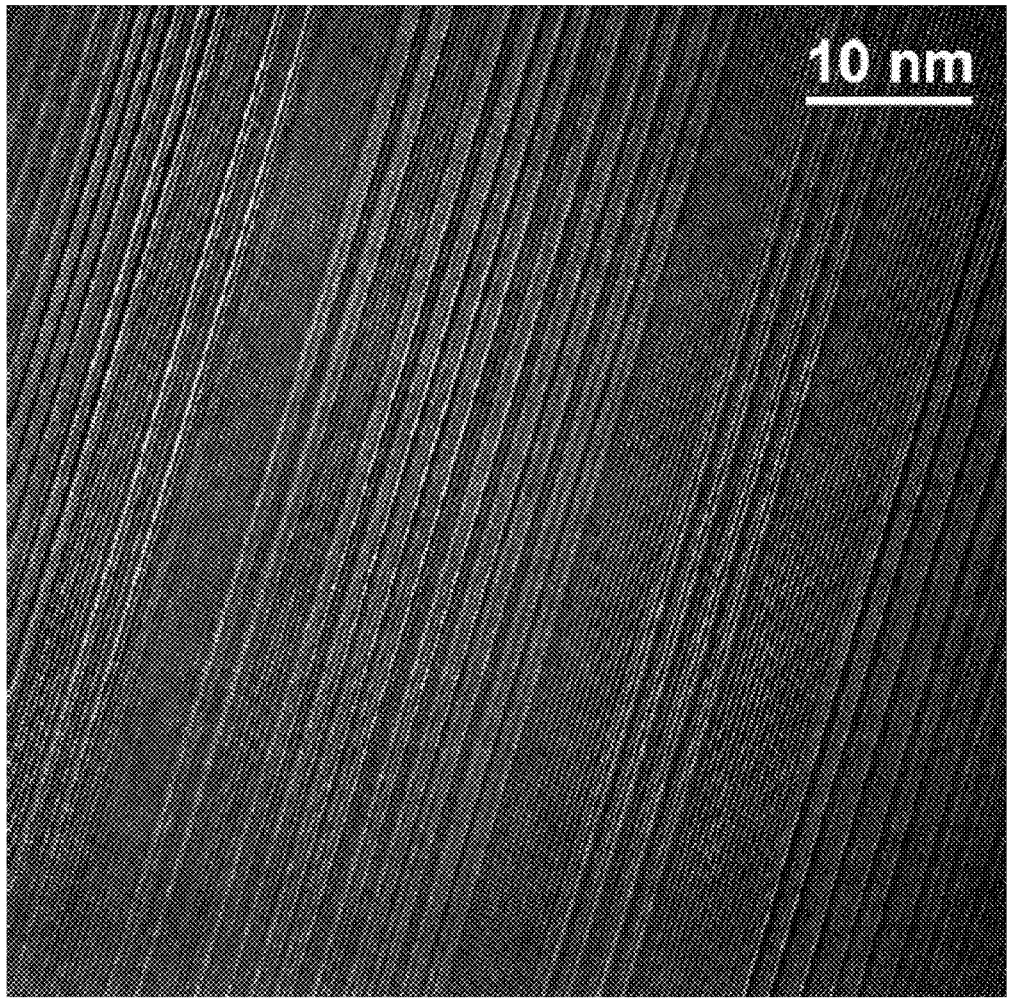
FIG. 26 is a TEM image of flash sintered $SrTiO_3$ at 150 V/cm. Some regions contain Ruddlesden-Popper phases, caused by long-range order lattice distortions.

The TEM analysis of the microstructure was performed to understand the type of defect structure which might be responsible for the peak shift in the XRD and the changes observed in the reflectivity dynamics. As for the XRD results, microstructure analyses by means of High Resolution Transmission Electron Microscopy (HRTEM) imaging and microbeam electron diffraction patterns (MBEDP) indicated that sintered material has a stoichiometric $SrTiO_3$ cubic structure (Pm-3m). However, some of the grains have defect structures with irregularly spaced line features, as shown in the HRTEM image in FIG. 26. These defects are explained by local chemical deviations from stoichiometric $SrTiO_3$ and are referred to as Ruddlesden-Popper (RP) phases [$SrO(SrTiO_3)n$ or $Sr_{n+1}Ti_nO_{3n+1}$]. They are introduced by the accommodation of long-range order lattice distortion and explained by self-healing of vacancy distortion by insertion of shear planes. During sintering, structure can change significantly by reduction or oxidation at elevated temperatures. Structural distortions in stoichiometric $SrTiO_3$ under an applied electric field have been reported and explained by the ordering of oxygen vacancies and electro-migration of SrO ion complexes. (D. C. Meyer, et al., "An Electrical Field-Induced Structural Effect in Strontium Titanate at Room Temperature," Appl. Phys. A, 80, 515-22 (2005) incorporated herein by reference in its entirety). Indeed, it has been reported that RP phases cause the existence of RP phases induce a shift to the right in the positions of XRD peaks as n gets smaller. This is consistent with our XRD results. The initial powder is stoichiometric $SrTiO_3$ with n=∞; as non-stoichiometric RP phases are formed in the material, the average value of n decreases.

Figure 27:
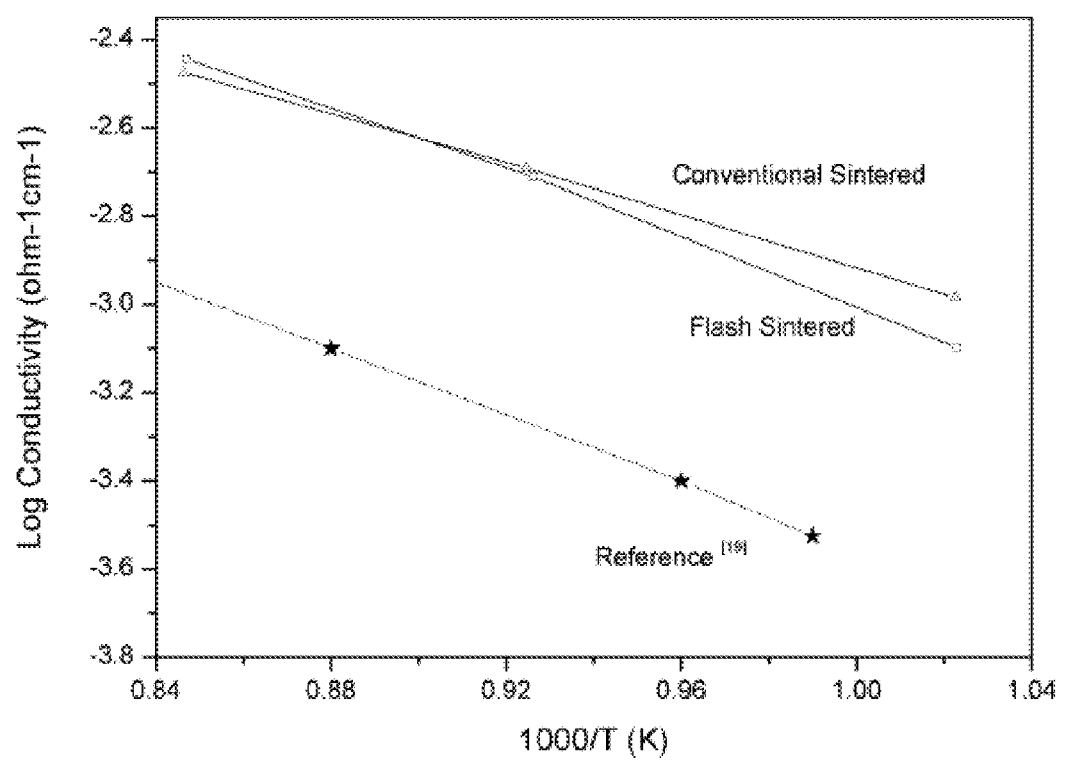
FIG. 27 is an Arrhenius plot of the conductivity of flash sintered (□) and conventional sintered SrTiO3 (Δ). Reference (dash line-star) is given for comparison.

Finally, conductivity measurements are shown in FIG. 27. The temperature dependence of the electrical conductivity (r)

of SrTiO$_3$ samples followed an Arrhenius law. The activation energy values for flash sintered and conventional sintered SrTiO$_3$ agree well with literature values for SrTiO$_3$. On the other hand, both flash and conventional sintered SrTiO$_3$ exhibit higher absolute conductivities compared to the literature values. This difference in the conductivity is within the range of the experimental error but can also be electrical conductivity (r) of SrTiO$_3$ samples follows an Arrhenius law. The activation energy values for flash sintered and conventional sintered SrTiO$_3$ agree well with literature values for SrTiO$_3$. On the other hand, both flash and conventional sintered SrTiO$_3$ exhibit higher absolute conductivities compared to the literature values. This difference in the conductivity is within the range of the experimental error but can also be caused by differences in stoichiometry. It is known that the conductivity of SrTiO$_3$ can change easily with even small compositional changes such as oxygen deficiency, slight change in the Sr/Ti ratio or formation of Ruddlesden-Popper phases. Together, the optical spectroscopy, XRD, PIXE, conductivity measurements, and TEM revealed that sintering, either conventionally or flash, results in non-stoichiometric phases. The defect states detected by optical spectroscopy and by the peak shift in the XRD are due to distortions in the cubic structure as a consequence of the formation of RP phases.

In a previous work, we reported that undoped Al$_2$O$_3$ did not show any flash sintering phenomenon; flash sintering could only be achieved upon doping with MgO. In the case of flash-sintered SrTiO$_3$, we believe that non-stoichiometry in the form of RP phases, enhances the sintering process via an enhancement of conductivity which is particularly important for the flash sintering process. Clearly, the defect structure of the material is important for the propensity for flash sintering to occur. Although the flash sintered and conventional sintered samples have some qualitative similarities, the flash-sintered material has an overall lower defect content, as determined by optical analysis and XRD. Thus, the differences are in number rather than kind.

IV. Conclusion

Strontium titanium oxide was flash sintered at different applied fields to understand the role of the field strength on density and grain growth. The density increased with decreasing applied voltages, which is in contrast with the trend observed in ionically or electronically conductive ceramics (YSZ, Co$_2$MnO$_4$, etc.). The highest density material (more than 95%) is obtained for fields of 150 V/cm. At this applied voltage, flash sintering occurred at 1200° C. The density of conventionally sintered SrTiO$_3$ at 1400° C. is 5% lower than that in this sample. Grain growth followed a similar trend as density and abnormal grain growth, observed in conventional sintered sample, is arrested by flash sintering.

Optical and structural characterization reveals that sintering, either conventional or flash, induced the formation of non-stoichiometric phases in SrTiO$_3$. We believe that these defects assisted the occurrence of flash sintering in pure SrTiO$_3$ as flash sintering did not occur in undoped Al$_2$O$_3$. Indeed, flash sintering was only achieved in Al$_2$O$_3$ upon doping with MgO. It is suggested that the non-stoichiometric RP phases play an important role in the processes associated with the flash sintering of SrTiO$_3$.

Example 4

Flash Sinterforging

The influence of a uniaxial applied stress on flash-sintering and field assisted superplastic behavior of cylindrical powder preforms of 3 mol % tetragonal-stabilized zirconia is reported below. The experiments used a sinterforging method, where, in addition to pressure, a dc electrical field is applied by metal electrodes sandwiched between the push-rods and the specimen. The axial and radial strains in the experiment provided simultaneous measurement of the time-dependent densification and shear strains. Large effects of the electric field on sintering and superplasticity were observed. Flash-sintering was observed, which is characterized by a threshold level of temperature and electric field. With higher applied fields, the sample sintered at a lower furnace temperature. Surprisingly, the applied stress further lowered this critical temperature: a sample, which sintered at 915° C. under a stress of 1.5 MPa, densified at only 850° C. when the stress was raised to 12 MPa. This stress induced reduction in sintering temperature maybe related to the additional electrical fields generated within the specimen by the electro-chemomechanical mechanism described by Pannikkat and Raj [Acta Mater., 47 (1999) 3423], incorporated herein by reference in its entirety. The sample also deformed in pure shear to 30% strain in just a few seconds at anomalously low temperatures. The specimen temperature was measured with a pyrometer, during the flash sintering, as a check on Joule heating. A reading of 1000° C.-1100° C. was obtained, up to 200° above the furnace temperature. This temperature is still too low to explain the sintering in just a few seconds. While not wishing to be bound by theory, it is suggested that the electric field can nucleate a defect avalanche that enhances diffusion kinetics not by changing the activation energy but by increasing the pre-exponential factor for the diffusion coefficient, noting that the pre-exponential factor depends on concentration of defects, and not upon their mobility.

I. Introduction

Ceramics are almost always fabricated by a solid state sintering process. In "free" sintering a preform shrinks into a self-similar shape. In hot-pressing and sinterforging experiments, the applied stress causes not only a change in shape but also an increase in density. The advantage of the sinterforging method is that both the axial and the radial strain in the specimen can be measured independently. These two strains can then be combined to calculate two scalar quantities, the volumetric strain, which equals densification, and shear strain, which measures the change in shape.

The application of electrical fields greatly enhances sintering. Collectively, methods employing the use of an electric field have come to be known as field assisted sintering techniques. The most common method is spark-plasma-sintering (SPS), where, like hot-pressing, the powder is densified in a graphite die under uniaxial pressure. The difference is that in SPS the graphite die is heated directly by electrical current, which can be in the range of several kilo Amperes. The uniaxial pressure is applied by a hydraulic mechanism. While there is clear evidence that sintering of ceramics is greatly enhanced in SPS, the underlying mechanisms remain elusive because it is often difficult to separate the current flowing through the die from the current flowing through the powder compact. Since SPS is often carried out under both pressure and electrical current, it has been difficult to study how these two parameters individually influence the sintering behavior, especially because the magnitude and the wave shape of the electrical current is constrained by the heating schedule of the graphite die, rather than by the intrinsic need to study field assisted sintering of ceramics.

To better understand the role of electrical fields on the sintering process, experiments where samples were heated within a conventional furnace while the electrical fields are applied independently to the specimen are being carried out.

Since the voltage was applied by means of two electrodes to the specimen, this has been named the two electrode method. These experiments have shown that when the applied field exceeds a critical value, ceramics sintered in just a few seconds at anomalously low temperatures—a process called flash sintering. In a typical experiment, a constant potential difference is applied across the specimen while the sample is heated at a constant rate. The sample sinters abruptly to nearly full density above a threshold temperature. When the experiment is repeated at a higher applied field, the temperature for the onset of flash sintering is lowered. In the case of yttria-stabilized zirconia, we observed two regimes of behavior. At high fields the sample sintered abruptly by flash sintering; at lower fields there was a gradual increase in the sintering rate. The latter process has been successfully explained by a slower rate of grain growth under an applied field, but the underlying mechanism for flash sintering remains elusive.

Field assisted sinterforging is an effective way to expose the underlying science of SPS. The experimental arrangement is sketched in FIG. 28. The stress was applied uniaxially without a lateral constraint to the specimen. The furnace temperature, the field applied to the specimen, and the uniaxial stress can now be controlled independently of one another.

The field assisted sinterforging experiments, reported here, were carried out on the same ceramic powder of 3YSZ as in the earlier flash-sintering experiments. (M. Cologna, et al., "Flash Sintering of NanograM Zirconia in <5 s at 850° C.," J. Am. Ceram. Soc., 3559, 3556-9 (2010), incorporated herein by reference in its entirety). We had expected that the stress would enhance the rate of sintering. Instead, rather surprisingly, we find that the applied stress acted like the electric field, lowering the threshold temperature for the onset of the flash effect.

Sinterforging experiments provide data on shear deformation as well as densification. Both phenomena require mass transport to and from interfaces. In sintering, mass is transported from grain boundaries to the adjacent pores. In shear deformation, or superplasticity, mass moves from interfaces in compression, to those in tension, producing a change in shape. Present experiments show that electrical fields can accelerate both sintering as well as superplasticity, implying that electrical fields have a fundamental influence on mass transport. We report field-assisted superplastic strain rates of up to $0.09$ $s^{-1}$ at temperatures as low as 850° C. These deformation temperatures are several hundred degrees lower than those required in conventional superplasticity. To some extent these higher deformation rates are a consequence of the samples being porous, but this argument cannot explain the dramatically lower temperatures of deformation, even after allowing for Joule heating which accompanies "flash" sintering and superplasticity.

Indeed, one of the objectives of these studies was to ask the question whether the flash phenomenon is simply a result of Joule heating, or whether there was a different mechanism at play. Measurement of the specimen temperature with a pyrometer during flash sintering shows that Joule heating alone cannot explain these enormously fast rates of sintering and deformation. We propose a mechanism, which is likely to be controversial, that electric fields induce a defect avalanche which greatly increases the pre-exponential in the diffusion coefficient. This mechanism does explain the rather unusual coupling between the electronic current which requires transport of charge, and chemical diffusion which is necessary for sintering and superplasticity. Chemical diffusion is controlled by charge neutral transport of mass, that is, by the slowest moving charged species, while the fastest moving species determines the electronic current.

II. Experimental Methods (1) Sample Preparation

Tetragonal Zirconia, doped with 3 mol % Yttria, was pressed into cylindrical compacts by cold pressing in a steel die at 35 MPa. The average particle size, given by the manufacturer (Tosoh USA, Grove City, Ohio), was 60-70 nm. The compacts were pre-sintered by heating from room temperature to 850° C., using a ramp rate of 1.5° C./min, and holding at that temperature for 4 h. The green density of these slightly presintered specimens was in the 50%-55% range. This procedure accomplished two tasks: it removed the binder, and produced some bonding between the particles, which enabled the preform to withstand the applied load in sinterforging experiments. These cylindrically shaped powder compacts were 5 mm in diameter and 10 mm in height.

(2) Sinterforging Experiments

Figure 28:
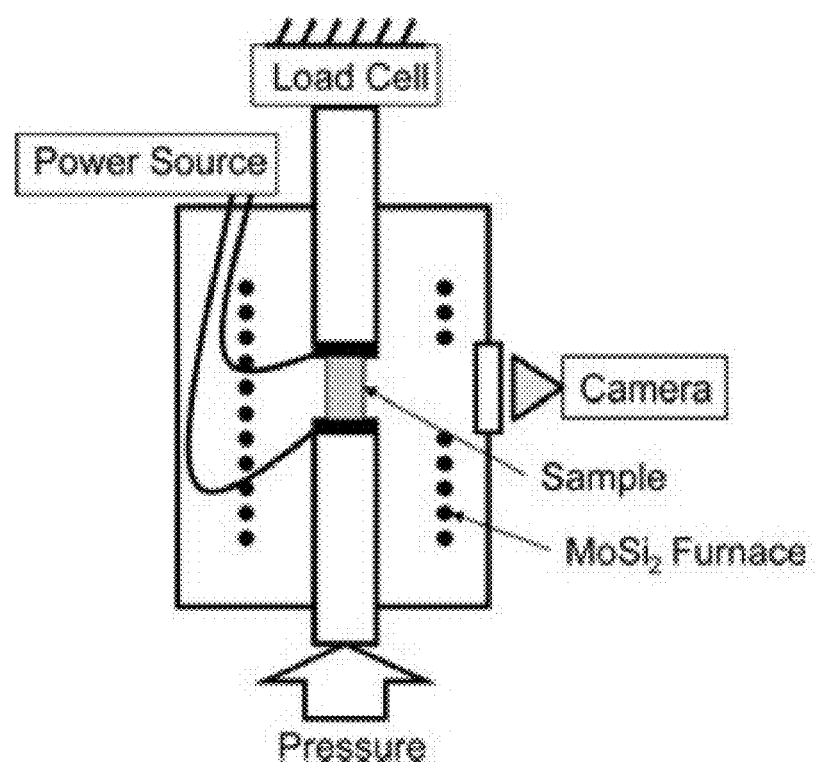
FIG. 28 is a schematic of the sinterforging experiment with externally applied dc electrical field.

The experiment is sketched in FIG. 28. The arrangement is similar to the setup used by 7K. R. Venkatachari and R. Raj, "Shear Deformation and Densification of Powder Compacts," J. Am. Ceram. Soc., 69, 499-506 (1986), incorporated herein by reference in its entirety, with two notable differences: the axial load was applied using a pneumatic cylinder rather than with a traveling crosshead, and the radial and axial strains were obtained by analyzing the images, obtained with a camera through optical filters, at intervals of 1 s, rather than with LVDTs. The experiments were performed in a modified box furnace (CM Furnaces, Bloomfield, N.J.) that operates in ambient air, with molybdenum-discilicide heating elements. All experiments were carried out at a constant heating rate of 10° C./min.

The electrical field was applied with electrodes made from sheets of stainless steel, placed in between the alumina push-rods and the two flat faces of the specimen. Each experiment was performed at a constant voltage from a dc power source (Sorenson DLM-300; Sorensen, San Diego, Calif.). The current flowing through the specimen was measured using digital multimeter (KeithleyModel 2000; Keithley, Cleveland, Ohio). The power source was set to limit the current to prevent runaway heating of the specimen; this point is further discussed later.

The experiments were carried out in the following way. The green compacts were placed between the stainless steel electrodes and the alumina push rods. The load was raised to the desired sinter-forging pressure, using the initial dimensions of the specimen, and then held constant throughout the experiment. The voltage was set to a given value; the electric field values quoted in the figures refer to the initial length of the specimen. Once the voltage and pressure were stable the furnace was set to heat from room temperature at a rate of 10° C./min The measurements of the radial and the axial strains were made using a camera taking snapshots at 1 s intervals. The flash event was accompanied by an abrupt increase in the current, which we have called a power surge. The current was allowed to rise until a preset cutoff was reached. At this point, the power controller switched automatically to a current controlled mode; this led to a decline in the voltage, and thus to a reduction in the power (=voltage 9 current), applied to the sample, since the conductivity of the specimen continued to increase despite reduced power dissipation. This lag between power dissipation and the increase in conductivity is a noteworthy observation from these experiments. Upon completion of flash sintering, the power to the specimen was disconnected. At the same time, the furnace was turned off, and the specimen was allowed cool at a rate of 30° C./min down to room temperature.

(3) Equations for Data Analysis

The axial and radial strains in the specimen were measured from the digital photographs. If the time dependent axial length of the sample is L(t) and its radius is R(t) then the axial and radial (true) strains are given by:

$$\varepsilon_z = \ln\left(\frac{L}{L_0}\right) \quad (1)$$

$$\varepsilon_R = \ln\left(\frac{R}{R_0}\right) \quad (2)$$

where, $L_0$ is the initial length and $R_0$ is the initial radius of the specimen. The shear, or deviatoric strain, $\varepsilon_e$, and the volumetric strain, $\varepsilon_a$, both scalar quantities, are then obtained from the following equations:

$$\varepsilon_e = \frac{2}{3}|\varepsilon_z - \varepsilon_R| \quad (3)$$

$$\varepsilon_a = |\varepsilon_z + 2\varepsilon_R| = \ln\left(\frac{\rho}{\rho_g}\right) \quad (4)$$

Note that $|\varepsilon_a|$ is related to the initial green density, $\rho_g$, and to the time dependent density, $\rho(t)$, as shown on the right in Eq. (4). Therefore, the time-dependent density of the sample can be calculated by measuring the volumetric strain and substituting into Eq. (4).

III. Results (1) Constant Applied Field (100 V/cm), Variable Load (1.5-12 MPa) Experiments The data were plotted with furnace temperature along the horizontal axis (this is synonymous with time since the experiments were carried out at a constant heating rate of 10° C./min). Six different experiments were carried out at applied stresses ranging from 1.5 to 12 MPa, all at a field of 100 V/cm. The measurements of the axial and radial strains were converted into volumetric and shear strains with Eqs. (3) and (4). The results are given in FIGS. 29 through 32. The following features are noteworthy:

Like flash sintering, the sinterforging experiments exhibited an abrupt onset of axial and radial strains above a threshold temperature. However, the threshold temperature was stress dependent. At 1.5 MPa, the transition temperature was 910° C. As the stress is increased this temperature continued to fall, reaching down to 850° C. at 12 MPa.

Figure 29:
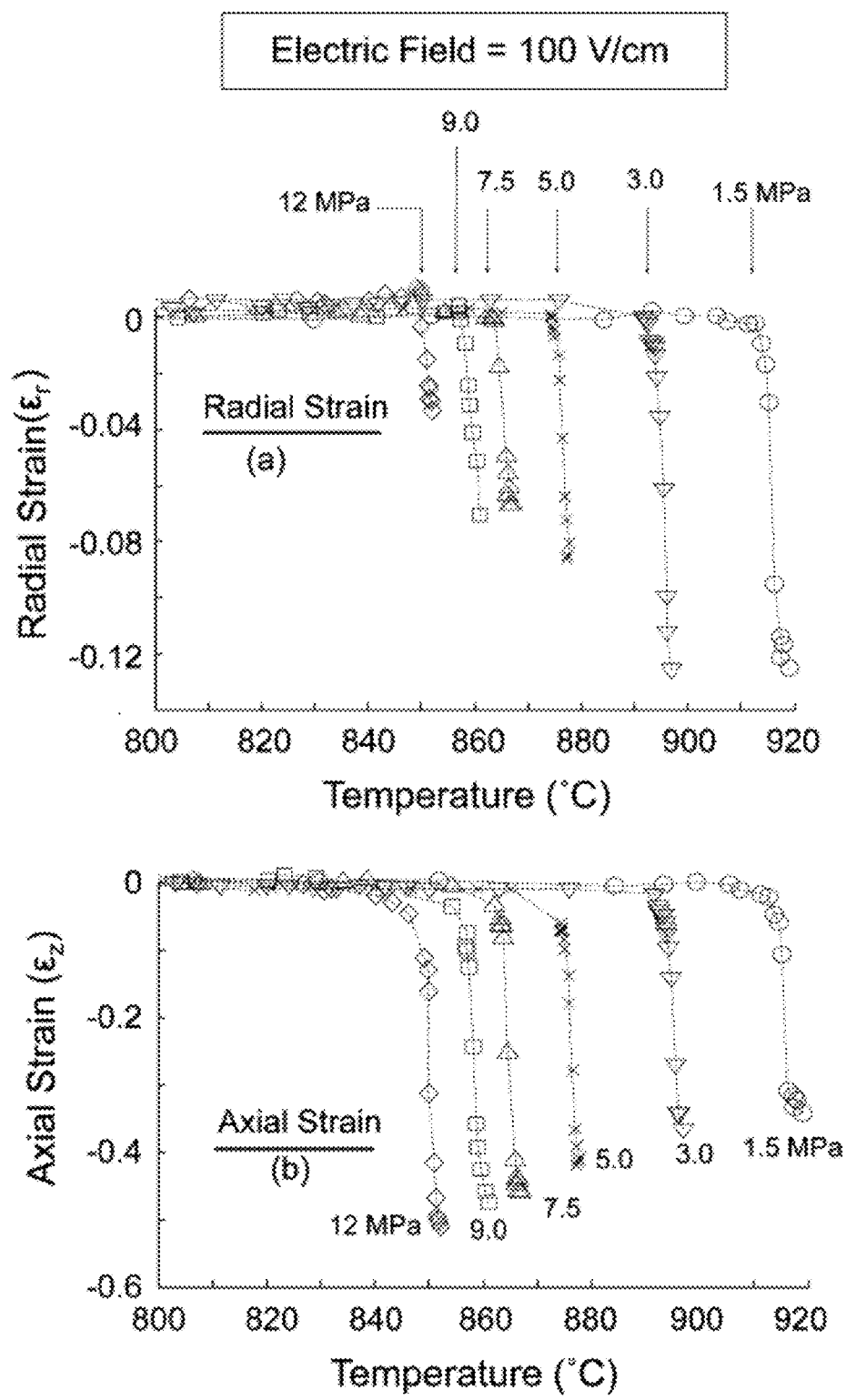
FIG. 29 contains line graphs that show measurements of axial and radial strains using a constant electric field of 100 V/cm, each line represents a different value of applied stress between 1.5 and 12 MPa. The x-axis is the furnace temperature in ° C.; this is the synonymous with time since a constant heating rate of 10° C./min was employed.

In FIG. 29, we noted that the axial as well as the radial strain remained negative, showing that the specimen continued to shrink in volume. In free sintering, the axial and radial strains would have been equal to one another, consistent with a self-similar change in dimensions. Here, however, these strains were unequal, the difference between them being a measure of the shear strain, embodied in Eq. 3. This difference increases with the applied stress consistent with the classical behavior of stress-dependent creep.

Figure 30:
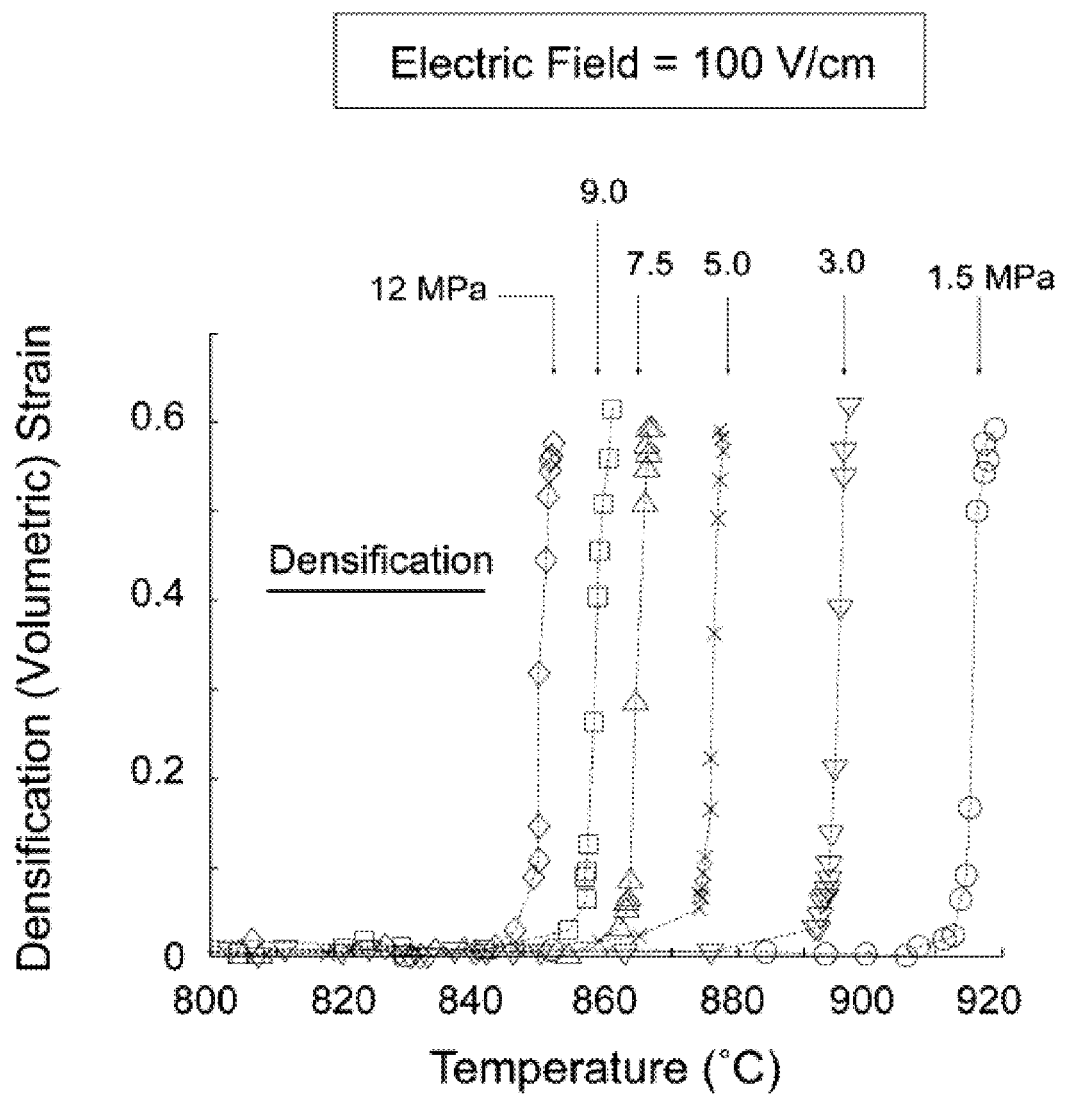
FIG. 30 is a line graph showing the densification strains obtained from the axial and radial strain measurements in FIG. 29. The x-axis is the furnace temperature in ° C.

FIG. 30 gives plots for the densification strains as calculated from Eq. (4). Note that the densification strain saturated at the same value, of ~0.6, at all stress levels. This is because densification stopped when the specimen reached full density. The experimental value of the final density of the specimens was between 95% and 98%. Substituting these values into Eq. (4), and setting ea $|\varepsilon_a|$=0:6, produced a green density $\rho_g$=0.52-0.53, in good agreement with the experimental range.

Figure 31:
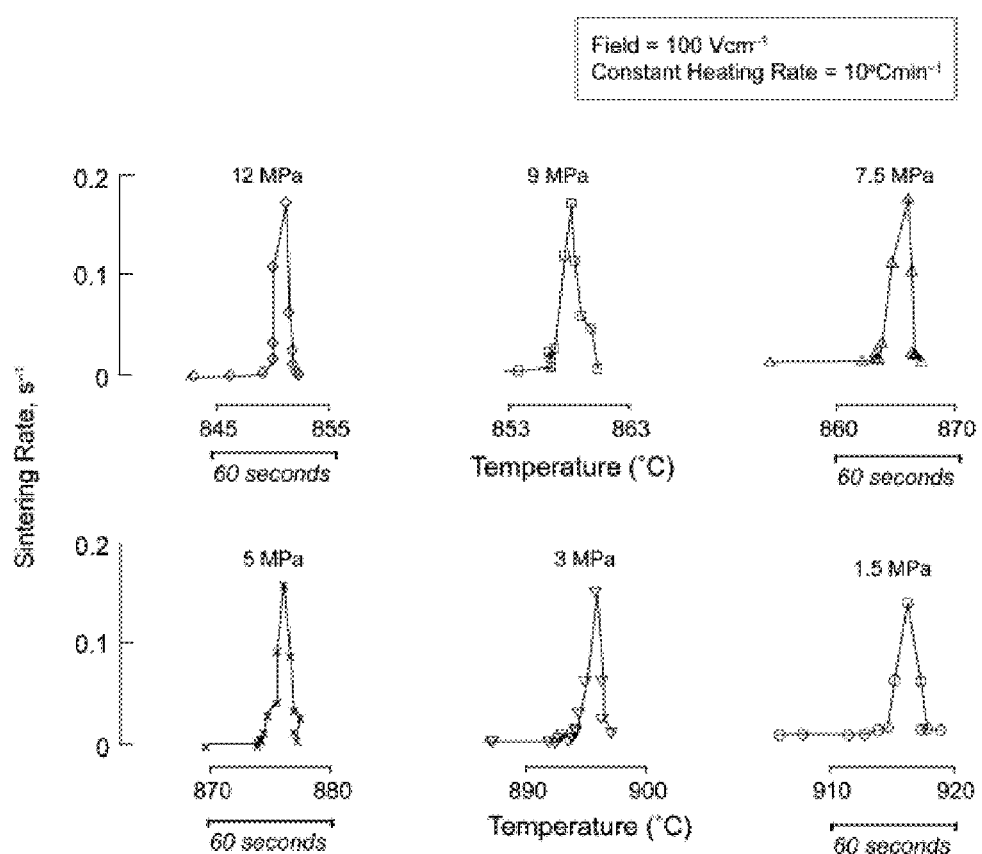
FIG. 31 shows plots of the sintering rates in the flash-sintering regime, derived from data given in FIG. 30. The rates decline to negligible values once the specimens have reached full density. The horizontal axis is marked with both the furnace temperature and time.

FIG. 31 gives plots of the sintering rates on an expanded time-temperature scale. These graphs were derived from the same data that were used for FIG. 30. The plots in FIG. 31 give an idea for (i) the duration of flash sintering, and (ii) the influence of the applied load on the maximum sintering rate. In all instances, the sintering rate increased abruptly as the flash temperature was crossed, and then fell quickly to zero as full densification was achieved. The time scale, given alongside the temperature scale (the heating rate was equal to 10° C./min), showed that sintering was completed in about 10 s. It is particularly significant that the rates of sintering were independent of the applied stress. Instead the applied stress had the effect of lowering the temperature for the onset of flash-sintering.

Figure 32:
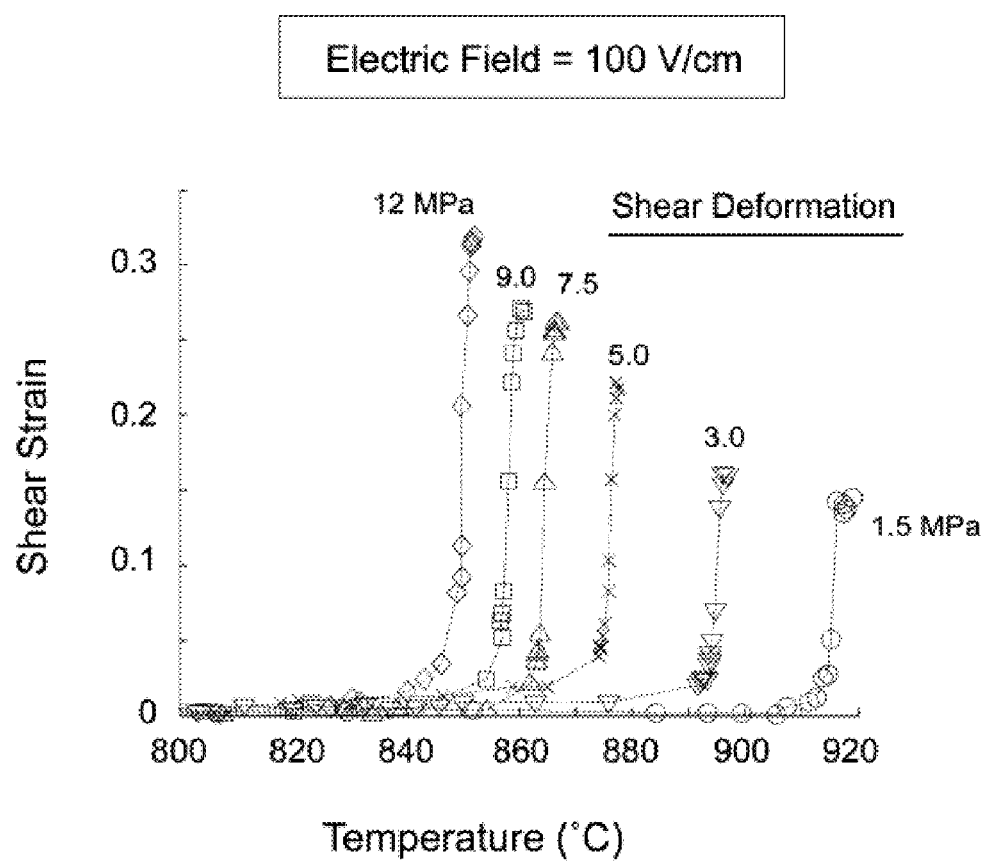
FIG. 32 is a line graph that shows the shear strain obtained from the axial and radial strain measurements in FIG. 2. The x-axis is the furnace temperature in ° C.

FIG. 32 gives plots for the shear strain as calculated from Eq. (3). Unlike densification, the shear strains continued to increase with applied stress (this is not related to temperature since the temperatures are lower for the higher strains). In sinterforging experiments, the specimens were not constrained and therefore could continue to deform in shear. The important finding here was that under the "flash" conditions the specimen could not only densify but also deform at unusually low temperatures. The true strain of 30% achieved in a few seconds at 12 MPa and ~850° C. was quite remarkable and is referred to as field assisted superplasticity, herein.

(2) Constant Load, Variable Field (0-200 V/cm) Experiments

Figure 33:
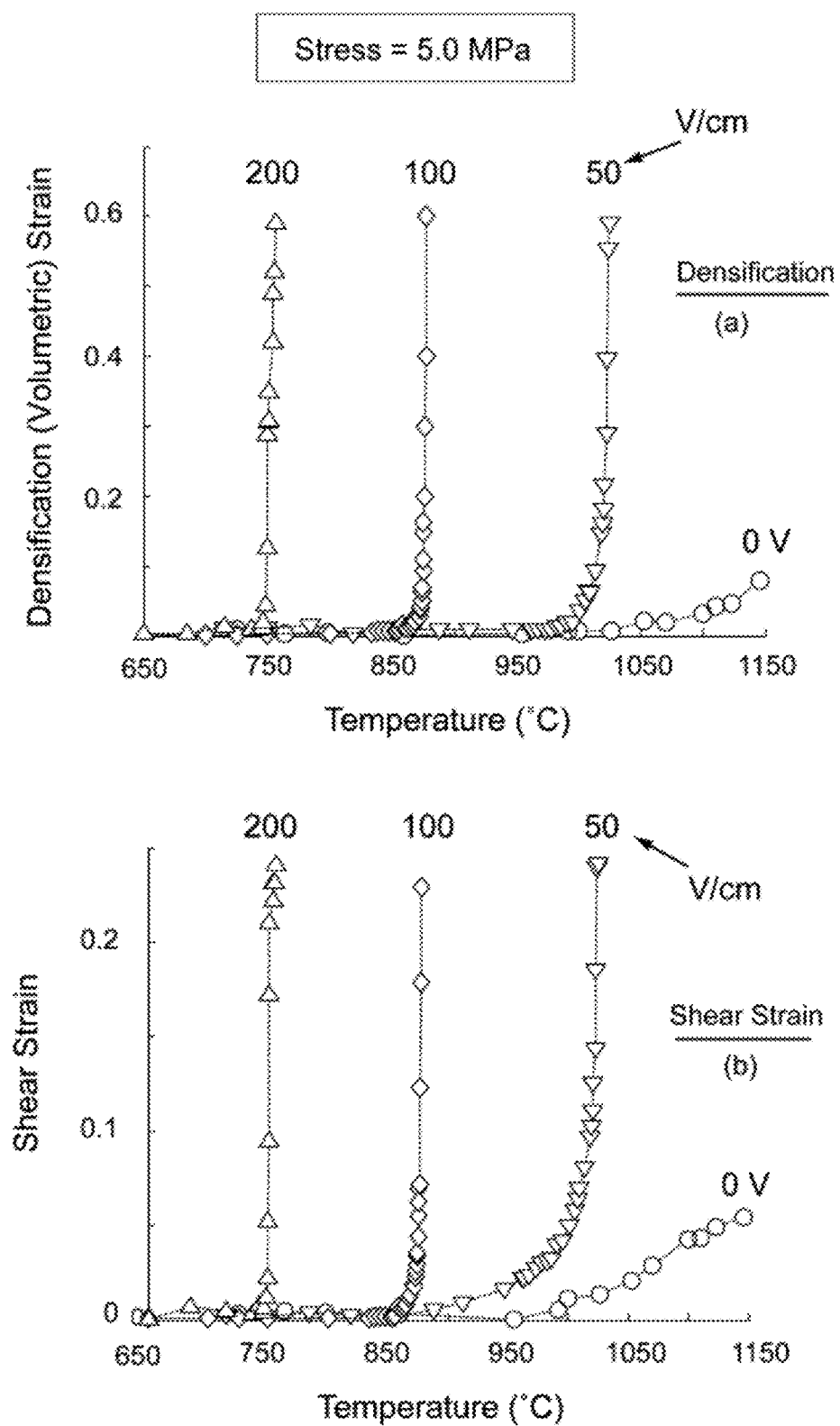
FIG. 33 contains line graphs showing shear strain and volumetric strain using a constant applied pressure of 5 MPa, and various electrical field strengths 0-200 V/cm. The horizontal axis is the furnace temperature.

In these experiments, the applied load was held constant at 5 MPa, while the field was increased from 0 to 200 V/cm. Plots of densification strain and shear strain are given in FIG. 33. It is interesting to compare the graphs for the shear strain in FIGS. 32 and 33. When the experiments were carried out at increasing load (at a constant field), as in FIG. 32, the shear strain increased with the applied stress. However, if the field was increased while holding the load constant, the shear strain remained unchanged. This result provides insights into the role of the field and the stress in field-assisted superplasticity. Applied stress provides the driving force for superplastic deformation; thus the magnitude of the strain increases with the applied stress. The electrical field, apparently, does not contribute to the driving force, since the magnitude of the shear strain is independent of the electric field. The inference is that the field increases the rate of mass transport, not the essential driving force for superplastic deformation.

(3) The Correlation Between Flash-Sintering and the Power Surge

Figure 34:
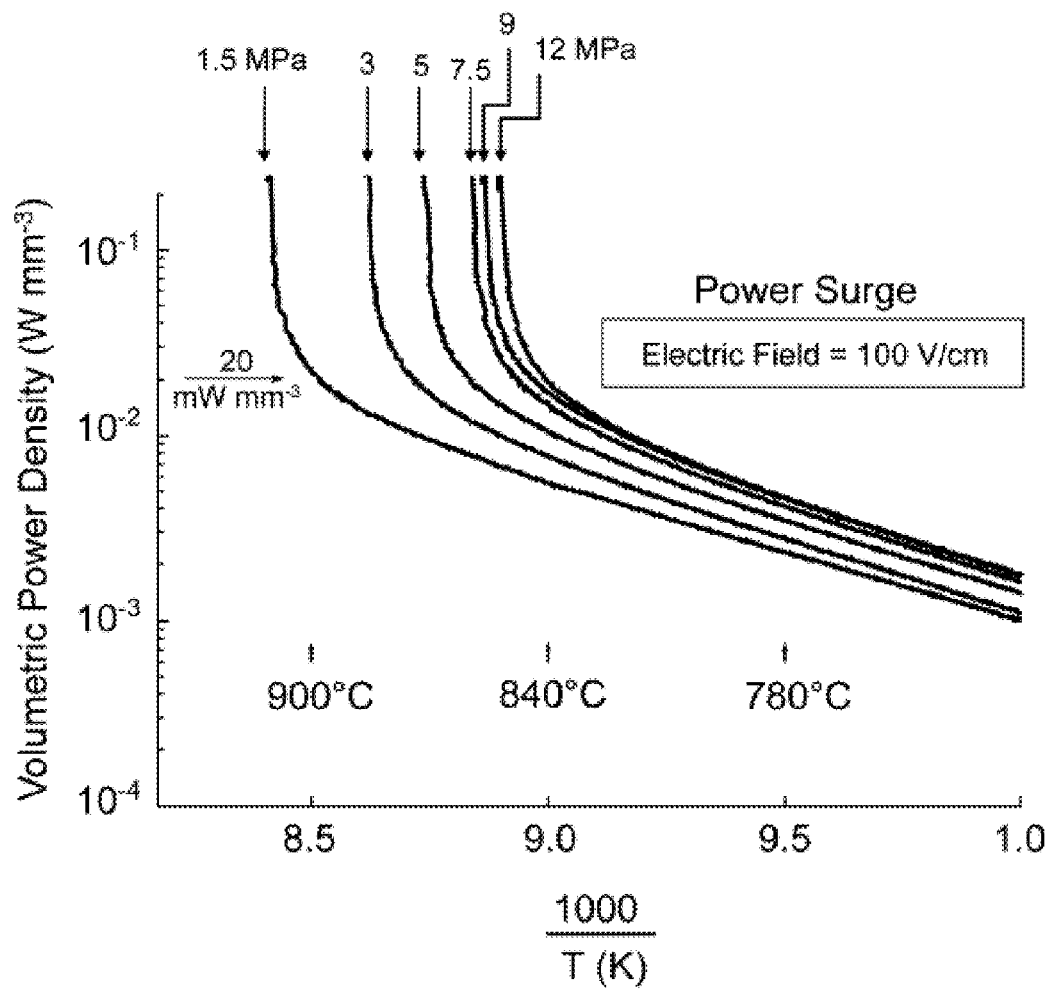
FIG. 34 is a plot of the volumetric power density versus inverse temperature. This figure shows the abrupt power surge accompanying the onset of flash sintering at various stresses.

Flash sintering appears, always, to be accompanied by a power surge, identified by a sudden increase in sample conductivity. In these measurements, the power dissipated in the specimen is calculated as the product of the applied voltage, which is held constant, and the current, which increases abruptly. Therefore, the abrupt increase in power was directly proportional to the sudden increase in the electronic conductivity. The plots for the power dissipated in the specimens at an applied field of 100 V/cm, at different values of the applied stress are given in FIG. 34. The power was normalized with respect to the volume of the specimen, which in the green state was equal to 196 mm³. Interestingly, for reasons that are not clear, the cusp of the power surge appears to occur at the same level of power, ~20 mW/mm³, which corresponds to 4 W of actual power dissipated in the specimen. The power dissipation increases abruptly beyond this point, reaching up to nearly 100 W before the current limit in the power supply comes into play.

Figure 35:
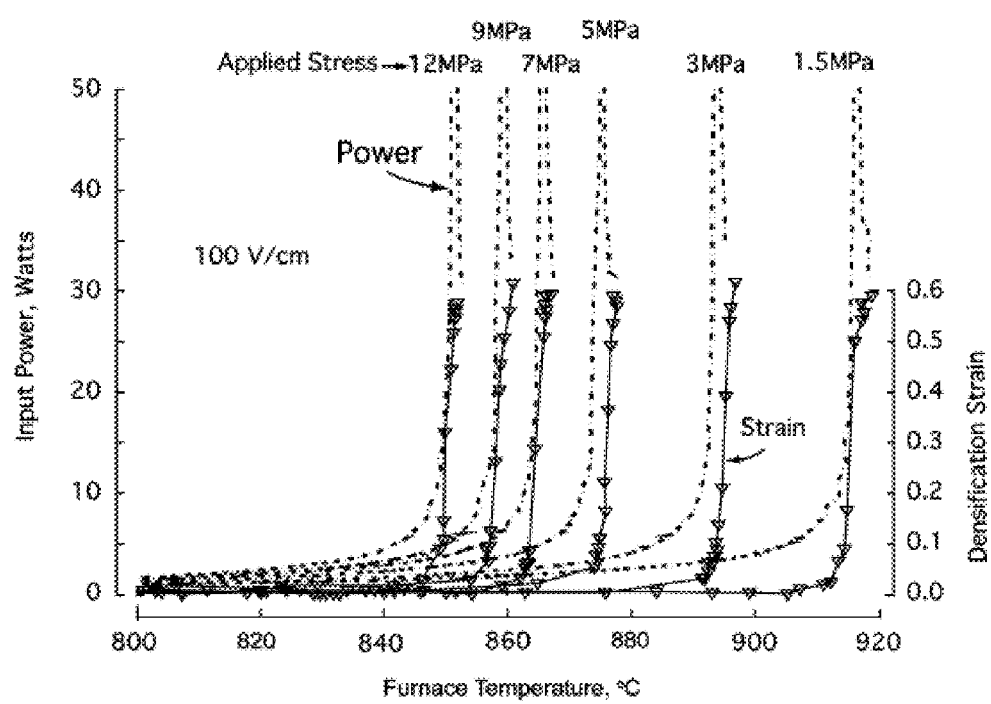
FIG. 35 is a line graph showing the relationship between power surge and densification in time-temperature domain during a constant heating rate experiment. Input power is shown on the left y-axis and plotted with the dashed line. The densification strain is plotted on the right y-axis and shown with the solid line and triangles for each data point. The horizontal axis for all data is the furnace temperature.

The strong correlation between the power-surge and flash sintering is shown in FIG. 35, where data for different applied stresses, at a constant field of 100 V/cm, have been plotted.

The plots for the power were shown in dotted lines, with the scale given on the left. The densification strain was plotted in triangles linked by solid lines, with the scale shown on the right. The maximum point in the power arose from the manner of the experiment. The power dissipation rose since the power supply was voltage controlled: as the current through the specimen rose, so did the power. However, the power supply was programmed to switch to current control when a limit of 1.0 A was reached. Thereafter, the voltage in the specimen dropped since its conductivity continued to increase, even though the current through the specimen was limited. Power dissipation in the specimen, therefore, dropped since it was equal to the product of the current (a constant) and the voltage (declining) It was noteworthy that the conductivity of the specimen continues to increase even when the power dissipation has crossed the peak.

FIG. 35 also shows that densification was coupled to the increase in the conductivity of the specimen. Like the change in conductivity, the densification curve lagged the power surge by a noticeable shift to the right. This lag can be explained in two ways: (i) it may be related to a delay in the temperature rise of the specimen because of the transient nature of Joule heating in the specimen; or (ii) it is also possible that the onset of flash sintering resembles a nucleation event, carrying an incubation time before it is activated. Arguments can be made for both suggestions. While the thermal transient argument is certainly viable, we slightly favor the nucleation mechanism since the onset of flash sintering occurred not during the rising part of the power dissipation curve but instead when the power is declining We pose this dilemma as a question for future work, urging the reader to not assume that the flash sintering effect is solely a consequence of Joule heating.

(4) Measurement of the Specimen Temperature

The correlation between the power surge and densification raises the question of Joule heating. This issue was addressed by measuring the temperature of the specimen with a pyrometer through the same window in the furnace that was employed for the camera. (Consequently, it was not possible to measure the strain and the temperature of the specimen concurrently. However, this was not consequential since the correlation between the power surge and densification has been clearly established in FIG. 35.)

Figure 36:
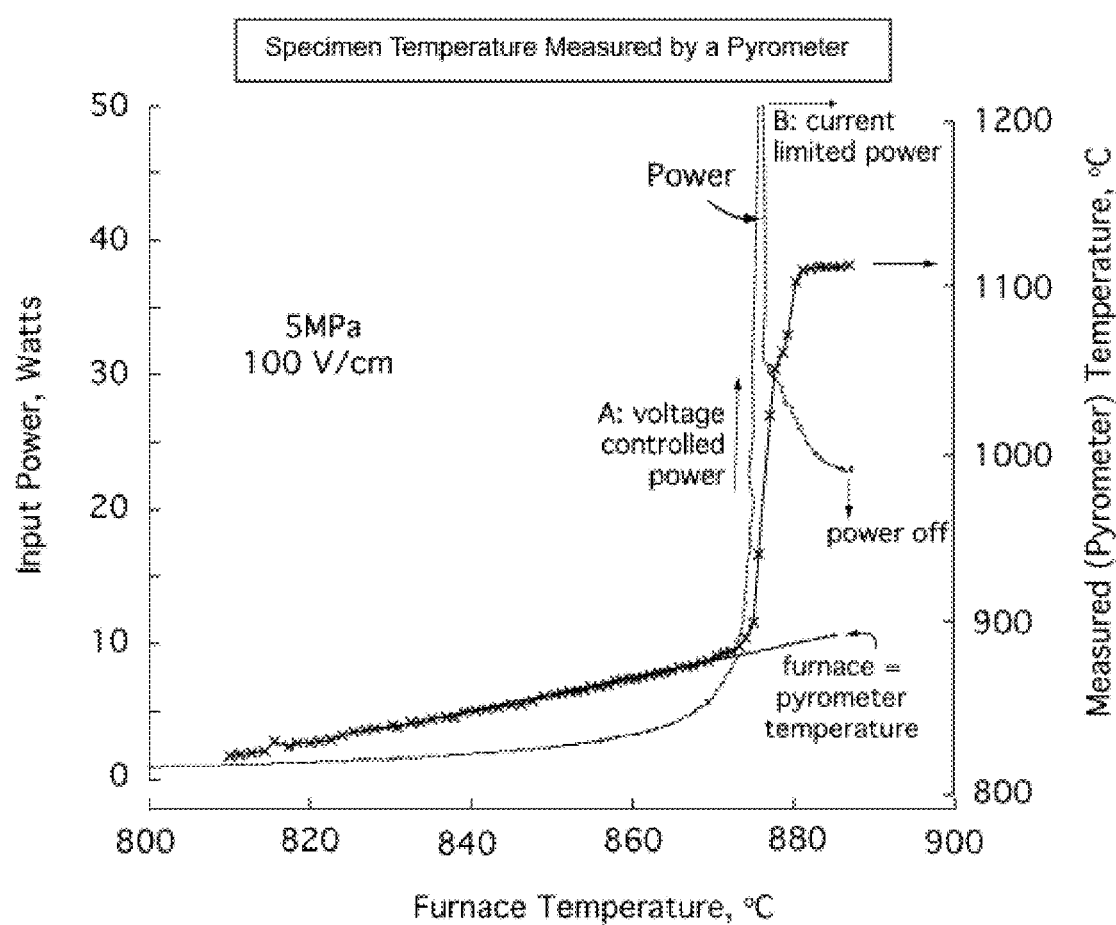
FIG. 36 is a line graph showing measurement of the specimen temperature with a pyrometer during the power surge in a flash-sintering experiment, 100 V/cm and 5 MPa. The input power is plotted on the left y-axis and shown with the dashed line. The Pyrometer measurement is plotted using a solid line and 'x', on the right y-axis. A straight line has been drawn to help show where the pyrometer temperature begins to deviate from the furnace temperature.

The results from an experiment run at 5 MPa and 100 V/cm are given in FIG. 36. The power dissipation is plotted using the dotted line. It consists of two regimes. In the first regime, marked as A, the power supply was operated under voltage control: as the current rose so did power dissipation. Once the current limit set in the power supply was reached, the power supply became current controlled leading to regime B. As the conductivity of the specimen continued to increase, the voltage declined and so did the power dissipation (since power is the product of voltage and current). Eventually the electric field to the specimen as well as the furnace was turned off as shown by the downward arrow.

The measurements from the pyrometer are shown on the same graph with the temperature scale given on the right. At first, the pyrometer tracked the furnace temperature as pointed out by the straight line explained in the bottom right of the figure. But as the power dissipation increased, the specimen temperature moved higher but shifted slightly to the right and mostly in the B-regime where the power to the specimen was declining. Below we show a good correlation between the densification curve and the shape of the temperature data measured with the pyrometer.

Figure 37:
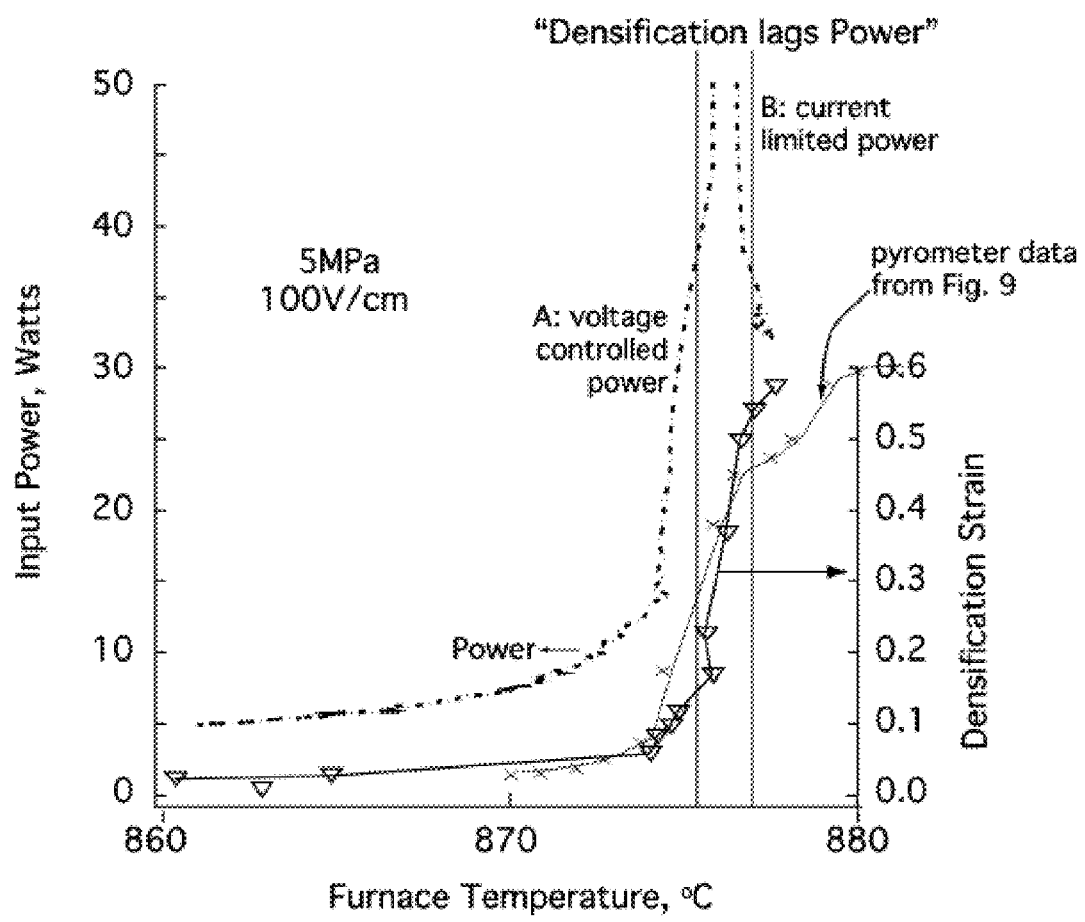
FIG. 37 is a line graph showing an expanded view of the coupling between the power surge and densification, with the pyrometer data from FIG. 36 in the background (faint line with an "x"). The power data are shown with the dashed line and the densification strain is shown as the solid line and triangle.

An expanded view of the power and the densification data, highlighting their interdependence was given in FIG. 37 (this is the same data as given in FIG. 35). It clearly shows that densification occurred not during the rise in the power dissipation but rather during the current-limited regime-B where the power dissipation was declining. The pyrometer data, from FIG. 36, drawn to scale, are included as a faint line in this plot to highlight the lag between specimen temperature and the power surge. These coordinated plots suggest that densification follows the rise in specimen temperature, not the rise in power dissipation. Both densification and the specimen temperature slightly lag power dissipation. It is especially noteworthy that densification is completed when the specimen temperature, as measured with the pyrometer, is about midway between 1000° C. and 1100° C.

Thus, it has been inferred that the specimen reaches full density when its temperature is below 1100° C. This temperature range is far too low for conventional sintering in just a few seconds (without an applied field). Thus, it would appear that flash sintering is not a result of Joule heating, although the surge in specimen conductivity and flash sintering occur together. The question is to identify a mechanism that can simultaneously explain the sudden increase in conductivity as well as the sintering rate. Keep in mind that while the conductivity depends on the transport of electrons, sintering is controlled by transport of charge neutral molecules.

(5) Field Assisted Superplasticity

The results in FIG. 32 conclusively show that the application of electric field produced high rate superplasticity in 3% yttria-doped zirconia. Here, the data for shear deformation is analyzed in terms of the classical equation, in an attempt to elicit how the applied field affects the key parameters for superplastic deformation, namely, the stress exponent, the activation energy, and the pre-exponential for the coefficient of self-diffusion.

Superplastic deformation in ceramics is described by the following equation:

$$\dot{\varepsilon}_e = \frac{B}{d^3} \sigma_e^n D_0 e^{-\frac{Q}{RT}} \quad (5)$$

where $\dot{\varepsilon}_e$ is the deviatoric or shear strain rate, B is a constant, which includes the effect of the relative density of the specimen, d is the grain size, $\sigma_e$ is the deviatoric or the effective shear stress, n is the stress exponent, $D_0$ is the pre-exponential for the diffusion coefficient, Q is the activation energy for self-diffusion, T is the specimen temperature in Kelvin, and R is the Gas constant. The stress exponent, ideally, is predicted to be equal to n=1 for the case of diffusional creep.

Equation (5) gives an opportunity to explore how the electric field can influence the stress exponent, the activation energy and the pre-exponential for diffusion, $D_0$ in the equation for superplastic deformation. The data for application to Eq. (5) are summarized in Table 2.

TABLE 2

Values for the Parameters in Eq. (5) Used to Elicit Values for the Stress Exponent and the Activation Energy

| Applied stress (MPa) | Max. shear strain rate (s$^{-1}$) | Relative density | Furnace temp. (° C.) | Specimen temp. (Est) (° C.) |
|---|---|---|---|---|
| 1.5 | 0.04 | 0.87 | 916 | 1083 |
| 3 | 0.06 | 0.8 | 895 | 1071 |
| 5 | 0.08 | 0.79 | 876 | 1061 |
| 7.5 | 0.09 | 0.88 | 866 | 1056 |

TABLE 2-continued

Values for the Parameters in Eq. (5) Used to Elicit Values for the Stress Exponent and the Activation Energy

| Applied stress (MPa) | Max. shear strain rate (s$^{-1}$) | Relative density | Furnace temp. (° C.) | Specimen temp. (Est) (° C.) |
|---|---|---|---|---|
| 9 | 0.09 | 0.8 | 858 | 1052 |
| 12 | 0.09 | 0.83 | 850 | 1048 |

The six values of the applied stress are listed in the left column. The measured values of the maximum shear strain rate and the relative density where this occurs are given in the next two columns. The following column gives the furnace temperature. The grain size may be assumed to have been constant since the shear strains were measured at densities that were low enough to retain open porosity, a condition under which there is little grain growth. The question now arises about estimating the specimen temperature under the transient conditions experienced in the experiment.

We attempt to estimate the specimen temperature from the equation derived on the basis of a balance between power dissipation and black body radiation:

$$\frac{\Delta T}{T_0} = \frac{\Delta W}{4 A \sigma T_0^4} \quad (6)$$

Here, $\Delta T$ is the increase in specimen temperature relative to the furnace temperature $T_0$ (in Kelvin), when power $\Delta W$ watts is expended in the specimen. The Stefan-Boltzmann constant is $\sigma = 5.67 \times 10^{-8} \text{W} \cdot \text{m}^{-2} \cdot \text{K}^{-4}$ representing a physical constant. The approximate nature of the analysis is quite apparent. A considerable fraction of the power expended in the specimen is likely to have been drawn away by conduction into the alumina push rods that are in contact with the specimen through the stainless steel electrodes. Therefore, a direct insertion of watts as measured from the power supply, into Eq. (6) is likely to overestimate the specimen temperature. Nevertheless, black body radiation will be important in the overall thermal problem, and the inverse dependence on the fourth power of the furnace temperature in Eq. (6) could be quite important in influencing the specimen temperature. A reverse calculation shows that $\Delta W=10$ W gives a reasonable agreement between the estimate from Eq. (6) and the specimen temperature measured with the pyrometer. The specimen had an exposed surface area of $1.69 \, 10^{-4} \, \text{m}^2$. If $T_0$, the furnace temperature is 875° C., then substituting these values into Eq. (6) gives $\Delta T = 193$ K, that is, a specimen temperature of $875+193=1068$° C. is estimated, in good agreement with the pyrometer reading of ~1075° C. This procedure leads to estimates of specimen temperatures listed in the right hand column in Table 2. There is surely an error in these estimates but, as explained above, the error is systematic and therefore should yield plausible trends in the behavior. Since the estimate of the activation energy depends on how rate changes with a change in temperature, the procedure given below is expected to yield reasonably credible values for the activation energy.

The values in Table 2 may be used to obtain a value for n and Q by rewriting Eq. (5) in the following way:

$$\log_{10}\left(\frac{\dot{\varepsilon}_e}{\sigma_e^n}\right) = \frac{-Q}{2.3R} \cdot \frac{1000}{T(\Delta W)} + A \quad (7)$$

Figure 38:
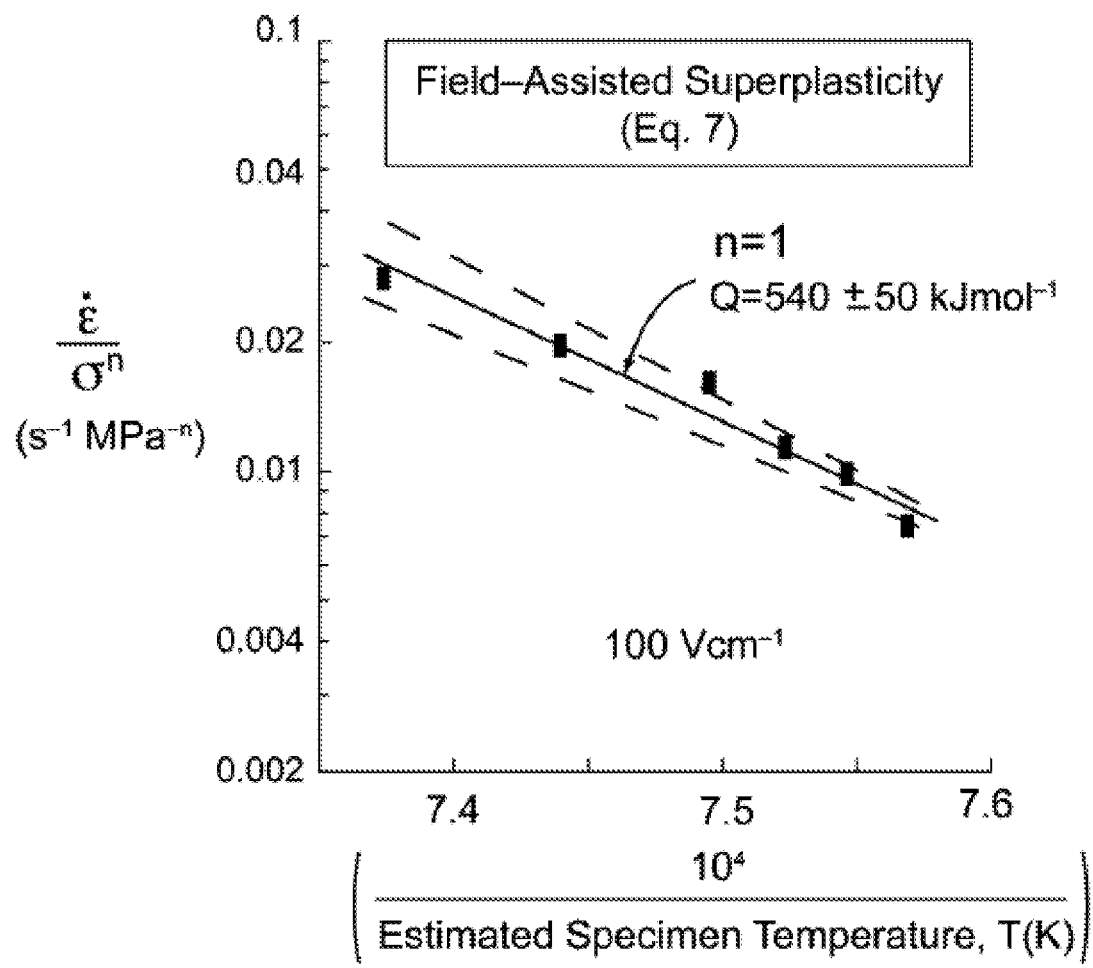
FIG. 38 is a plot of data according to Eq. (7), using the estimated specimen temperature noted in Table 2.

Here, Q is written in units of kJ/mol, and the constant contains the temperature independent variables in Eq. (5). An Arrhenius plot for Eq. (7) is given in FIG. 38, for the case n=1. This plot, yields an activation energy of 540 kJ/mol, in fair agreement with the literature values of 475-550 kJ/mol. In our experiment, higher values of n, commonly found in superplastic deformation of zirconia, yield activation energy numbers that are too high to be compatible with the literature data. For example, a value of n=2 would produce an activation energy of 980 kJ/mol. Furthermore, n=1 is the ideal value predicted from models for diffusional creep. These results suggest that neither the Arrhenius term, nor the stress dependence were affected by the electrical field. The inference is that the electrical field has an influence on the pre-exponential, $D_0$. This point is further addressed in discussion.

(6) Microstructure and Sintered Density

Figure 39:
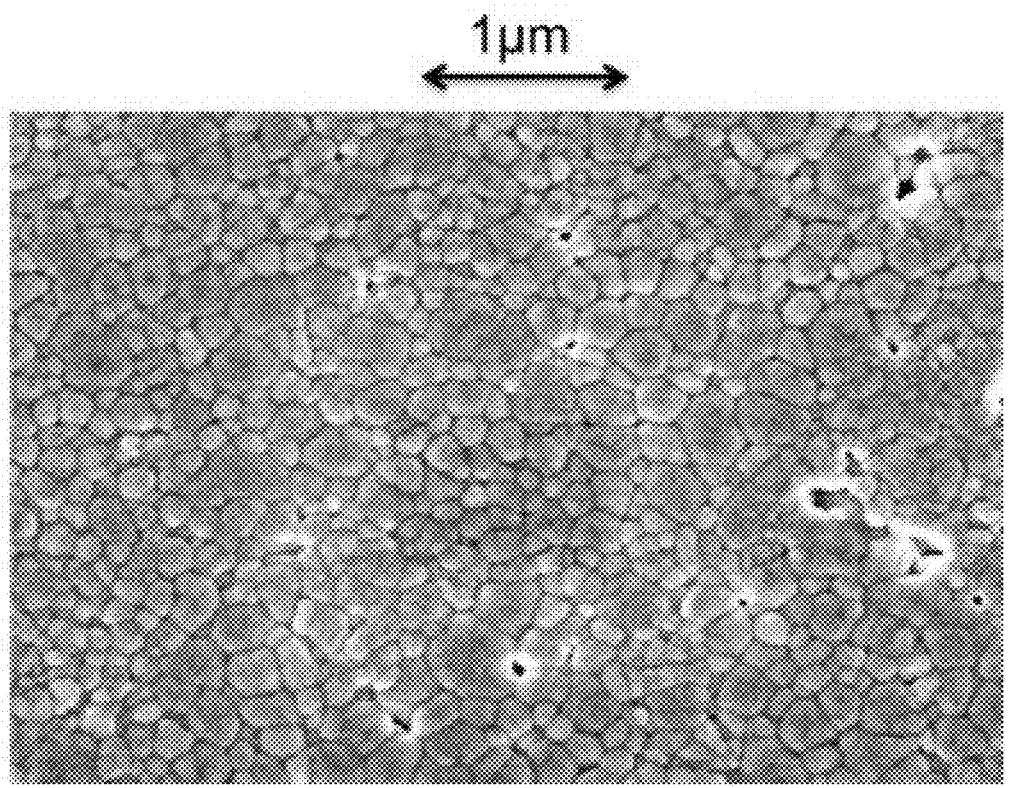
FIG. 39 is a scanning electron micrograph of a polished surface from a flash sinterforged specimen, showing uniform and equal-axis grain distribution.

The density of the samples was measured after completion of the experiment using the Archimedes method, with de-ionized water as the buoyant medium All samples reached a density that was 95%-98% of the theoretical maximum. The samples for the grain size measurement were prepared by polishing with silicon carbide paper and diamond paste down to 1 μm. After polishing, the samples were thermally etched at 1100° C. for 30 min, and then coated with a 0.5 nm film of Au—Pd, and examined in a scanning electron microscope. A typical micrograph is given in FIG. 39. It shows equiaxed grain morphology with some large pores. It is these large pores, which arise from imperfect packing of the particles in the green state which appear to be responsible for the slight short fall in the full density of the specimens.

The grain size in the sintered specimens was determined by measuring the average linear intercept and multiplying that number by 1.56. The average grain size in all specimens was 135±15 nm.

IV. Discussion (1) Summary of Results

The applied electric field and a threshold temperature characterized the phenomenon of flash sintering. This temperature falls as the applied field is increased.

In the present work, the additional role of a uniaxial applied stress on flash sintering has been studied. The three principal results from this work were as follows:

The applied stress acts like the electric field in its effect on the threshold temperature: the critical temperature for flash sintering was lowered as the applied stress was increased.

Flash sintering was accompanied by a power surge resulting in Joule heating of the specimen. Measurements show that the specimen temperature rose to ~1100° C., about 200° C. above the furnace temperature, which is still far too low to explain sintering in just a few seconds.

In addition to sintering, field assisted superplasticity was also observed. The superplastic strain increased with applied stress when the experiments were carried out at a constant field. However, the shear strain remained constant when the applied field was increased while the applied stress was held constant.

Shear deformation, or superplasticity, was driven by shear stress. Therefore, it was to be expected that the shear strain would increase as the applied stress was increased. What is noteworthy is that the magnitude of the shear strain remains constant when different electrical fields are applied at a constant applied stress. The effect of the field was to enable superplastic deformation at lower temperatures. Upon consulting Eq. (5), which is a product of the stress-dependent term, and a kinetic term, we infer that electric field influences the temperature-dependent kinetic term in the equation.

The kinetic term is a product of a pre-exponential, $D_0$, and the Arrhenius term, $\exp(-Q/RT)$. The discussion pertaining to Eq. (7) and FIG. 38 suggests that the electric field does not influence the activation energy. The data (the finding of constant shear strain at different applied fields) suggest that $D_0 \exp(-Q/RT)$ remained constant despite a drop in temperature as the applied field was increased. It can then be argued that a lowering of temperature, which reduced the $\exp(-Q/RT)$ term, must be compensated by an increase in D0 as the field was increased, since the product of these two terms remained unchanged. Thus, an analysis of the superplasticity data suggest that it is this pre-exponential factor of the diffusion coefficient that is significantly enhanced by the electrical field.

More broadly, the exposition of the underlying atomistic mechanism for flash sintering needs to take stock of two important findings from the current work: (i) the applied stress had the same effect on the process as the electrical field: both served to reduce the temperature for the onset of the flash event, and (ii) while flash sintering was accompanied by an abrupt increase in the electronic conductivity of the specimen, the Joule heating produced by the accompanying increase in power dissipation did not produce a high enough temperature to explain sintering in just a few seconds. Instead, it was necessary to discover a mechanism that can simultaneously increase the conductivity and the sintering rate.

(2) Discussion of a Mechanism

The two issues stated just above are addressed in sequence. The coupling between applied stress and the electrical field is explained on the basis of experiments on electro-chemomechanical potential by Pannikkat and Raj. They showed that a normal traction applied to a surface in zirconia generates an electrical potential relative to the surface that is stress free. The reason is that the much higher mobility of oxygen ions (relative to cations) means that the electrochemical potential of these anions must be equal at both the loaded and the stress free interfaces. Since the applied traction changes the chemical potential of these ions at the stressed interface, an electrical potential develops that is equal and opposite to this chemical potential. The potential difference that develops between these two interfaces is then given by:

$$\Delta\phi = \frac{\sigma_e \Omega_{O^{2-}}}{2e} \quad (8)$$

where $\Delta\phi$ is the potential difference in volts, $\Omega_{O^{2-}}$ is the volume of the oxygen ion, and e is the charge of an electron in Coulombs. The factor of 2 in the denominator reflects the charge number for oxygen ions. Following Pannikkat and Raj, we assign, $\Omega_{O^{2-}} = 0.00884$ nm$^3$ and set $e = 1.60 \times 10^{-19}$ Coulombs to obtain a value for $\Delta\phi$ as a function of the applied stress, $\sigma_e$.

The expression in Eq. (8) applies not only to external surfaces but also to internal interfaces where the oxygen ions are mobile. Thus, a difference in the normal traction at the interfaces surrounding a single grain, which after all is the fundamental basis of the models for diffusional creep, would also give rise to $\Delta\phi$ across the grains, creating internal electrical fields that are approximately given by:

$$\Delta E = \frac{\Delta\phi}{d} \quad (9)$$

Therefore, the total electrical field experienced within the grains, $E_s$, will be equal, on the average, to the sum of the applied field, $E^*$, and the internal field given by Eq. (9):

$$E_s = E^* + \Delta E \quad (10)$$

Combining Eqs. (8), (9), and (10), we obtain that:

$$E_s = E^* + \frac{\sigma_e \Omega_{O^{2-}}}{2ed} \quad (11)$$

Figure 40:
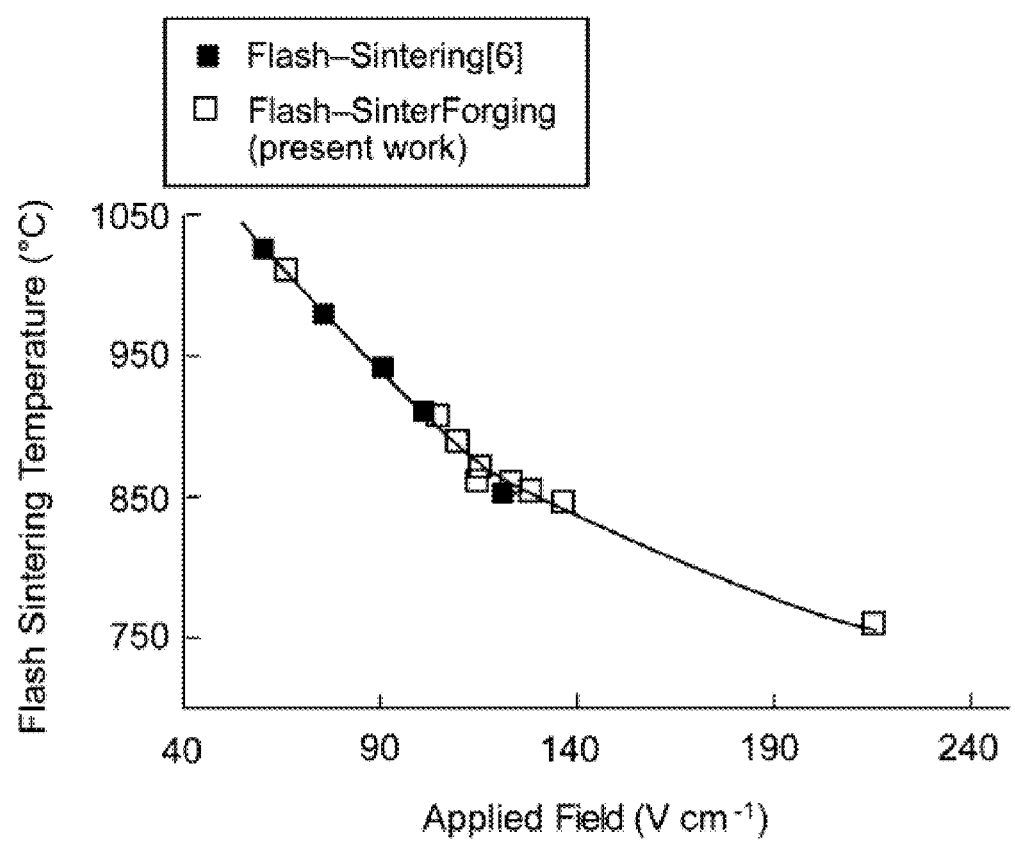
FIG. 40 is the horizontal axis is the total field, plotted against the threshold temperature for flash sintering.

Equation (11) provides a mechanism for coupling the stress and the electrical field to each other in field assisted sintering. In this way, the experiments on free sintering with electrical fields can be combined with the present experiments where stress is an additional variable. The data from free sintering and sinterforging results are summarized Table II and plotted in FIG. 40. The free sintering data are from M. Cologna, et al., "Flash Sintering of Nanograin Zirconia in <5 s at 850° C.," J. Am. Ceram. Soc., 3559, 3556-9 (2010), incorporated herein by reference in its entirety, and the sinterforging data from Eq. (11) (assuming a grain size of ~135 nm). The apparent consistency among these different sets of data in FIG. 40 lends support to the explanation given above.

A mechanism that can explain both the power surge and the enhanced sintering is likely to be complex since sintering requires the transport of mass that is charge neutral, while electrical conductivity requires the transport of charged species through the electrodes that can transmit only electrons. One such mechanism could be the nucleation of Frenkel pairs (a vacancy and an interstitial of the same species) under an electrical field. The pair would have opposite charges on them, one a hole and the other an electron, which can be stripped by the applied field to leave behind charge neutral pair of a vacancy and the interstitial. These two defects will now be able to move independently of one another, and migrate to the grain boundary and the pore, respectively, under the bias of the sintering pressure, to produce sintering, while the electron and the hole will move through the electrodes to feed current to the external circuit.

The Frenkel pair mechanism above is likely to be related to the local chemistry, structure, and space-charge induced electrical fields at and near the interfaces. It seems likely that the nucleation of the defect avalanche would require a concentration of the electrical field at charge heterogeneities within the material which amplifies the effect of the applied field (much like the mechanical amplification of the applied stress at crack-tips which produces fracture at stresses that are below the ideal fracture stress). Grain boundary regions and the local charge configuration within them could be one of these amplification mechanisms.

V. Summary and Conclusions

Flash sintering, defined as densification of a powder compact in just a few seconds at anomalously low temperatures under the application of an electrical field is also observed in sinterforging experiments. These flash events are characterized by a threshold temperature and a dc field. A higher applied field lowers the threshold temperature.

The application of an applied uniaxial stress in sinterforging also affects the threshold temperature. As the stress is increased, the temperature for the onset of flash sintering is lowered.

The flash sintering is accompanied by anomalously high rates of superplastic deformation under the applied deviatoric stress. Rates as high as 0.09 s$^{-1}$ at 850° C. have been achieved with an applied stress of 12 MPa.

The grain size of the specimens appears to remain unaffected by the applied field: it is ~135 nm. This result distinguishes flash sintering from the moderate influence of electrical field on the sintering rate, which, in yttria-stabilized zirconia has been shown to be related to a reduction in grain growth under an electrical field.1

The applied fields do not appear to affect either the stress or the temperature dependence for superplastic deformation, as predicted by classical models. Instead, it is argued that the electrical field affects the pre-exponential in the diffusion coefficient. The pre-exponential is proportional to the defect concentration.

It is proposed that the flash events, induced by the electrical fields may be related to the nucleation of defect avalanches that produce a vast increase in the preexponential term for the diffusion coefficient.

It is suggested that the applied stress and the electrical fields can couple together by the superimposition of the electrical fields generated within the polycrystal by the applied stress, and the externally applied electrical fields. In this way, both serve to lower the threshold temperature.

Example 5

Proposed Mechanisms of Flashsintering

Flash-sintering is invariably accompanied by a highly non-linear rise in the specimen's conductivity. Thus the specimen temperature rises above the furnace temperature. It is shown, below, that flash-sintering is a transient phenomenon, where the power dissipation rises quickly at first, but then declines towards a steady state, as the power supply switches from voltage to current control. The area under the power spike, which is equal to the Joules expended in the sample during the transient, is absorbed by the heat capacity of the specimen. Therefore, the specimen temperature rises gradually towards this steady state through the transient. Whereas the power spike can exceed a peak value of 1000 mW mm$^{-3}$, the dissipation during the current controlled regime is in the 100-400 mW mm$^{-3}$ range. The extrapolation of sintering time from a few hours, as in conventional sintering, to a few seconds, using the activation energy for diffusion, predicts sample temperatures that are far in excess of the measured specimen temperature during flash sintering.

1. Introduction

In flash-sintering a powder preform sinters abruptly above a threshold condition. This transition is prescribed by a combination of the furnace-temperature and the DC electrical field applied directly to the specimen by a pair of electrodes. This phenomenon occurs in several oxide systems, including yttria stabilized zirconia, magnesia doped alumina, strontium titanate, cobalt manganese oxide, titania and magnesium-aluminate spinel. A characteristic feature of this process is that the sudden onset of sintering is accompanied by an equally abrupt increase in the conductivity of the specimen. Immediately the power supply must be switched to current control so as to prevent electrical runaway. In current control the power expended in the specimen declines since the resistance of the specimen continues to fall. The specimen temperature rises gradually through the power-spike towards a quasi-steady state value in this current controlled regime.

The extent of the rise in the specimen temperature is an important first step towards understanding the mechanism of flash-sintering. Higher temperature implies higher diffusion rate of mass transport. The temperature required to sinter in a just a few seconds can be extrapolated from the conventional time and temperature through the activation energy for diffusion. The question is whether or not the specimen temperature reaches this extrapolated value as a result of Joule heating.

There have been at least two attempts to estimate the specimen temperature as a function of power dissipation. In one instance, the specimen temperature was obtained by measuring the thermal expansion as a function of power input. In the other case the temperature was estimated by a numerical simulation. It is important to note that in both cases, power was applied to the specimen at a constant rate until a steady state was reached.

The temperature of the specimen during transient power, as in flash sintering, has also been measured, and is much lower than would be estimated assuming the peak power to be applied to the specimen at a constant rate.

The following sections are divided into three major parts: (a) Joule heating for steady state power dissipation, (b) the transient case of flash sintering, and (c) estimate of the specimen temperature that would be required to sinter yttria stabilized zirconia in just a few seconds, which is then compared to the specimen temperature discussed in the previous sections.

The flash-sintering experiments can be divided into two categories: sinterforging where a field as well as a uniaxial stress is applied to the specimen, and free, two electrode experiments where the electrical field is applied to the ends of an otherwise unconstrained specimen.

The experiments that are discussed below were carried out on yttria-doped zirconia: 3YSZ and 8YSZ.

2. Case I: Steady State Power Dissipation

This section is divided into three subsections. In the first, a model for Joule heating based upon black body radiation is described. These results are presented in the form of maps that allow a quick estimate of the specimen temperature from the knowledge of the furnace temperature, the steady-state power dissipation, and the surface to volume ratio of the specimen. In the next two sections experimental5 and numerical simulation6 data are compared with the black body radiation model.

2.1. Black Body Radiation Model for Joule Heating

If a sample initially at the furnace temperature, $T_0$, is heated electrically then the rise in its temperature, to T, relative to $T_0$, can be estimated by assuming that the difference in the black body radiation at T and $T_0$ is equal to the heat dissipated within the sample. This approach assumes that convection and conduction losses into the environment are negligible. Black body radiation increases as $T^4$, therefore it is greater than the convection losses above about 800° C. (at dull red color). The conduction losses, however, depend greatly on the electrode and system configuration and, therefore, cannot be estimated generally.

The estimate for T was analyzed in an earlier paper for small rise in the sample temperature. It is derived in Yang D, et al. Enhanced sintering rate of zirconia (3Y-TZP) through the effect of a weak dc electric field on grain growth. J Am Ceram Soc 2010; 93(10):2935-7, incorporated herein by reference in its entirety, which expressed in incremental form becomes:

$$\frac{\delta T}{T} = \frac{\delta W}{4A\sigma T^4} \quad (1)$$

Integrating Eq. (1) between the limits of 0 to W, as sample temperature rises from $T_0$ to T, leads to the following equation:

$$T = \left[T_0^4 + \frac{W}{A\sigma}\right]^{1/4} \quad (2)$$

In Eq. (2), $\sigma=5.67\times10^{-8}$ W m$^2$ K$^{-4}$ is a universal physical constant, A is the surface area of the sample in m$^2$, W is the electrical energy dissipated in the sample in W, and the temperature is expressed in K. Eq. (2) assumes the emissivity of the ceramic to be unity; indeed for most oxides its value is greater than 0.9. Later, the discrepancy between theory and experiment is tied to this assumption: a true emissivity that is less than one would give higher specimen temperatures than calculated here.

The surface area of the sample, A, depends on the sample geometry. It is useful to normalize W with respect to the volume of the sample, written here as V, so that:

$$W_V = \frac{W}{V} \quad (3)$$

where $W_v$ is in units of Wm$^{-3}$.

Eq. (2) can now be rewritten in normalized form as follows:

$$\frac{T}{T_0} = \left[1 + \frac{W_V}{\sigma T_0^4}\left(\frac{V}{A}\right)\right]^{1/4} \quad (4)$$

Note that V/A is the volume to surface ratio, with units of m.

It can be more convenient to write $W_v$ in units of mW mm$^{-3}$, and V/A in units of mm, in which case Eq. (4) becomes:

$$\left\{\frac{T}{T_0} = \alpha\left[1 + \frac{1000W_V(\text{mW mm}^{-3})}{\sigma T_0^4}\left(\frac{V}{A}(\text{mm})\right)\right]^{1/4}\right\} \quad (5)$$

where the units for the key parameters are shown in brackets. α is a correction factor to account for the fact that the emissivity of the sample is less than unity; therefore α≥1, with α being greater than one if the emissivity is less than unity. The predictions from Eq. (5) are mapped in FIG. 41, with the assumption that α=1. The power dissipation and the furnace temperature are the axes. Knowing these two parameters, the estimate of the specimen temperature can be read quickly. Since the results depend on the volume to surface area ratio, four maps for (V/A)=0.5, 0.75, 1.0, and 2.0 mm are given. For example, if the furnace temperature is 1100° C., then in order to reach a specimen temperature of 1450° C., a power density of 600 mW mm$^{-3}$ would be required for (V/A)=0.5 mm, or 150 mW mm$^{-3}$ if (V/A)=2.0 mm, and so on. The predictions from Eq. (5) are compared to experiments and a numerical simulation in the next section.

In the following sections we shall find that Eq. (5) underestimates the specimen temperature by 100-200° C., most likely because the oxide has an emissivity that is less than unity.

2.2. Comparison with Numerical Simulation6

Soon after the publication of flash-sintering in 3YSZ zirconia, the experiment was repeated as described in Grasso S, et al., Modeling of the temperature distribution of flash sintered zirconia. J Ceram Soc Jpn 2011; 119(2):144-6, incorporated herein by reference. Grasso et al. sought to explain the phenomenon in terms of Joule heating by numerical simulation. Their specimen geometry was approximately the same as in Cologna M, et al., Flash sintering of nanograin zirconia in <5 s at 850° C. J Am Ceram Soc 2010; 93(11):3557-9, incorporated herein by reference, that is a rectangular gage section, 21 mm long with a cross section of 3 mm×1.58 mm, which gives (V/A)=0.52 mm. In the simulation they assumed a (steady state) power dissipation of 70 W which corresponds to 700 mW mm$^{-3}$, and a furnace temperature of $T_0$=850° C. The reading from FIG. 41, marked as point (A), predicts a specimen temperature of 1400° C. The simulation gave a range of temperatures in the specimen, with the highest value reaching 1600° C. The underestimate is attributed to the emissivity of the specimen being less than unity.

2.3. Comparison with Experimental Results5

In Baraki R, et al., Effect of electrical field/current on sintering of fully stabilized zirconia. J Am Ceram Soc 2012; 95(1):75-8, incorporated herein by reference in its entirety, the temperature of a 95% dense sample of 8YSZ were measured as a function of the power dissipated in the specimen. The sample was a cylindrical piece, 8 mm in diameter and 4 mm tall, which gives (V/A)=1.0 mm. The furnace temperature was, $T_0$=1200° C. The specimen temperature was estimated from volumetric thermal expansion. These measurements are compared with the prediction of the furnace temperature, from Eq. (5), in FIG. 42. In this instance, the agreement is reasonably fair with the model underestimating the specimen temperature by approximately 100° C. at a power level of 400 mW mm$^3$, as shown by the point (B) in FIG. 41.

3. Case II: Flash-Sintering, the Transient Case

In this section we discuss Joule heating during a flashsintering experiment. Experiments have been carried out by first applying a constant dc electric field to the specimen, and then ramping the furnace temperature at a rate of 10° C. min$^{-1}$. The current in the specimen rose abruptly at a threshold value of the temperature. The power supply was quickly switched from voltage control to current control upon reaching a preset value of the current. The power to the specimen then fell sharply since its conductivity continues to increase, before settling down to a quasi-steady state level. The power-vs.-time curve, therefore showed a spike with an effective width of about 1 s. The question that is addressed in the following sections is how the power dissipation is related to the specimen temperature, in the time domain.

This section is divided into two sub-sections. The first considers flash sinterforging of cylindrical specimens under a uniaxial load. The second considers flash sintering of unconstrained dogbone shaped specimens.

3.1. Flash Sinterforging of 3YSZ

Figure 43:
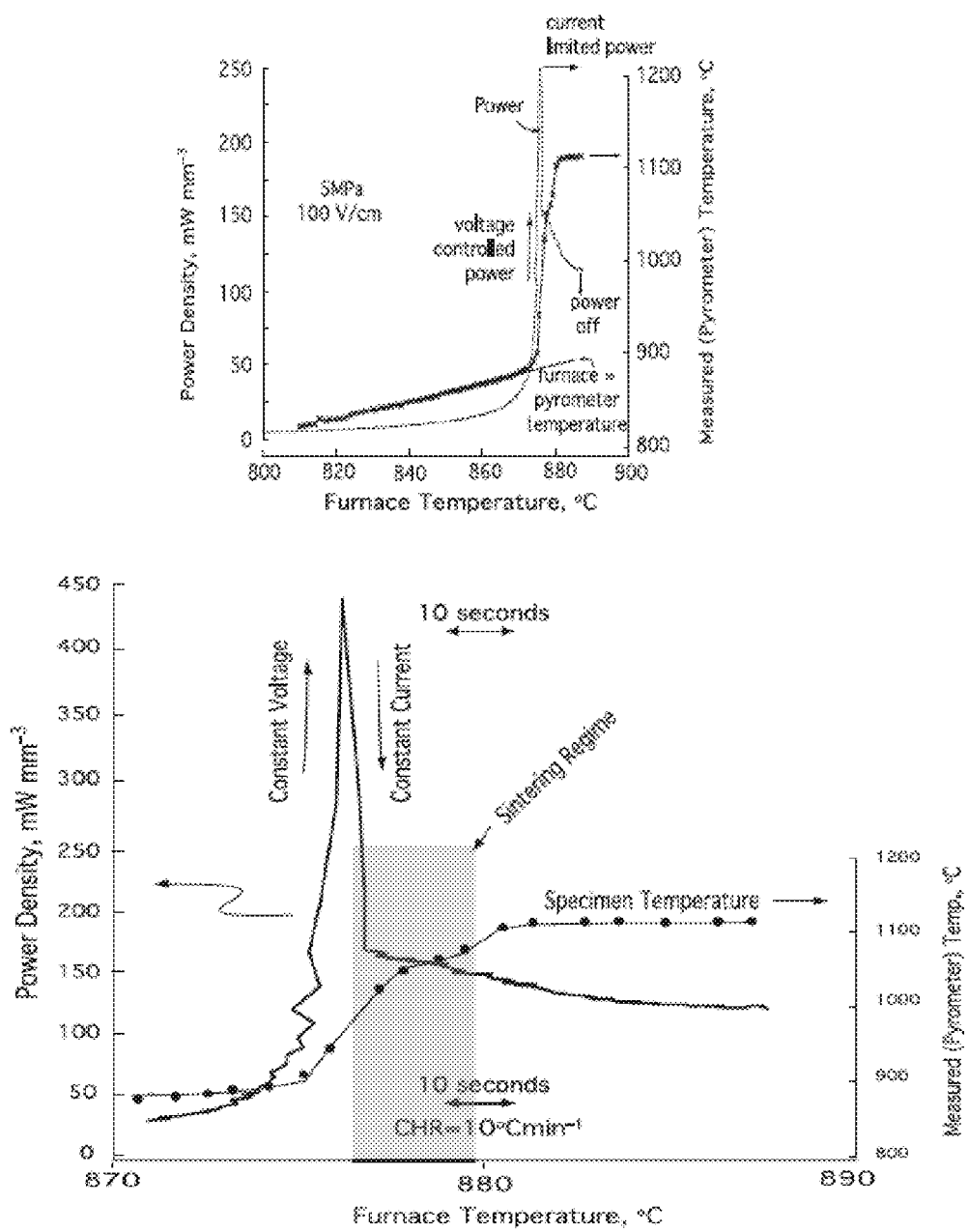
FIG. 43 contains line graphs showing the relationship between the power-density and the specimen temperature in the time domain, in a flash-sinterforging experiment.

A typical set of results from a sinterforging experiment is given in FIG. 43. In this experiment a load of 5 MPa and a field equal to 100 V cm$^{-1}$ were applied. The furnace was then heated at a constant rate of 10° C. min$^{-1}$. The onset of flash sintering took place when the furnace temperature was approximately 875° C. The samples were of a cylindrical shape with a diameter of 5 mm and 10 mm long, giving a value (V/A)=0.75 mm (considering only the bare surface of the cylinder).

The temperature of the specimen was measured by focusing a pyrometer on its surface. The pyrometer had been previously calibrated with a dense 3YSZ sample placed within a furnace (without applying electrical field) and then raising the furnace temperature in steps up to 1400° C.

The upper graph in FIG. 43 shows the power density, and the specimen temperature. It spans a range from 800° C. to 900° C. Note that the furnace temperature and the pyrometer temperature agree perfectly until the onset of the power surge, when the specimen temperature begins to outpace the furnace temperature. Upon reaching a power density of 450 mW mm$^{-3}$ the power supply was switched from voltage control to current control. The power into the specimen immediately began to decline. Meanwhile the temperature of the specimen continued to increase, through the transient, finally approaching a steady state. At this point the power dissipation in the specimen also approached a quasi-steady state.

An expanded view of the data spanning 870-890° C. is given in the lower half of FIG. 43. The power density immediately falls after spiking at 450 mW mm$^3$, declining to 250 mW mm$^{-3}$ in less than 2 s. Gradually, both the power and the temperature approach a steady state such that a specimen temperature of 1125° C. is achieved at a power density of 125 mW mm$^{-3}$. This measurement is shown as point (C) in the maps in FIG. 41. In this case, the experimental and the calculated temperatures are in fair agreement.

In Section 4 we will estimate how high the temperature must rise above the conventional sintering temperature in order to achieve sintering in just a few seconds.

3.2. Flash Sintering Experiments without Uniaxial Load

Unconstrained flash-sintering experiments have been carried out with dog-bone shaped specimens, suspended into a conventional furnace with two platinum wires that also serve as the electrodes to supply electric field and current to the specimen. The field was applied before the furnace was ramped up at 10° C. min$^{-1}$. The gage section of the specimens was 21 mm long with a rectangular cross section of 1.58 mm×3.0 mm. Explicit details of the method are given in Cologna M, et al., Field assisted and flash sintering of alumina and its relationship to conductivity and MgO-doping. J Eur Ceram Soc 2011; 31(11):2827-37, incorporated herein by reference in its entirety.

In all instances the power-time plot has the same shape as shown in FIG. 43 for the sinterforging experiment.

Figure 44:
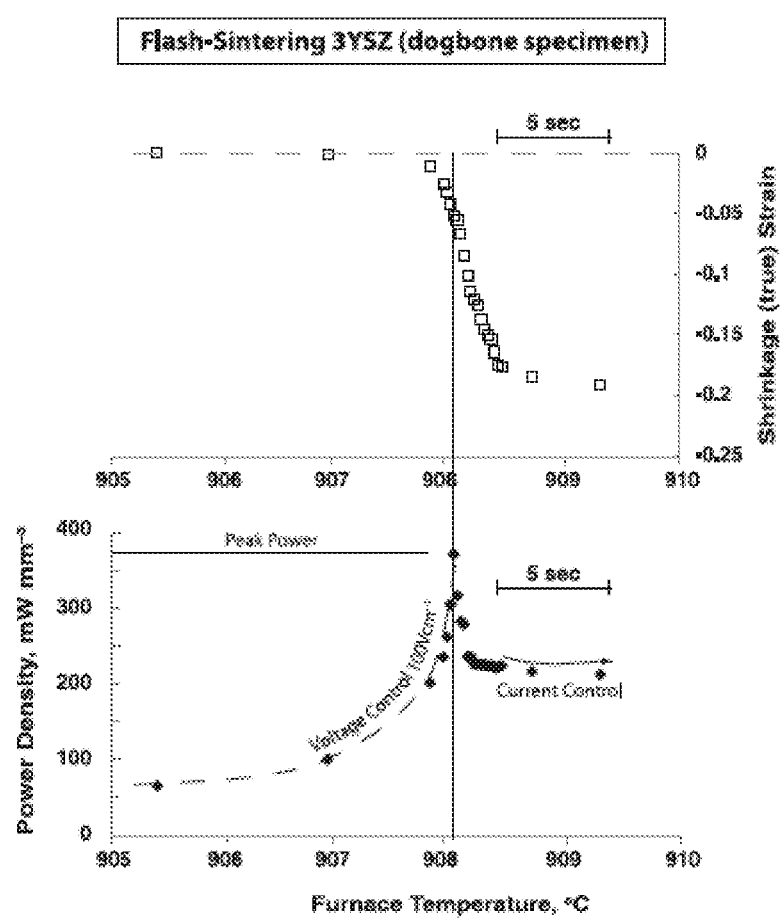
FIG. 44 is a line graph showing the relationship between power density and sintering in the time domain in a flash-sintering experiment with 3YSZ.

A typical result from these experiments, in this instance with 3YSZ, is shown in FIG. 44. It shows the flash regime spanning a total time of 30 s, during which period the furnace temperature rises from 905° C. to 910° C. In this instance the current was limited to 40 mA mm$^{-2}$. The lower graph gives the power-profile, and the upper plot shows the sintering profile. It is to be noted that the power spike is less than 1 s. The steady state power dissipation, which is achieved in current control is about one half the peak value, at approximately 200 mW mm$^{-3}$.

The DC field required to induce flash sintering varies greatly from one material to another. For example in the case of YSZ the range is from 30 V cm$^{-1}$ to 120 V cm$^{-1}$. In MgO-doped alumina the field can be as high as 1000 V cm$^{-1}$, while in the case of cobalt-manganese oxide it is much smaller, about 12.5 V cm$^{-1}$. Yet in all instances the peak value of the power dissipation is nearly the same. The quasi-steady state power in the current control regime usually approaches one half of the peak value, and lies in the 100-400 mW mm$^{-3}$ range. Therefore, the current limit set in the experiments is highly variable. For example, while it was 40 mA mm$^{-2}$ for 3YSZ, it was only 12 mA mm$^2$ for MgO-alumina, but more than 2000 mA mm$^2$ for the case of cobalt manganese oxide.

4. Extrapolation from Conventional Sintering

The absolute rates of sintering in flash sintering are very fast indeed, amounting to just a few seconds. In comparison conventional sintering needs an hour or more to achieve full density. Thus, the sintering rates are three to four orders of magnitude faster in flash-sintering as compared to conventional sintering. Here, assuming that the acceleration in sintering occurs from Joule heating of the specimen, we attempt to estimate how high the temperature must be in order to achieve accelerated sintering of this magnitude.

Figure 45:
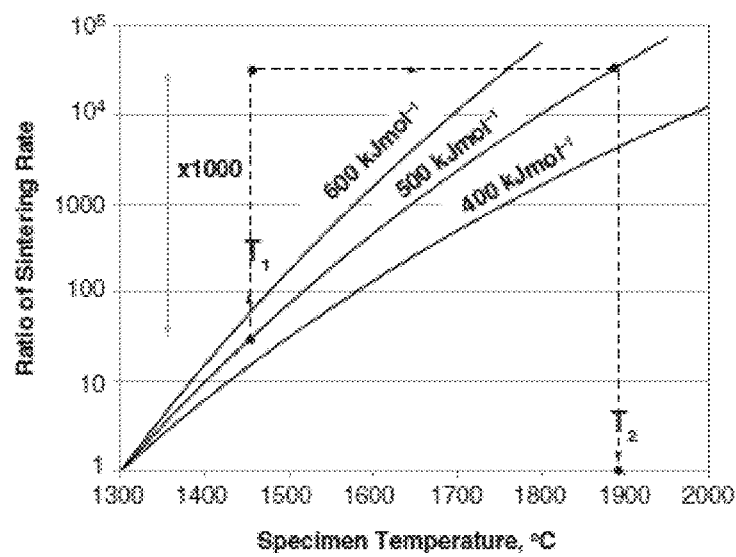
FIG. 45 is a line graph showing the relationship between specimen temperature and the sintering rate for three different values of the activation energy for the coefficient for chemical diffusion. For example, a sample which sinters in an hour at 1400° C., would require a temperature of 1800° C. to sinter in 3.6 s, assuming an activation energy of 500 kJ mol$^{-1}$.

The Arrhenius form of the diffusion coefficient immediately leads to the following equation for establishing this relationship:

$$\log_{10} \frac{Rate_2}{Rate_1} = \frac{Q}{2.3R}\left(\frac{1}{T_1} - \frac{1}{T_2}\right) \tag{6}$$

where the subscript 1 refers to the temperature for conventional sintering, and subscript 2 corresponds to the higher rate at the higher temperature. Plots of Eq. (6) for three values of the activation energy, Q=400, 500, and 600 kJ mol$^{-3}$, are given in FIG. 45. These graphs permit a quick estimate of the temperature that would be required to accelerate the sintering rate by several orders of magnitude.

For example, assume that conventional sintering of 3YSZ requires 1 h at 1450° C. We wish to estimate the temperature that would be needed to sinter in 3.6 s, that is, 1000 times faster. The graph shows that an increase in the sintering rate by a factor of 1000 would require a temperature of 1900° C., if the activation energy is 500 kJ mol$^{-1}$.10

Figure 41:
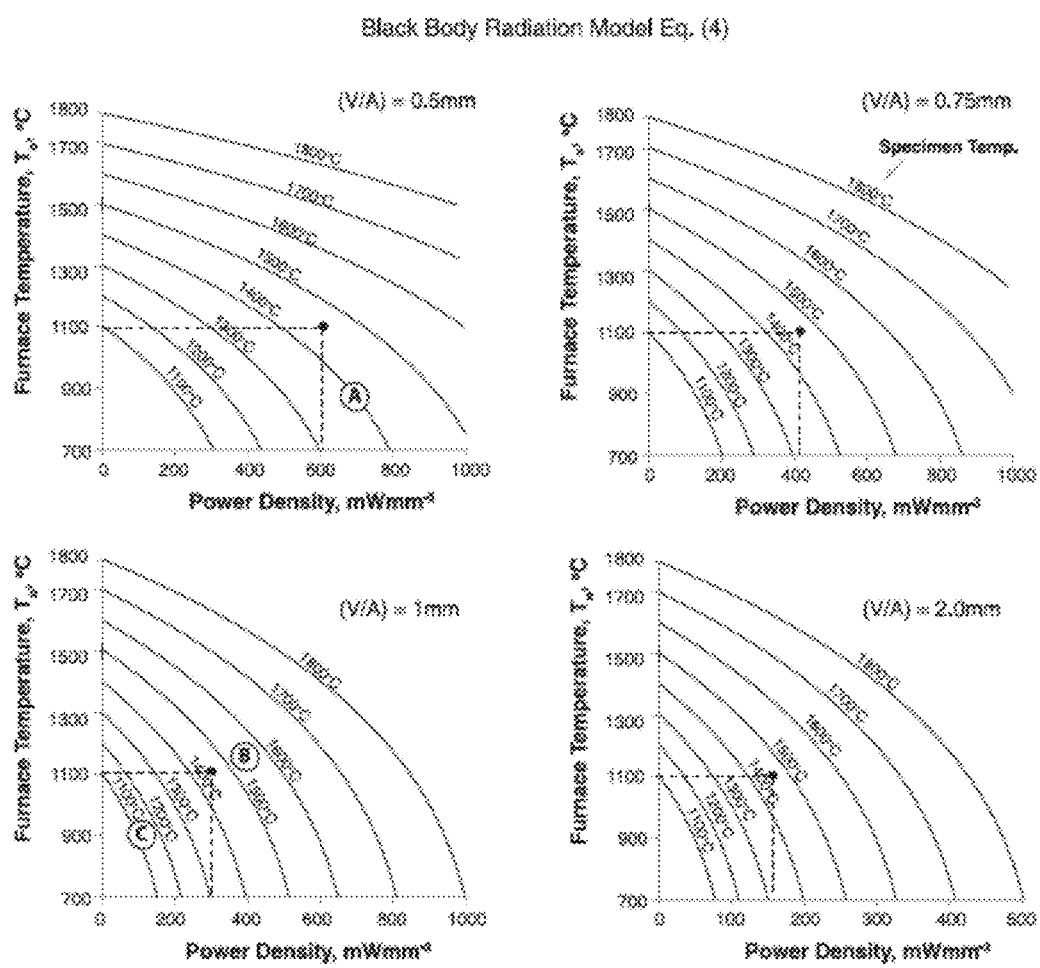
FIG. 41 shows maps for estimating the specimen temperature given the furnace temperature and the power dissipation in the specimen for four different values of the volume-to-surface ratio (V/A). The points A, B and C are from a simulation and experiments. A is from a simulation, B from steady state power dissipation, and C from flash-sinterforging experiment. The model is based upon black body radiation.
Figure 42:
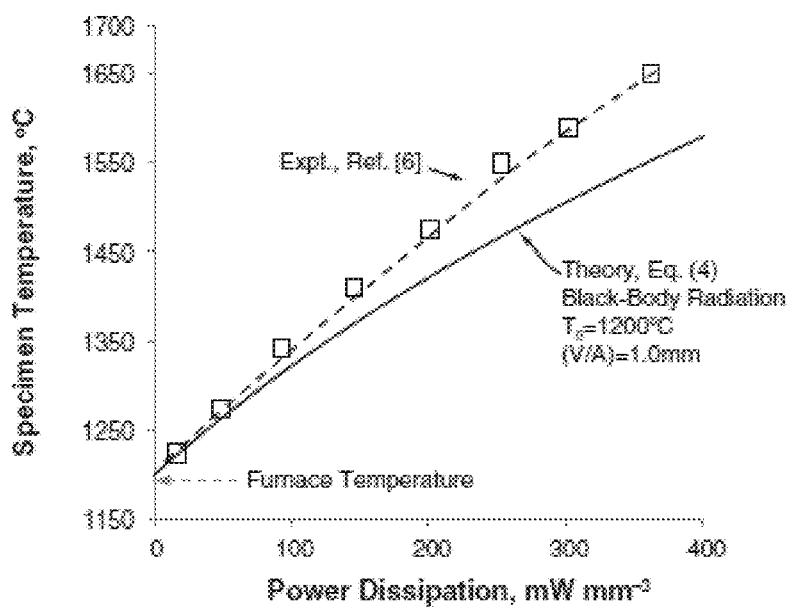
FIG. 42 is a comparison of the black body radiation model with experiments under steady state power dissipation in the specimen while the furnace temperature is held constant at 1250° C.

As seen from the maps in FIG. 41, a power density of 400 mW mm$^{-3}$ at a furnace temperature of 900° C. would yield a specimen temperature of 1250° C., a difference of 350° C. Even allowing that the black body model underestimates the specimen temperature by 200° C., an upper bound value from comparisons presented earlier, the specimen temperature falls far short of 1900° C. that would be required from the Arrhenius extrapolation.

5. The Heat Capacity and the Width of the Power Spike

The results in FIGS. 43 and 44 show the power spike to have a width of approximately 1 s. Assuming a triangular shape of the spike, and the width at half maximum to be 1 s, the power expended in the specimen during this transient would be equal to P$^{max}$w×1 mJ mm$^{-3}$, P$^{max}$w is expressed in units of mW mm$^{-3}$. Even if the peak value is 1000 mW mm$^{-3}$, the highest value seen in our experiments, the energy dissipated as heat in the specimen during this short period would be <1 J mm$^{-3}$. The question addressed here is what would be the increase in the specimen temperature as a result of this heat input into 3YSZ. The density of zirconia is 5.7 g cm$^{-3}$, and its heat capacity varies with yttria content and the phase of zirconia, but is generally in the range 75-85 J K-1 mol-1. We shall assume a value of 80 J K$^{-1}$ mol$^{-1}$ which translates into 0.65 J g$^{-1}$ K$^{-1}$ for the heat capacity for the molecular weight of 123 g mol$^{-1}$. One mm$^3$ of zirconia weighs 0.0057 g mm$^{-3}$, which then gives the following value for the heat capacity per unit volume: 0.004 J mm$^{-3}$ K$^{-1}$.

It follows that heat dissipation of 1 J mm$^{-3}$, with a heat capacity of 0.004 J mm$^{-3}$ K$^{-1}$ would give a temperature increase of 250° C. in the specimen, which is smaller than the temperature rise predicted from black body radiation. The inference is that the heat-dissipated during the power-spike in the flash experiments will be entirely consumed by the heat capacity of the material.

6. Conductivity as a Function of Temperature

In this section the behavior of the conductivity in the non-linear regime is analyzed. The results are from experiments with 8YSZ samples that had a density of 95%, achieved by conventional sintering.

The above analysis is possible because the specimen was operated under current control. A step-wise application of current to the specimen leads to a spike in the voltage generated across it, but which declines quickly to a steady state value. Since the voltage and the current applied to the specimen are now constant the sample is being supplied a constant level of power and a steady state in specimen temperature is established.

The specimen temperature was measured at different values of the steady state current. These data, therefore, permit the calculation of the specific resistivity of the specimen as a function of temperature. (These experiments were done under AC currents; the values for current density are the root mean square, RMS, values.)

The basic equations for the analysis are the current density, j, the electric field, E, the power dissipation per unit volume, $W_v$, and the specific resistivity, $\rho$. The following units for these parameters are used:

$$j \text{ mA mm}^{-2}, E \text{ V cm}^{-1}, W_v \text{ mW mm}^{-3}, \rho \text{ Ohm cm} \quad (7)$$

They are related by the following equations:

$$W_V = \frac{Ej}{10} \text{mW mm}^{-3}, \rho = \frac{10E}{j} \text{Ohm cm, and} \quad (8)$$

$$\rho = \frac{100 W_V}{j^2} \text{Ohm cm}$$

where the units given in Eq. (7) are applied to Eq. (8).

The author of Grasso et al., above, has kindly supplied the data for the current density, and the power density, and the specific resistivity of the specimens as a function of temperature, which are given as Table 3.

TABLE 3

The relationship between specimen temperature (as measured by thermal expansion) and its specific resistance.

| Specimen temperature (° C.) | Specific resistivity (Ohm cm) | Electrical field (V cm$^{-1}$) | Current density (mA mm$^{-2}$) |
|---|---|---|---|
| 1224 | 4.71 | 8.8 | 19 |
| 1274 | 3.80 | 13.6 | 36 |
| 1341 | 3.25 | 17.4 | 54 |
| 1410 | 2.85 | 20.4 | 72 |
| 1476 | 2.55 | 22.6 | 89 |
| 1549 | 2.31 | 24.2 | 105 |
| 1589 | 2.10 | 25.1 | 120 |
| 1650 | 1.93 | 26.4 | 137 |

Figure 46:
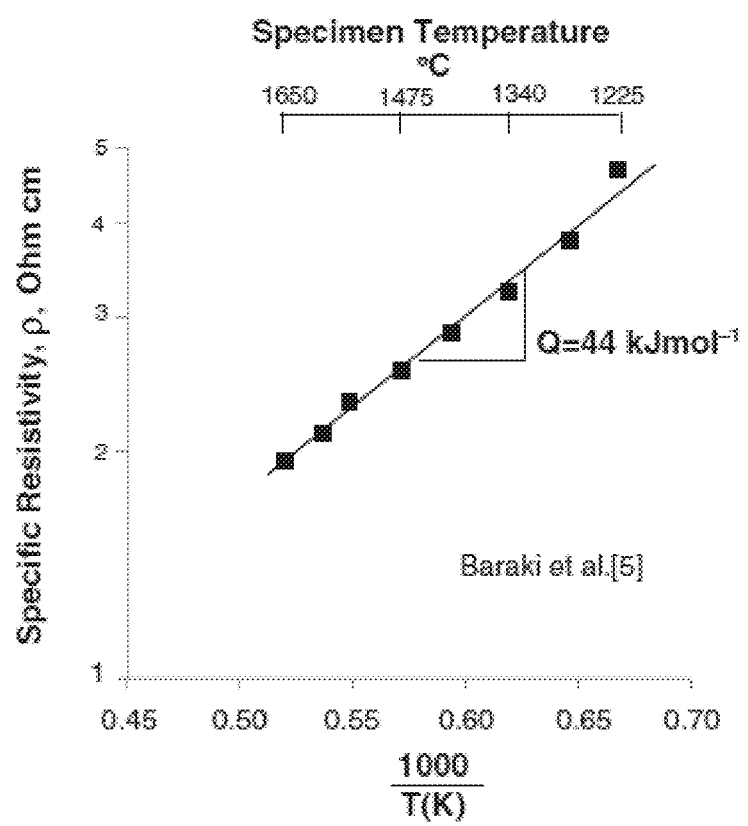
FIG. 46 is an Arrhenius plot of the specific resistivity of the specimen as a function of the temperature.

The numbers show the resistivity to decrease by just a factor of 2.5 when the temperature increases from 1275° C. to 1700° C. An Arrhenius plot of these data in FIG. 46, gives an activation energy of 0.46 eV. Thus, in the "flash regime" the material behaves like a semiconductor with a small band gap.

The conductivity of YSZ under flash conditions, as discussed above, is almost certainly electronic, rather than ionic, for the following reasons:

(i) The activation energy for the diffusion of oxygen ions in doped zirconia ranges up to 1.2 eV. In the case of 8 mol % YSZ the activation energy ranges from 0.8 to 1 eV. Experimentally, the activation energy has been found to increase with increasing yttria content. However, the activation energy declines with increasing temperature which is attributed to the aggregation of defects. Since the experiments for oxygen ion diffusion are usually conducted in the 300-1000° C. range, one can question how low the value of the activation energy may be at much higher temperatures. But the activation energy cannot be lower than the value for hopping energy for oxygen ions, which has been calculated to be 0.63 eV, still higher than the measured value of 0.46 eV.

(ii) High current of oxygen ions through the specimen would lead to reduction of zirconium oxide at the cathode into zirconium metal, which we do not find.

(iii) We have observed that the anode where oxygen ions oxidize into oxygen heats up due to the high electrode-interface resistance arising from the release of oxygen. However, upon entering the flash regime, the electrode immediately cools, which is explained by a transition to electronic conduction which renders the metal-electrodes to become non-blocking.

7. Discussion

The phenomenon of flash sintering has an important characteristic: the onset of rapid sintering is accompanied by a highly non-linear increase in the conductivity of the specimen. The dichotomy in understanding the underlying mechanism arises from the difference in the fundamental nature of electrical conductivity, which is controlled by the fastest moving charged species, and sintering, where mass transport is controlled by slowest moving charged species.

This dichotomy may be resolved by Joule heating. The argument being that the rise in temperature arising from Joule heating, produced by the sudden increase in electrical conductivity, increases the rate of chemical diffusion. If the power density exceeds 1000 mW mm$^{-3}$ then it is conceivable that specimen temperatures of up to 1800° C. can be reached which could be high enough to explain the sintering of YSZ specimens in just a few seconds.

However, the flash sintering experiments do not endure such high power densities in a sustained way. While the peak value of the power-spike can be high, the steady state power density, once the spike has passed, is far lower. The spike occurs because the power supply is switched from voltage control to current control to avoid electrical runaway. Under current control the power declines as the resistance of the specimen continues to fall. The steady state power dissipation regime is approximately 125-200 mW mm$^{-3}$. These levels of power dissipation are unlikely to produce temperatures that would be required to achieve sintering in a few seconds.

What then may be the mechanism for explaining flashsintering? The onset of the flash phenomenon is related not only to the temperature but also to the electrical field. In the flash regime the specimens become electronically conducting. The production of Frenkel pairs and their ionization under the electric field has been proposed to explain the increase both the electrical conductivity and the mass transport.

There remains the question to what extent Joule heating contributes to flash-sintering. The specimen temperature, though several degrees higher than the furnace temperature, remains well below the temperature that would be required to densify in just a few seconds. Therefore, we infer that sintering kinetics is enhanced by the production of defects, as discussed just above. The important question to ask is how Joule heating contributes to the mechanism of defect production.

It is interesting to note that in oxides of different chemistries, ionic and electronic conductivities, and stoichiometry, the power dissipation in the flash-regime usually falls in the 100-400 mW mm$^{-3}$ range, even though the threshold values of field and temperature, for the flash-transition, vary greatly.

This observation raises the question if local heating at grain boundaries is precipitating the instability; this explanation can be explored by studying the influence of the grain size, even extending to single crystals, on the flash-transition.

Recent works on "flash welding" of YSZ powders shows effects similar to those seen in flash sintering. There is a large increase in conductivity above a threshold applied field, and the resistance of the specimen declines thereafter. The authors attributed these observations to Joule heating.

The influence of an electric field on the tensile superplastic deformation of oxides has been studied before. Significant drops were reported in the flow stress, which were partitioned into three components: the first arising from Joule heating, the second being linked to the immediate influence of the field on transport kinetics since the flow stress is seen to fall and rise as the field is turned on and off, and the third being related to the cumulative influence of the applied field on the microstructure—principally grain growth—during the experiment. The large effect seen in the on-off experiments with MgO-doped alumina are particularly noteworthy. In view of the very high furnace temperatures in these experiments it is possible that the samples were being operated in the high conductivity regime (while the fields used in the deformation experiments were lower than those in flash sintering of $MgOAl_2O_3$, the furnace temperatures were much higher; the critical field for the flash event declines as the furnace temperature rises). Measurements of the power density would serve to clarify this point.

8. Conclusions

Flash sintering of several oxides is invariably accompanied by a sudden increase in the conductivity of the specimen. This observation requires a mechanism that can explain a simultaneous increase in electrical conductivity and mass transport kinetics. However, the first is controlled by the fastest moving, and the latter by the slowest moving charged species.

Joule heating of the specimen is a simple way to explain this coupling between charge and mass transport. The transient nature of the flash-sintering process, however, requires care in estimating the specimen temperature. The increase in conductivity produces a surge in power dissipation when a constant voltage is applied to the specimen. The power supply switches to current control when the power reaches a preset value, which causes the power dissipation to decline and finally approach a steady state. The analysis of this power spike shows that specimen temperature is determined not by the peak value of the spike, but by the steady state value of the power dissipation in the current controlled regime. The measurement of specimen temperature agrees with these estimated values.

While the specimen temperature rises a few hundred degrees above the furnace temperature, it remains several hundred degrees below the temperature that would be required to sinter the specimen in a few seconds.

Therefore, Joule heating, by itself, cannot explain the phenomenon of flash-sintering. It is proposed that the applied field and the higher specimen temperature act synergistically to produce an avalanche of defects, such as Frenkel pairs, that greatly enhance the rate of mass transport.

Example 6

Particle Sizing Effects

The study of 3 mol % yttria stabilized zirconia (3YSZ) with different particle sizes provides new insights into flash sintering. Four powders, all with the same crystallite size but various particle size were investigated: described as nominally 1 µm (D80=0.51 µm, meaning 80 vol % has a size less than 0.51 µm), 2 µm (D80=0.90 µm), 5 µm (D80=2.11 µm) and 10 µm (D80=3.09 µm). While the furnace temperature for flash sintering, at a field of 100 V cm$^{-1}$, increased from 920° C. to 1040° C. with particle size, the specimen temperature in all instances remained at ~1200° C. The quantum increase in density decreased with larger particles. The grain size distribution of conventionally and flash sintered specimens remained similar, with some evidence of a preponderance of nanograins in the flash sintered specimens. Joule heating was well below the temperatures that would have been required for sintering in a few seconds. An explanation based upon the nucleation of Frenkel pairs is proposed.

1. Introduction

Two electrode experiments where electrical fields were applied directly to otherwise bare specimens were providing incontrovertible evidence for field-assisted sintering phenomenon in oxide ceramics. When applied to 3 mol %1 and 8 mol %2 yttria stabilized zirconia, these experiments have revealed two regimes of behavior. At low fields, typically less than 40 V cm$^{-1}$, the sintering rate increases incrementally relative to conventional sintering. This behavior has been attributed to a reduction in grain growth under an applied field.

At higher fields, typically greater than ~60 V cm$^{-1}$, a new phenomenon is observed: the YSZ specimens sinter almost instantaneously, as if in a flash, above a critical temperature. This threshold temperature decreases as the applied (DC) field is increased. Flash sintering has been observed in MgO-doped alumina, titania, magnesium aluminate spinel, ceria, cobalt manganese oxide and strontium titanate in published and unpublished work from our laboratory. Other groups are also performing field assisted sintering experiments showing similar results.

While the fundamental mechanism of mass transport in flashsintering remains obscure, one feature of this phenomenon is shared by all oxides: the onset of flash sintering is accompanied by a highly non-linear increase in the conductivity of the specimen. The increase in conductivity leads to Joule heating. A careful analysis and direct measurements of the specimen temperature, however, preclude the possibility that Joule heating alone can account for sintering in mere seconds. These findings urge a search for an alternative mechanism to explain this effect. A key question is how it can be that a massive increase in charge neutral mass transport, as required for sintering, is coupled to a similar increase in conductivity, which is controlled by the fast moving charge species. Mass transport, or chemical diffusion is nominally controlled by the slowest moving charge.

The results from particle size effects reported here provide new inputs to the discovery of flash sintering. It was found that the power dissipation at the onset of the flash remained independent of the particle size, as did the maximum temperature of the specimens as measured directly with a pyrometer, even though the furnace temperature for the onset of sintering increased continuously with particles size. A second remarkable observation was that the quantum increased in density during the flash decreased with particle size. We propose Frenkel pair nucleation as a possible route to piecing together this interesting puzzle.

2. Experimental 2.1. The Method

The setup for the flash-sintering experiments is described above, Briefly, the sample was suspended in the center of a vertical tubular furnace by means of two platinum electrodes, which were also used to carry the electrical power to the specimen. The "green" specimen had a dog-bone shape with a gauge length of 2 cm, and a cross section of 1.6 mm×3.3 mm. The handles of the dog-bone had holes through which the platinum electrodes were inserted, like a hook.

The sintering experiment was conducted by applying a voltage to the specimen at ambient temperature, and then heating the furnace at a constant rate of 10° C. min$^{-1}$. In the present experiments two applied voltages were used, 200 V and 40 V or a field of 100 V cm$^{-1}$ and 20 V cm$^{-1}$, respectively. The onset of sintering is accompanied by rapid increase of the power dissipated in the specimen. Therefore, the power supply is set to switch to current control when the current reaches a preset value. Under current control, the power dissipation, which is given by I2R, where I is the current and R is the resistance, begins to decline since the conductivity of the specimen continues to increase. Thus, the shape of the power cycle consists of a sharp spike under voltage control followed by a quick decline towards a steady state under current control. The sample temperature during this protocol, however, rises gradually towards a steady state, with the power spike being absorbed by the heat capacity of the specimen, and the maximum temperature of the specimen being determined by the level of the steady state power supplied to it under current control.

The sintering strain is expressed by the linear shrinkage in the gauge section of the specimen, which is measured from pictures acquired with a CCD camera through an optical filter and a silica window placed underneath the furnace.5 The shrinkage strain is calculated as the true strain, $\in=\ln(l/lo)$, where l is the time dependent gauge-length and $l_o$ is the initial gauge length. The camera is set to record photographs at one-third of a second to one-second intervals.

2.2. Materials

The starting powder for the sintering experiments was tetragonal zirconia doped with 3 mol % yttria (3YSZ), supplied by UCM Advanced Materials GmBH, Germany. Four different particles sized were used, denoted nominally as 1 μm, 2 μm, 5 μm and 10 μm, as per manufacturer's specification. The powder size distributions in terms of D80, D50 and D20 are reported in Table 4.

TABLE 4

Powder size distribution of the UCM zirconia powders (from supplier's certificate of analysis).

| Powder size (manufacturer designation) | D80 (μm) | D50 (μm) | D20 (μm) |
|---|---|---|---|
| 1 μm | 0.51 | 0.33 | 0.21 |
| 2 μm | 0.9 | 0.56 | 0.35 |
| 5 μm | 2.11 | 1.16 | 0.65 |
| 10 μm | 3.08 | 1.69 | 0.85 |

These numbers specify the volume fraction of the particles lying below the D-value. For example, D50=1.16 μm for the particle size group of 5 μm means that 50% of the particles in that group, by volume, have a size that is smaller than 1.16 μm. Alternatively, the D80=3.08 μm and D50=1.69 μm for the group of 10 μm means that the difference, that is, 30% of the particles in this group lie in the range 3.08-1.69 μm.

To prepare the dog-bone shaped specimens the powders were mixed with 5 wt % polyvinyl alcohol (mol. wt. 49,000) in water. The slurry was dried at 90° C. in an oven and ground to a powder in mortar and pestle. The resulting powders were uniaxially pressed at 280 MPa in a dog bone shaped die, to a green density of 55%, 57%, 58% and 59%±1%, for the 1, 2, 5 and 10 μm powders. The dimensions of the cross section of the gage were 1.6 mm×3.3 mm, while the gauge length was 2 cm.

The grain size was measured from images taken with a JSM-7401F field emission SEM (JEOL). Specimens were prepared by polishing to 1 μm, thermal etching for 30 min at 1100° C., followed by coating with a with a 2 nm layer of Au—Pd. The mean grain size was determined by the linear intercept method, with a correction factor of 1.56.

3. Results 3.1. Conventional Sintering

Without the electric field, the samples sintered slowly as the temperature of the furnace was raised. The results are shown graphically in FIG. 47, and summarized in Table 5.

TABLE 5

Results from conventional sintering (0 V). Constant heating rate 10° C. min$^{-1}$ Temperature range: ambient to 1450° C.

| Powder size (manufacturer designation) | Final density | Linear shrinkage strain | Maximum rate of sintering |
|---|---|---|---|
| 1 μm | 96% | 0.182 | 0.00013 s$^{-1}$ |
| 2 μm | 84% | 0.130 | |
| 5 μm | 72% | 0.071 | |
| 10 μm | 68% | 0.046 | |

The samples with the smallest particle size began to sinter at the lowest temperature, approximately 1100° C., and reached the highest density when the furnace reached 1450° C., at which point the experiment was stopped. As the particle size increased the onset of sintering was delayed, and the final density at 1450° C. was consistently lower. The final shrinkage strain was −0.182, −0.130, −0.071 and −0.046, for the 1, 2, 5 and 10 μm powders. The sintered density, ρ, is related to the green density, ρg, through the true linear shrinkage strain, $\in$linear, by the following equation13:

$$3|\varepsilon_{linear}| = \ln\left(\frac{\rho}{\rho_g}\right) \quad (1)$$

Substituting the values for $\in_{linear}$ given just above, and for the green density quoted earlier, the final density of the samples sintered without the electric field was 95%, 84%, 72% and 68% for the 1, 2, 5 and 10 _m powders. Among these only the 1 μm specimen was suitable for mechanical polishing to obtain SEM micrographs of the grain size.

3.2. Flash Sintering

Figure 47:
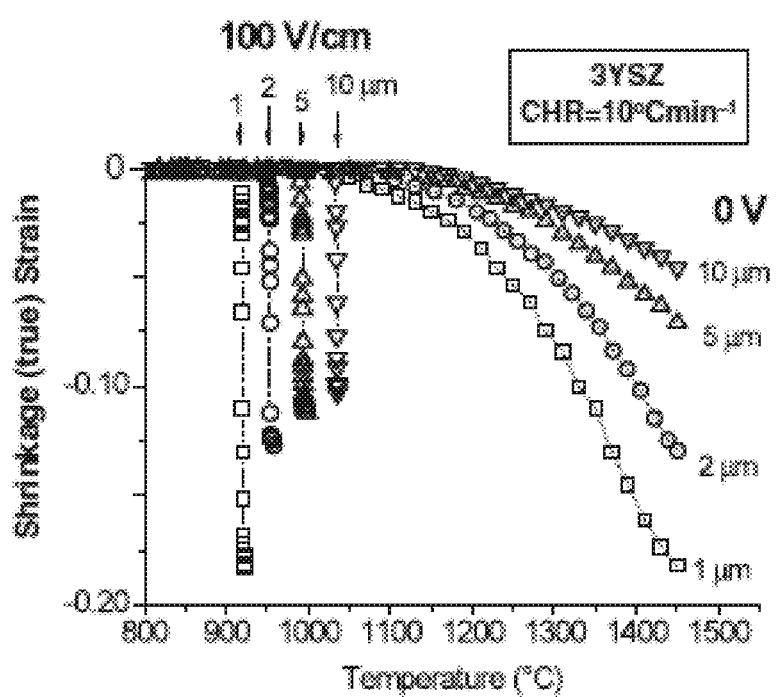
FIG. 47 is a line graph showing shrinkage strain in the four particle size specimens at 0 V and 100 V cm$^{-1}$, measured as the furnace is ramped up at a constant heating rate of 10° C. min$^{-1}$.

Flash sintering was observed in all experiments. The shrinkage strain versus temperature data for different particle sizes at an applied field of 100 V cm$^{-1}$, all obtained at a constant heating rate of 10° C. min$^{-1}$, are shown in FIG. 47. The results are summarized in Table 6.

TABLE 6

Results from flash sintering (100 V cm$^{-1}$). Constant heating rate 10° C. min$^{-1}$ DC field = 100 V cm$^{-1}$

| | Green density | Flash temperature (furnace) | Maximum specimen temperature | Final density | Linear shrinkage strain | Maximum rate of sintering |
|---|---|---|---|---|---|---|
| 1 μm | 55% | 920° C. | 1150 ± 25° C. | 96% | 0.186 | 0.048 s$^{-1}$ |
| 2 μm | 57% | 955° C. | 1175 ± 25° C. | 84% | 0.129 | 0.028 s$^{-1}$ |
| 5 μm | 58% | 990° C. | 1125 ± 25° C. | 82% | 0.115 | 0.017 s$^{-1}$ |
| 10 μm | 59% | 1040° C. | 1200 ± 25° C. | 82% | 0.110 | 0.017 s$^{-1}$ |

The temperature for the onset of flash sintering depends on the particle size, being at 920° C., 955° C., 990° C. and 1040° C. for the 1, 2, 5 and 10 µm powders. The final density decreases with particle size. Using the data in FIG. 47 and applying Eq. (1) the final density is calculated to be 96%, 84%, 82% and 82% for the 1, 2, 5 and 10 µm powders.

Figure 48:
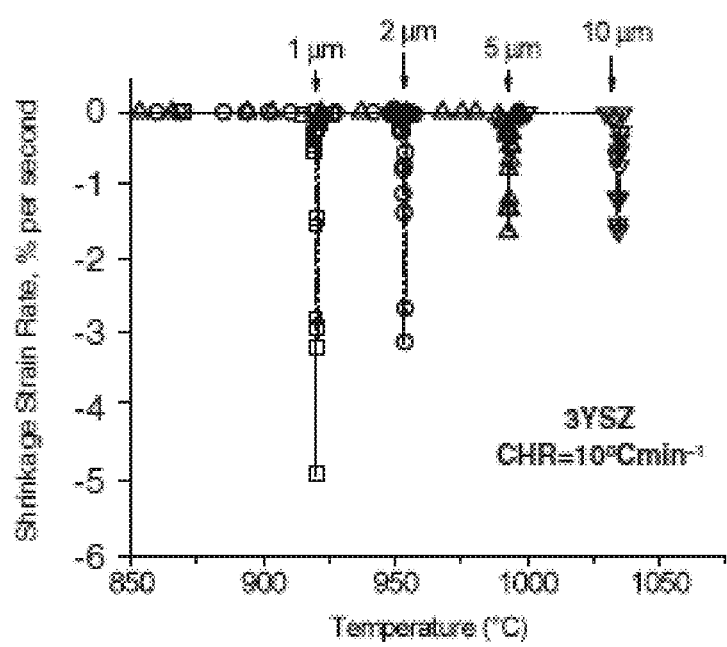
FIG. 48 is a line graph showing the sintering rates for the various specimens during flash sintering.

Since the overall duration of the flash sintering event lasts about 5 s, and since the images of the sample are taken every one second, it is possible to calculate the shrinkage rates during the flash sintering process. These results are given in FIG. 48. They reach a maximum of 4.8% $s^{-1}$ for the 1 µm sample, 2.8% $s^{-1}$ for the 2 µm sample, and 1.7% $s^{-1}$ for the 5 µm and 10 µm samples. Therefore, large particles do not have a significant effect on the rate of sintering, but instead they limit the final density that can be achieved during the flash process.

Comparing the data for 1 µm sample in Tables 2 and 3 shows that the sintering rate with the applied field was nearly 350 times faster as compared to conventional sintering. This difference is all the more remarkable because the furnace temperature for flash sintering was much lower than in conventional sintering.

3.3. Field Enhanced Sintering

Figure 49:
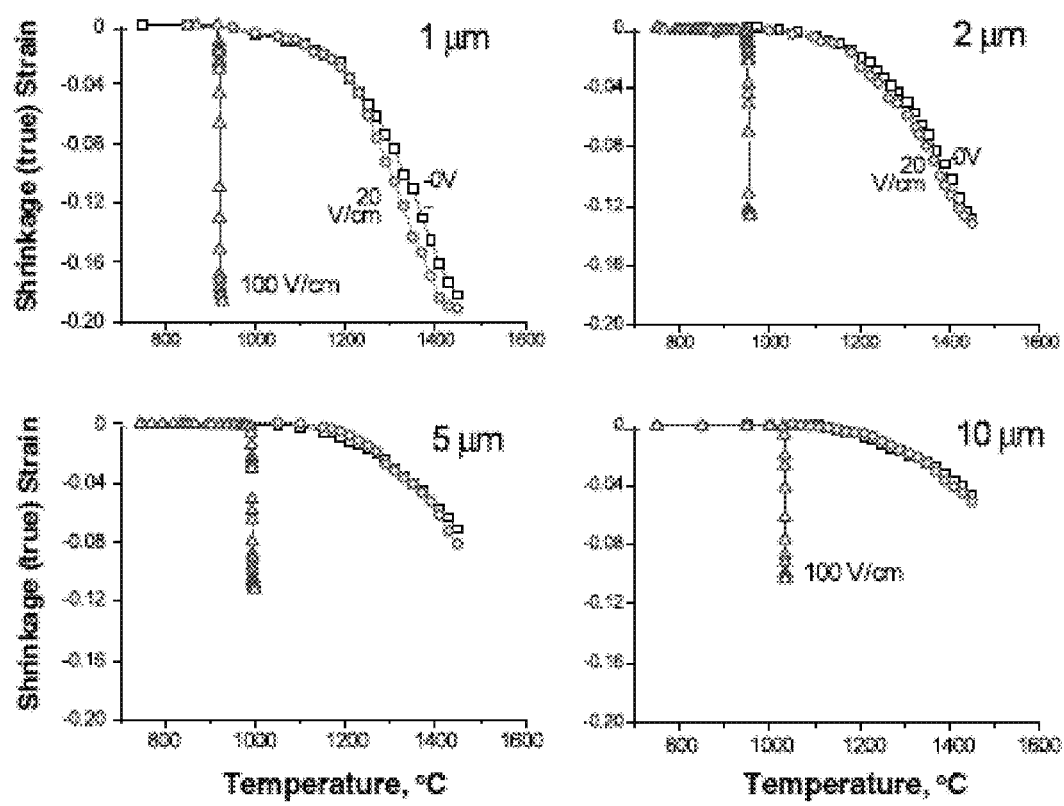
FIG. 49 contains line graphs showing field enhanced sintering at 20 V cm$^{-1}$ in specimens of different particle size.

Field enhanced sintering is characterized by a faster rate of sintering, relative to conventional sintering, without changing the overall character of the sintering curves. Such behavior has been seen in 3YSZ at applied fields that are below the threshold for flash sintering.1 In the present set of experiments this behavior is seen in the 1 µm specimen, and to a lesser degree in the 2 µm sample, but not for the specimens of larger particle size. The results for 0 V and 20 V $cm^{-1}$ experiments are given in FIG. 49.

In earlier work such enhancement in the sintering of 3YSZ has been successfully explained by the influence of the electrical field on grain growth: electric field lowers the rate of grain growth, and since sintering rate is highly sensitive to the grain size, the sintering rate is enhanced. However, the application of this concept requires that the particle size must also be the grain size of the starting powders. If the particles are large, and themselves polycrystals of small grains, as was the case here, then this idea is invalid since the diffusion distance which controls the sintering rate is determined not by the grain size but by the size of the particles, which is of course unaffected by the electric field. This explanation is offered for the absence of enhancement in the large particle size specimens.

3.4. Joule Heating

Figure 50:
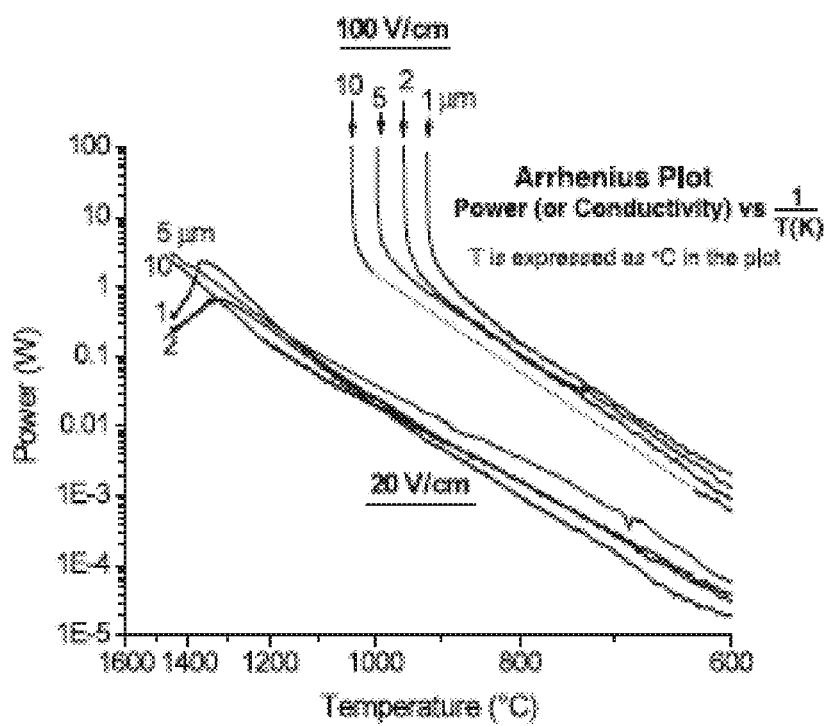
FIG. 50 shows Arrhenius plots for the power dissipation in the specimens in 3YSZ with different particle sizes at 20 V cm$^{-1}$ (field enhanced sintering) and 100 V cm$^{-1}$ (flash sintering).

A sudden increase in the conductivity of the specimen is an indelible signature of flash-sintering. The experimental results shown in FIG. 50 are no exception to this rule.

Under voltage control, where the power flowing to the specimen is given by V2/R where V is the voltage and R is the resistance, the power dissipation continues to increase as the resistance falls. Experimentally this power surge is handled by the power supply switching to current control when the current rises to a preset limit Now the power dissipation is given by I2R; the power dissipation begins to decline as the resistance continues to fall. Eventually a quasi steady-state is approached, which leads to a steady temperature in the specimen. The sample temperature does not show the power spike, since the energy expended in the spike is absorbed by the heat capacity of the specimen. As a result the sample temperature rises continuously towards a quasi-steady state.

Figure 51:
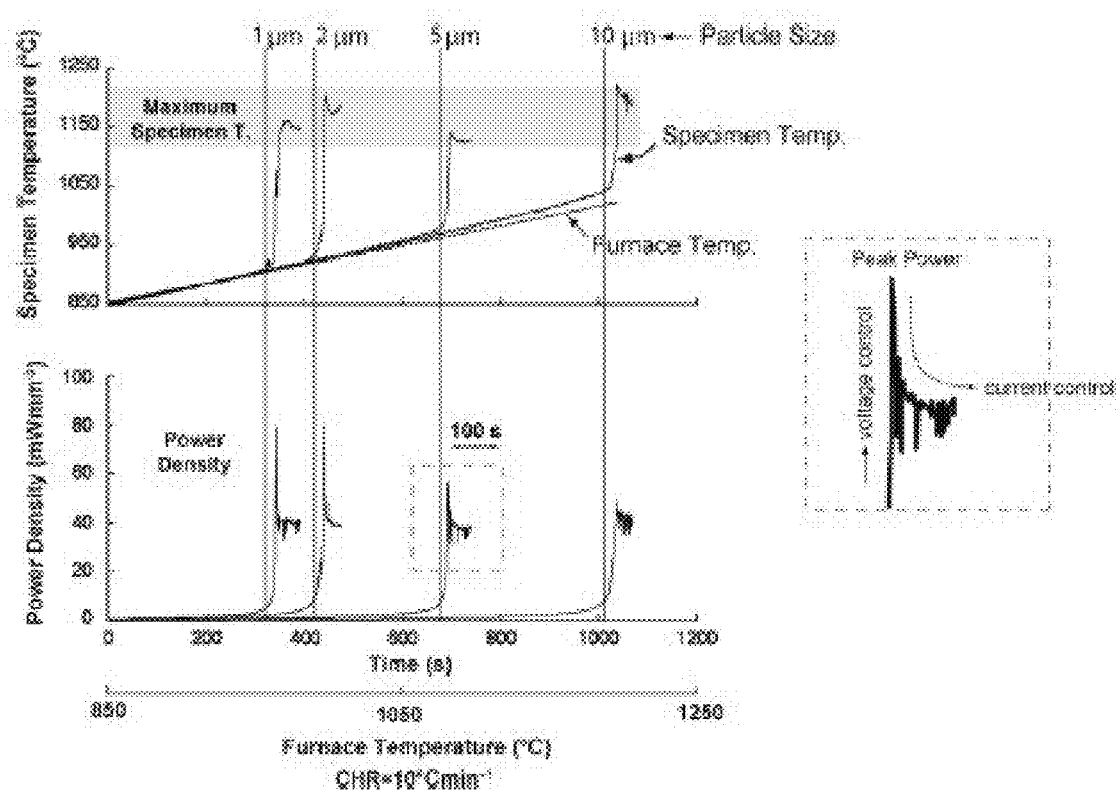
FIG. 51 contains line graphs showing the power-density expended in the specimen and the simultaneous measurement of the furnace temperature with a pyrometer. The specimen temperatures, as well as the power dissipation in the current control regime are similar for all four particle-size specimens.

The plots for the power density and the synchronous rise in the specimen temperature (measured with a pyrometer calibrated with a dense specimen of 3YSZ placed in the furnace) are given in FIG. 51. In each case the power rises to a peak under voltage control and then declines as the supply switches to current control. The specimen essentially follows the furnace temperature until the flash event when it rises quickly towards a quasi-steady state value.

Three features of the data in FIG. 51 are noteworthy: (i) Although the peak height of the power spike changes (decreases) with particle size, the steady state value remains the same at ~40 mW $mm^{-3}$, (ii) The magnitude of power dissipation at the cusp, at the onset of the flash, remains the same at approximately ~10 mW $mm^{-3}$ for all cases, and (iii) The highest value of the specimen temperature in all instances falls within a narrow band, as highlighted by the shaded area: it is in the 1100-1200° C. range.

The above values for power dissipation and the specimen temperature in the quasi-steady state regime are consistent with an analytical model based upon black body radiation.

The question arises why it is that the (furnace) flash temperature increases systematically from 920° C. to 1040° C. with increase in the particle size, even though the specimen temperature achieved during the flash event is about the same. The answer apparently lies in the increase in the resistance of the powder compacts with particle size; this can be seen from the slope of the curves below the flash in FIG. 51, and also in the shifts of the curves in the logarithmic plots given in FIG. 50.

Figure 52:
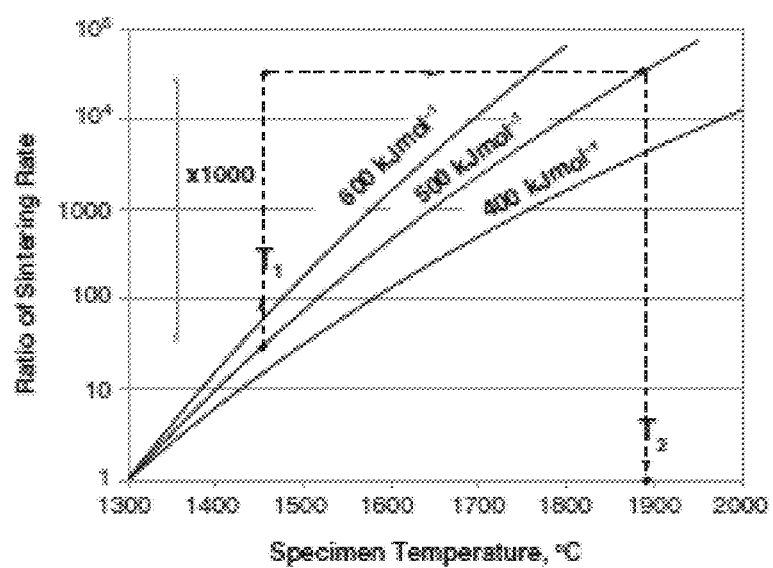
FIG. 52 shows the time-temperature relationship for the sintering rate based upon the activation energy for chemical diffusion.

Taken as whole the above observations strongly suggest that Joule heating must produce a certain critical temperature in the specimen to precipitate the flash event. Since the specimen temperature is related to the power dissipation, it follows that that too must reach the same value, regardless of the intrinsic resistance of the specimen in the dormant state. Since the large-particle compacts have a higher resistance they must be heated to a higher temperature to reach the same level of dissipation as the small-particle compacts, which raises the flash temperature for the larger particles. However, the maximum specimen temperature achieved by Joule heating remains well below the temperature that would be required to sinter the specimen in a few seconds. This point is shown graphically in FIG. 52. It gives the relationship between time and temperature for a thermally activated process. In 3YSZ the activation energy for chemical diffusion is ~500 kJ $mol^{-1}$. If sintering occurs in 1 h at temperature T1=1450° C., then for sintering to occur 1000 times faster, that is in 3.6 s, a temperature T2=1900° C. would be required. This temperature is far higher than the maximum temperature of the specimens, as reported in FIG. 51.

3.5. Microstructure

The samples from larger particle size, being of low density, were difficult to polish and prepare for microstructural characterization. Therefore results for the 1 µm sample, which sintered to 96% density are given.

Figure 53:
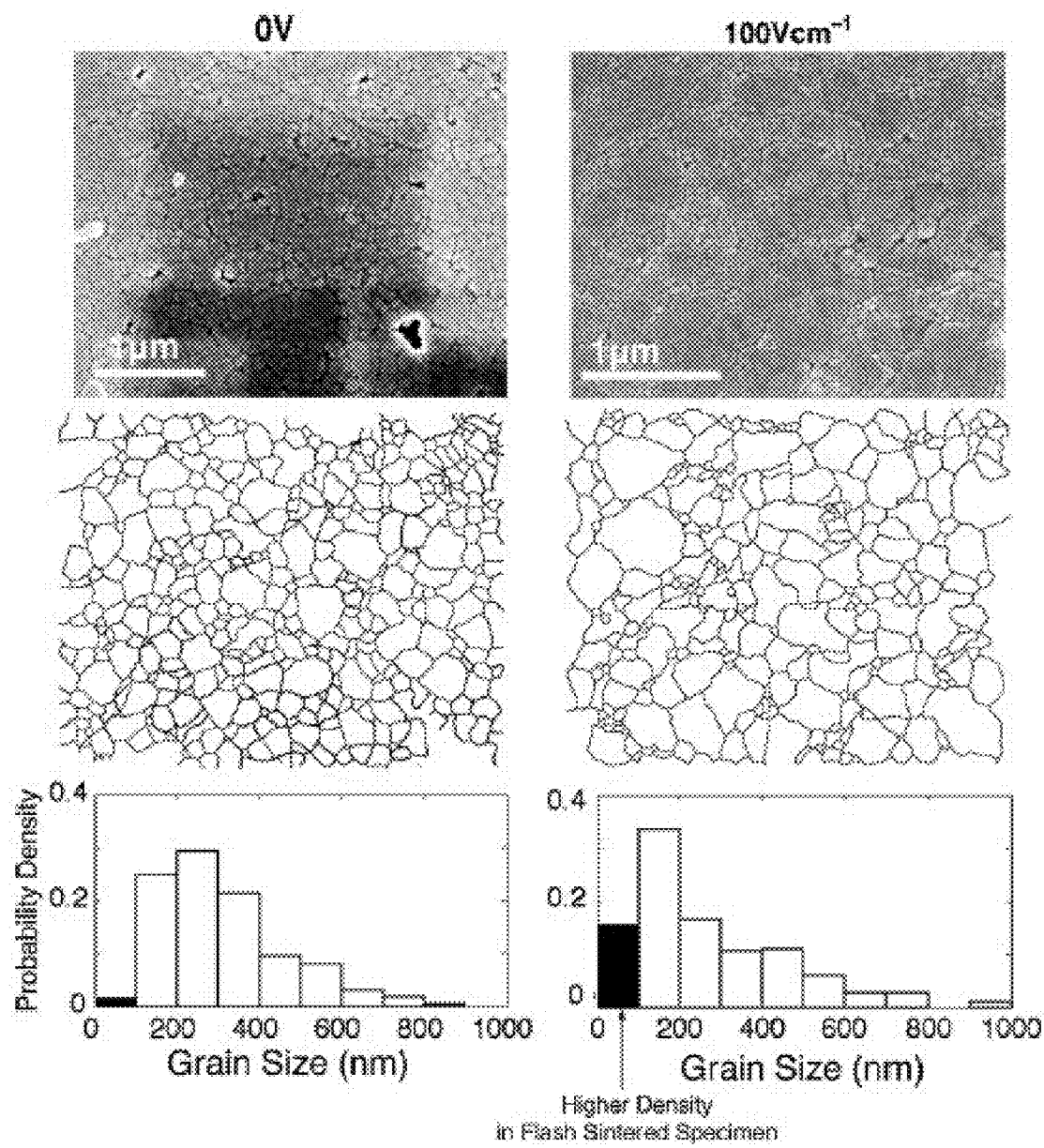
FIG. 53 shows micrographs of 1 μm conventionally and flash sintered samples. The dark shaded bar highlights the preponderance of nanosize grains in the flash sintered case.

The micrographs from a conventionally sintered and a flash sintered sample are compared in FIG. 53. Histograms of the grain size distributions are included. Both microstructures are nearly identical, except for one observation. The flash-sintered sample shows clusters of ultrafine nanocrystals in pockets which are spaced apart by a distance that rhymes with the particle size in the powder. This is also evident in the histograms where grains less than 100 nm are more heavily populated in the flash-sintering specimen (for comparison this bar is shown in solid color). One possible explanation is that the rush of mass into the pores during flash sintering nucleates new grains. In conventional sintering the process is slow enough that the matter being deposited on the pore surfaces can be grafted on to the crystal surfaces. In flash sintering nearly 50% of the mass in the specimen must be moved to fill the pores in just a few seconds, which may be too fast for the existing surfaces of the pores to grow as crystals with the inflow of mass, forcing the inflow to form its own grains. In a related observation, small bumps were found to develop on pore surfaces under the influence of an electric field (FIG. 53).

4. Discussion

The results presented above have the following salient features:

(i) The shift in the flash (furnace) temperature with particle size results from the higher resistance of the samples with the larger particle size. The samples for all four particle sizes reach the same specimen temperature during Joule heating. It is the value of this specimen temperature, which is in the 1100° C. to 1200° C. range that appears to be important.

(ii) The magnitude of the shrinkage strain during the flash event drops with larger particle size. Only the 1 μm specimen reaches a density of 96%, rising from a green density of 55%. The density of the specimens with larger particle sizes, which had similar green density, increased only to 82-84% of theoretical.

(iii) Joule heating of the specimens cannot, in of itself explain the flash event. The specimen temperature of ~1200° C. remains well below the estimated temperature of ~1900° C. for sintering to be completed in a few seconds.

The increase in the intrinsic resistance of the powder compacts with particle size is not unexpected. The contact area between the particles, even from Van der Waals forces, would increase when the particles are smaller, leading to higher conductivity. For the moment, this may be a sufficient explanation for the higher resistance of the compacts made from larger particles.

However, the massive chemical diffusion at relatively low specimen temperatures, that would be needed to transport nearly half the mass in the specimen into the pores, remains an exciting scientific question. Joule heating seems necessary to raise the specimen temperature up to a point, but the significance of the value of this temperature, remains a mystery.

The synchronicity between the abrupt increase in electrical conductivity, and chemical diffusion poses a dilemma, since one is controlled by the fastest moving charge, and the other by the slowest moving charge. Any mechanism for flash sintering must explain this coupling in order to be viable.

A mechanism we have suggested in the past at least conceptually is consistent with the above observations, although the detailed exposition of it is far from clear. The mechanism calls for the nucleation of Frenkel pairs to simultaneously provide charge and mass transport. The concept is that the interstitial vacancy pair can ionize under the applied electric field liberating a hole and an electron, which provide electrical conduction. The ionization renders the defects charge neutral relative to the lattice, and free to migrate independent of one another. Now the migration of the vacancy to the grain boundary and the interstitial to the pore, under the bias of the sintering pressure, effectively transports mass from the boundaries into the pore producing sintering.

The Frenkel pair mechanism is also consistent with the observation that larger inter-pore spacing, as with the larger particles, will increase the probability that the vacancy and interstitials will simply recombine and become neutralized, before they can migrate to the pore and the grain boundary, since larger particles entail longer diffusion distances.

5. Summary

1. Four powders of 3YSZ, with particle size ranging from 1 μm to 10 μm were successfully flash sintered, at an applied field of 100 V cm$^{-1}$. The threshold temperature for the onset of flash sintering moved higher as the particle size increased.

2. The power dissipation in all specimens was nearly the same for all particle sizes. As a result, the specimen temperature for all cases, produced by Joule heating, was also the same. The movement in the (furnace) flash sintering temperature can therefore be explained by the higher electrical conductivity of the "green" samples made from the smaller particle size.

3. The specimen temperature as measured with a pyrometer was well below the temperature that would have been required to achieve densification in just a few seconds.

4. Only the specimen with the smallest particle size could be sintered to full density. The larger particle size specimens sintered to 82-84% density.

5. A Frenkel defect nucleation mechanism is invoked to explain these findings. The lower density of the samples with larger particles is attributed to longer diffusion distances requiring longer times for these defects to travel to the pores, thus competing with the lifetimes for the recombination of the Frenkel defects.

REFERENCES

1. J. Wang, R. Raj, "Estimate of the activation energies for boundary diffusion from rate-controlled sintering of pure alumina and alumina doped with zirconia or titania", J. Am. Ceram. Soc., 73, 1172-1175 (1990).
2. R. Orrù, R. Licheri, A. M. Locci, A. Cincotti, G. Cao, "Consolidation/synthesis of materials by electric current activated/assisted sintering", Mat. Sci. Eng. R 63 (2009) 127-287.
3. Z. A. Munir, U. Anselmi-Tamburini, "The effect of electric field and pressure on the synthesis and consolidation of materials: A review of the spark plasma sintering method", J. Mater. Sci 41 (2006) 763-777.
4. S. Grasso, Y. Sakka, G. Maizza, "Electric current activated/assisted sintering (ECAS): a review of patents 1906-2008", Sci. Technol. Adv. Mater. 10 (2009) 053001.
5 R. M. Young, R. McPherson, "Temperature-Gradient-Driven Diffusion in Rapid-Rate Sintering", J. Am. Ceram. Soc., 12 [6] 1080-81 (1989).
6. Di Yang, R. Raj, H. Conrad, "Enhanced Sintering Rate of Zirconia (3Y-TZP) Through the Effect of a Weak dc Electric Field on Grain Growth", J. Am. Ceram. Soc., in press.
7. Di Yang and H. Conrad, "Enhanced Sintering Rate of Zirconia (3Y-TZP) by Application of a Small AC Electric Field,' Scripta Mater., in press.
8. S. Ghosh, A. H. Chokshi, P. Lee, R. Raj, "A Huge Effect of Weak dc Electrical Fields on Grain Growth in Zirconia", J. Am. Ceram. Soc., 92 [8] 1856-1859 (2009).
9. M. Cologna, M. Bertoldi, V. M. Sglavo, "Sintering and Deformation of Solid Oxide Fuel Cells Produced by Sequential Tape Casting", Int. J. Appl. Ceram. Technol., DOI:10.1111/j.1744-7402.2009.02390.x.
10. M. Cologna and R. Raj, "Surface diffusion controlled neck growth kinetics in early stage sintering of zirconia, with and without applied dc electric field," J. Am. Ceram. Soc., submitted Feb. 22, 2010.
11. X. Guo, W. Sigle and J. Maier, "Blocking grain boundaries in yttria-doped and undoped ceria ceramics of high purity," J. Am. Ceram. Soc., 88, 77 (2003).
12. F. Wakai and T. Nagano, "Effects of Solute Ion and Grain Size on Superplasticity of $ZrO_2$ Polycrystals,' J. Mater. Sci., 26, 241-247 (1991).
13. C. P. Cameron and R. Raj, "Grain growth transition during sintering of colloidally prepared alumina powder compacts," J. Am. Ceram. Soc., 71, 1031-1035 (1988).
14. A. G. Bloxam, "Improved manufacture of electric incandescence lamp filaments from tungsten or molybdenum or an alloy thereof", GB Patent No. 27,002 (1906).

15. M. Cologna, B. Rashkova, R. Raj, "Flash Sintering of Nanograin Zirconia in <5 s at 850° C.", J. Am. Ceram. Soc., 93 [11] 3556-3559 (2010).
16. D. Yang, R. Raj, and H. Conrad, "Enhanced Sintering Rate of Zirconia (3Y-TZP) Through the Effect of a Weak dc Electric Field on Grain Growth," J. Am. Ceram. Soc., 93: 2935-2937 (2010).
17. M. Cologna, A. L. G. Prette, R. Raj, "Flash sintering of Cubic Yttria-Stabilized Zirconia at 750° C. for Possible Use in SOFC Manufacturing", J. Am. Ceram. Soc., 94 [2] 316-319 (2011).
18. A. L. G. Prette, M. Cologna, V. M. Sglavo, R. Raj, "Flash sintering of $Co_2MnO_4$ spinel for solid oxide fuel cell applications", J. Power Sources, 196 2061-2065 (2011).
19. R. Raj, "Investigating the Influence of Electrical Fields on Sintering and Related Phenomena in Ceramics Using the Sinter-Forging Method", Materials Science & Technology Conference, Oct. 17-21, 2010, Houston, Tex. USA.
20. A. Karakuscu, M. Cologna, U. Blas, R. Raj, unpublished work.
21. J. Francis, R. Raj, "Flash sinterforging of Nanograin Zirconia: Field Assisted Sintering and Superplasticity", J. Am. Ceram. Soc., in press.
22. S. Ghosh, A. H. Chokshi, P. Lee, and R. Raj, "A Huge Effect of Weak dc Electrical Fields on Grain Growth in Zirconia,", J. Am. Ceram. Soc., 92 1856-1859 (2009).
23. R. Raj, M. Cologna, J. Francis, "Influence of Externally Imposed and Internally Generated Electrical Fields on Grain Growth, Diffusional Creep, Sintering and Related Phenomena", J. Am. Ceram. Soc., in press.
24. M. Cologna, M. Bertoldi, V. M. Sglavo "Curvature upon co-sintering of anode supported solid oxide fuel cells", Int. J. Applied Ceram. Tech., 7 [6] 803-813 (2010).
25. A. A. Bauer, J. L. Bates, Battelle Mem. Inst. Rept. 1930 (Jul. 31, 1974).
26. W D Kingery, H K Bowen, D R Uhlmann, Introduction to Ceramics (Wiley, New York, 1976) p. 903.
27. R. L. Coble U.S. Pat. No. 3,026,210 (1962).
28. P. J. Jorgensen, "Modification of Sintering Kinetics by Solute Segregation in $Al_2O_3$", 48 207-210 (1965).
29. F. J. T. Lin, L. C. De Jonghe, M. N. Rahaman "Initial Coarsening and Microstructural Evolution of Fast-Fired and MgO-Doped $Al_2O_3$", J. Am. Ceram. Soc., 80 [11] 2891-96 (1997).
30. Z. Shen, M. Johnsson, Z. Zhao, M. Nygren, "Spark Plasma Sintering of Alumina", J. Am. Ceram. Soc., 85 [8] 1921-27 (2002).
31. K. A. Berry, M. P. Harmer, "Effect of MgO Solute on Microstructure Development in $Al_2O_3$," J. Am. Ceram. Soc., 69 [2] 143-49 (1986).
32. H. A. Wang, C. H. Lee, F. A. Kröger, R. T. Cox, "Point defects in α-Al2O3:Mg studied by electrical conductivity, optical absorption, and ESR", Phys. Rev. B 27, 3821-3841 (1983)
33. R. J. Brook, J. Yee, F. A. Kröger, "Electrochemical Cells and Electrical Conduction of Pure and Doped $Al_2O_3$", J. Am. Ceram. Soc., 54 [9] 444-451 (1971).
34. S. K. Mohapatra, F. A. Kröger, "Defect Structure of α-Al2O3 Doped with Magnesium", J. Am. Ceram. Soc., 60 [3-4] 141-148 (1977).
35. F. G. Will, H. G. deLorenzi, K. H. Janora, Conduction Mechanism of Single-Crystal Alumina, J. Am. Ceram. Soc., 75 [121] 295-304 (1992).
36. F. Talbi, F. Lalam, D. Malec, "DC conduction of Al2O3 under high electric field", J. Phys. D: Appl. Phys., 40 3803-3806 (2007).
37. P. K. Karahaliou, M. Theodoropoulou, C. A. Krontiras, N. Xanthopoulos, S. N. Georga, M. N. Pisanias, "Transient and alternating current conductivity of nanocrystalline porous alumina thin films on silicon, with embedded silicon nanocrystals", J. Appl. Phys. 95 [5] 2776-2780 (2004).
38. G. P. Pells, "Radiation-induced degradation of the intrinsic electrical conductivity of $MgAl_2O_4$ and $Al_2O_3$,", J. Nuclear Materials, 184 177-182 (1991).
39. E. R. Hodgson, "Radiation enhanced electrical breakdown in $Al_2O_3$: field effect", Nuclear Instruments and Methods in Physics Research B65 298-300 (1992).
40. J. Narayan, R. A. Weeks, and E. Sonder, "Aggregation of defects and thermal-electric breakdown in MgO" J. Appl. Phys., 49 [12], 5977-5981 (1978).
41. E. Sonder, K. F. Kelton, J. C. Pigg, R. A. Weeks, "The effect of electric current on the conductivity of MgO single crystals at temperatures above 1300K", J. Appl. Phys. 49 [12] 5971-5976 (1978).
42. B. D. Evans, "A review of the optical properties of anion lattice vacancies, and electrical conduction in —$Al_2O_3$: their relation to radiation-induced electrical degradation" J. Nuclear Materials 219 202-223 (1995).

The invention claimed is:
1. A method of sintering a body comprising particles of a ceramic material, the method comprising
   a) applying a DC, AC or pulsed electrical field with power supply acting under voltage control to the body heated to an elevated temperature until there is a non-linear increase in the conductivity of the body, wherein the electrical field is between 7.5 V/cm and 1000 V/cm;
   b) switching the power supply to current control at the onset of the non-linear increase in the conductivity of the body wherein under current control the current limit is set such that the power dissipation during sintering is from 10 to 1000 mW $mm^{-3}$;
   wherein a sintered body is produced in a time less than one minute from the onset of the non-linear increase in the conductivity of the body.
2. The method according to claim 1, wherein the sintered body is produced in less than 5 seconds from the onset of the non-linear increase in the conductivity of the body.
3. The method according to claim 1, wherein the electrical field is from 60 V/cm to 500 V/cm.
4. The method according to claim 1, wherein the onset of sintering is accompanied by an increase in the power dissipated within the material, wherein the power dissipation is manifested as an increase in the current flowing through the material.
5. The method according to claim 1 wherein the electrical voltage is applied to the material with two electrodes that are electronically conducting.
6. The method according to claim 1 wherein the electrodes are made from a metal or from an electronically conducting ceramic material.
7. The method according to claim 1 wherein the electrodes are not physically in contact with the material.
8. The method according to claim 1, wherein in step a) the electrical field is fixed and the heat is increased at a constant rate until the onset of sintering.
9. The method according to claim 8, wherein the heat is increased at a rate between 1° C. per minute to 100° C. per minute.
10. The method according to claim 1, wherein in step a) the temperature of the furnace containing the material is fixed and the applied voltage field is increased at a constant rate until the onset of sintering.

11. The method according to claim 1, wherein the density of the sintered body is 80%-100% of the theoretical density of the ceramic material.

12. The method according to claim 1, wherein the ceramic material has a greater concentration of non-stoichiometric phase than $Al_2O_3$, wherein the $Al_2O_3$ is substantially not doped with MgO.

13. The method according to claim 12, wherein the non-stoichiometric phases are Ruddlesden-Popper (RP) phases.

14. The method according to claim 1, wherein the ceramic material has a greater concentration of non-stoichiometric phase than a material selected from the group consisting of yttrium-stabilized zirconia, MgO-doped alumina, $SrTiO_3$ and $Co_2MnO_4$.

15. The method according to claim 14, wherein the non-stoichiometric phases are Ruddlesden-Popper (RP) phases.

16. The method according to claim 1, wherein the ceramic material is selected from yttrium-stabilized zirconia, MgO-doped alumina, $SrTiO_3$ and $Co_2MnO_4$.

17. The method according to claim 1, wherein the average diameter of the particles is between 60 nm and 1.5 µm.

18. The method according to claim 1, wherein the average diameter of the particles is between 60 nm and 200 nm.

19. The method according to claim 1, wherein the average diameter of the particles is between 1.0 µm and 1.5 µm.

20. The method according to claim 1, further comprising exposing the material to a uniaxial force.

21. The method according to claim 20, wherein the uniaxial force is between 1.5 and 12 MPa.

22. The method of claim 1 wherein the ceramic material is an oxide ceramic material.

23. The method of claim 1 wherein the density of the body comprising particles of a ceramic material is from 50% to 59% of the theoretical density of the ceramic material.

24. The method of claim 1 wherein the sintered body is a sintered ceramic body.

* * * * *